United States Patent
Chong et al.

(12) 
(10) Patent No.: US 11,699,357 B2
(45) Date of Patent: Jul. 11, 2023

(54) COLLABORATIVE LEARNING SYSTEM

(71) Applicant: NEURON FUEL, INC., Los Altos, CA (US)

(72) Inventors: Kelvin Voon-Kit Chong, Mountain View, CA (US); Krishna Vedati, Los Altos, CA (US); Srinivas Mandyam, Los Altos, CA (US); Tiago André Dias Silva, Espinho (PT); Jamie May, Northbrook, IL (US)

(73) Assignee: NEURON FUEL, INC., Los Altos, CA (US)

( * ) Notice: Subject to any disclaimer, the term of this patent is extended or adjusted under 35 U.S.C. 154(b) by 140 days.

(21) Appl. No.: 17/366,995

(22) Filed: Jul. 2, 2021

(65) Prior Publication Data

US 2022/0013035 A1 Jan. 13, 2022

Related U.S. Application Data

(60) Provisional application No. 63/048,957, filed on Jul. 7, 2020.

(51) Int. Cl.
G09B 19/00 (2006.01)
G09B 5/12 (2006.01)
H04L 65/401 (2022.01)

(52) U.S. Cl.
CPC ........... *G09B 19/0053* (2013.01); *G09B 5/12* (2013.01); *H04L 65/4015* (2013.01)

(58) Field of Classification Search
CPC ....... G09B 19/0053; G09B 5/12; H04L 51/18; H04L 51/216; H04L 51/04
See application file for complete search history.

(56) References Cited

U.S. PATENT DOCUMENTS

| | | | |
|---|---|---|---|
| 5,535,422 A | 7/1996 | Chiang et al. | |
| 5,745,738 A | 4/1998 | Ricard | |
| 6,149,441 A | 11/2000 | Pellegrino et al. | |
| 6,201,948 B1 | 3/2001 | Cook et al. | |
| 6,468,085 B1 | 10/2002 | Bergan et al. | |
| 6,690,914 B2 | 2/2004 | Ramachandran et al. | |
| 6,865,368 B2 | 3/2005 | Hoyashita et al. | |
| 7,077,806 B2 | 7/2006 | Ackermann et al. | |
| 7,152,229 B2 | 12/2006 | Chong et al. | |
| 7,174,534 B2 | 2/2007 | Chong et al. | |
| 7,644,262 B1 | 1/2010 | Bromley et al. | |
| 8,230,059 B1 | 7/2012 | Santos et al. | |
| 8,714,986 B2 | 5/2014 | Dodelson et al. | |
| 8,750,782 B2 | 6/2014 | Scandura | |
| 9,595,205 B2 | 3/2017 | Chong et al. | |
| 9,621,677 B1 * | 4/2017 | Bradley | H04L 67/535 |
| 10,276,061 B2 | 4/2019 | Chong et al. | |
| 10,510,264 B2 | 12/2019 | Chong et al. | |
| 10,726,739 B2 | 7/2020 | Chong et al. | |

(Continued)

OTHER PUBLICATIONS

Non-Final Office Action dated Mar. 26, 2014 for U.S. Appl. No. 13/715,417, filed Dec. 14, 2012; pp. 1-10.

(Continued)

*Primary Examiner* — Robert J Utama
(74) *Attorney, Agent, or Firm* — Edlavitch Law PLLC

(57) ABSTRACT

Described herein are improved systems and methods for overcoming technical problems associated with limited collaborative learning functionality in educational programming platforms.

20 Claims, 40 Drawing Sheets

(56) References Cited

U.S. PATENT DOCUMENTS

| | | | |
|---|---|---|---|
| 2001/0042226 A1* | 11/2001 | Dzoba | G06F 11/3664 714/39 |
| 2002/0087416 A1 | 7/2002 | Knutson | |
| 2004/0076941 A1 | 4/2004 | Cunningham et al. | |
| 2004/0078785 A1 | 4/2004 | Dutt et al. | |
| 2004/0209231 A1 | 10/2004 | Merritt | |
| 2004/0229194 A1 | 11/2004 | Yang | |
| 2004/0259060 A1 | 12/2004 | Kumar et al. | |
| 2005/0005258 A1* | 1/2005 | Bhogal | G06F 8/73 717/102 |
| 2005/0079477 A1 | 4/2005 | Diesel et al. | |
| 2005/0089825 A1 | 4/2005 | Zulferino | |
| 2005/0175970 A1 | 8/2005 | Dunlap et al. | |
| 2006/0059253 A1* | 3/2006 | Goodman | G06Q 10/10 709/223 |
| 2006/0179420 A1 | 8/2006 | Ebrahimi | |
| 2007/0130112 A1 | 6/2007 | Lin | |
| 2007/0168946 A1 | 7/2007 | Drissi et al. | |
| 2008/0305460 A1 | 12/2008 | Garg | |
| 2009/0070147 A1 | 3/2009 | Kashani et al. | |
| 2009/0138415 A1 | 5/2009 | Lancaster | |
| 2009/0204926 A1* | 8/2009 | Cochrane | G06F 8/33 715/781 |
| 2009/0311657 A1 | 12/2009 | Dodelson et al. | |
| 2010/0042969 A1 | 2/2010 | Ackerman | |
| 2010/0227301 A1 | 9/2010 | Yu et al. | |
| 2011/0081632 A1 | 4/2011 | Garg | |
| 2011/0136083 A1 | 6/2011 | Morris et al. | |
| 2012/0124559 A1 | 5/2012 | Kondur | |
| 2013/0006609 A1 | 1/2013 | Dhoolia et al. | |
| 2013/0130217 A1 | 5/2013 | Dohring et al. | |
| 2013/0311416 A1 | 11/2013 | Hua et al. | |
| 2014/0057231 A1 | 2/2014 | Lutz et al. | |
| 2014/0113257 A1 | 4/2014 | Spiridonov et al. | |
| 2014/0170606 A1 | 6/2014 | Chong et al. | |
| 2014/0170633 A1 | 6/2014 | Chong et al. | |
| 2014/0287397 A1 | 9/2014 | Chong et al. | |
| 2014/0379602 A1 | 12/2014 | Nelson et al. | |
| 2015/0220312 A1* | 8/2015 | Jemiolo | G06F 3/048 715/234 |
| 2017/0186337 A1 | 6/2017 | Chong et al. | |
| 2017/0336960 A1* | 11/2017 | Chaudhri | G06Q 10/107 |
| 2019/0236975 A1 | 4/2019 | Chong et al. | |
| 2020/0320899 A1 | 10/2020 | Chong et al. | |
| 2020/0356365 A1* | 11/2020 | Pezaris | G06F 3/04817 |

OTHER PUBLICATIONS

Maloney, J., Resnick, M.,Rusk, N., Silverman, B., Eastmond, E. (2010). The Scratch Programming Language and Environment ACM Transactions on Computing Education, Nov. 2010. <http://scratch.mit.edu/info/research/>.

ElectricSparx, 'Comment Block Edited' Apr. 22, 2008, Scratch projects, <http://scratch.mit.edu/projects/147451/>.

* cited by examiner

COLLABORATIVE LEARNING SYSTEM

CROSS-REFERENCE TO RELATED APPLICATIONS

The present application claims the benefit of priority from U.S. Provisional Patent Application No. 63/048,957, filed on Jul. 7, 2020, and entitled "COLLABORATIVE LEARNING SYSTEM", the entire disclosure of which application is hereby incorporated herein by reference.

The present application includes subject matter related to U.S. patent application Ser. No. 13/837,719, filed Mar. 15, 2013, issued on Mar. 14, 2017, as U.S. Pat. No. 9,595,205, and entitled "Systems and Methods for Goal-Based Programming Instruction", the entire disclosure of which application is hereby incorporated herein by reference.

TECHNICAL FIELD

The present disclosure relates to collaborative learning over a computer network or telecommunications network in general, and specifically to collaborative learning of computer programming and learning of computer programming skills over a computer network or telecommunications network.

BACKGROUND

Educational programming platforms, such as TYNKER, can be used to teach the skills for making video games and other types of computer programs. Instead of typing the source code, a student can visually drag blocks of code and snap them together in a graphical user interface (GUI). TYNKER is unique in that it offers self-paced online courses for students to learn computer programming as well as a computer programming curriculum. TYNKER makes it easier for kids to learn coding as it teaches kids coding through creating games. Although, educational programming platforms, such as TYNKER, are helpful tools for teaching computer programming, in the past such tools may have had limited collaborative learning functionality.

SUMMARY

Described herein are improved systems and methods for overcoming technical problems associated with limited collaborative learning functionality in educational programming platforms.

The systems and platforms described herein can have a suite of creative coding tools for students (such as students of ages five to seventeen). The systems and platforms can include or be a part of a collaborative learning system. Such a system can include a system for collaborative coding and learning using a messaging system. Users can seek advice or help with their coding partners and collaborators on computer programs through coding tools as well as tools for messaging and leaving comments. This can improve the quality of a user's computer program and help a user correct mistakes in the computer program. This also allows for collaborative editing of source code and other computer program parts, where users can suggest alternatives or fixes for the computer program. The system can also include role-based dashboards for teachers, parents and students which can drive the interaction in learning computer programming lessons. The messaging system can improve use cases such as teacher-student collaboration inside a classroom of the system, independent collaboration between students and co-learners using the system (locally or across the globe with or without being in a classroom), and parent-child collaboration.

Besides its use in teaching computer programming, the collaborative learning system can be adapted for assisting in the teaching of other subjects such as math, science, and language arts.

In summary, the systems and methods (or techniques) disclosed herein can provide specific technical solutions to at least overcome the technical problems mentioned in the background section and other parts of the application as well as other technical problems not described herein but recognized by those skilled in the art.

With respect to some embodiments, disclosed herein are computerized methods for collaborative learning functionality in educational programming platforms, as well as a non-transitory computer-readable storage medium for carrying out technical operations of the computerized methods. The non-transitory computer-readable storage medium has tangibly stored thereon, or tangibly encoded thereon, computer readable instructions that when executed by one or more devices (e.g., one or more personal computers or servers) cause at least one processor to perform a method for a novel and improved collaborative learning functionality in educational programming platforms.

With respect to some embodiments, a system is provided that includes at least one computing device configured to provide useful and novel collaborative learning functionality in educational programming platforms. And, with respect to some embodiments, a method is provided to be performed by at least one computing device. In some example embodiments, computer program code can be executed by at least one processor of one or more computing devices to implement functionality in accordance with at least some embodiments described herein; and the computer program code being at least a part of or stored in a non-transitory computer-readable medium.

For example, some embodiments include a method including distributing, over a network, by a computing system, a shared computer programming project between multiple client devices through a feed having a graphical user interface configured to permit users to interact with the feed and update or at least view the project. Such an embodiment can include re-distributing over the network, by the computing system, the project after it has been updated or least viewed by at least one of the multiple client devices.

Also, for example, some embodiments include a non-transitory computer-readable storage medium tangibly encoded with computer-executable instructions, that when executed by a processor of a computing device the processor performs a method including the following operations: distributing over a network, by a computing system, a shared computer programming project between multiple client devices through a feed having a graphical user interface configured to permit users to interact with the feed and update or at least view the project; and re-distributing over the network, by the computing system, the project after it has been updated or least viewed by at least one of the multiple client devices.

Also, for example, some embodiments include a system, including a computing device, including a processor and a non-transitory computer-readable storage medium for tangibly storing thereon computer program code for execution by the processor, the computer program code including: executable logic for distributing over a network, by a computing system, a shared computer programming project between multiple client devices through a feed having a graphical user interface configured to permit users to interact with the feed and update or at least view the project; and executable logic for re-distributing over the network, by the computing system, the project after it has been updated or least viewed by at least one of the multiple client devices.

These and other important aspects of the invention are described more fully in the detailed description below. The invention is not limited to the particular assemblies, apparatuses, methods and systems described herein. Other embodiments can be used and changes to the described embodiments can be made without departing from the scope of the claims that follow the detailed description.

BRIEF DESCRIPTION OF THE DRAWINGS

The present disclosure will be understood more fully from the detailed description given below and from the accompanying drawings of various embodiments of the disclosure.

DETAILED DESCRIPTION

Described herein are improved systems and methods for overcoming technical problems associated with limited collaborative learning functionality in educational programming platforms.

The systems and platforms described herein can have a suite of creative coding tools for students (such as students of ages five to seventeen). The systems and platforms can include or be a part of a collaborative learning system. Such a system can include a system for collaborative coding and learning using a messaging system. Users can seek advice or help with their coding partners and collaborators on computer programs through coding tools as well as tools for messaging and leaving comments. This can improve the quality of a user's computer program and help a user correct mistakes in the computer program. This also allows for collaborative editing of source code and other computer program parts, where users can suggest alternatives or fixes for the computer program. The system can also include role-based dashboards for teachers, parents and students which can drive the interaction in learning computer programming lessons. The messaging system can improve use cases such as teacher-student collaboration inside a classroom of the system, independent collaboration between students and co-learners using the system (locally or across the globe with or without being in a classroom), and parent-child collaboration.

Besides its use in teaching computer programming, the system can be adapted for assisting in the teaching of other subjects such as math, science, and language arts.

Figure 1:
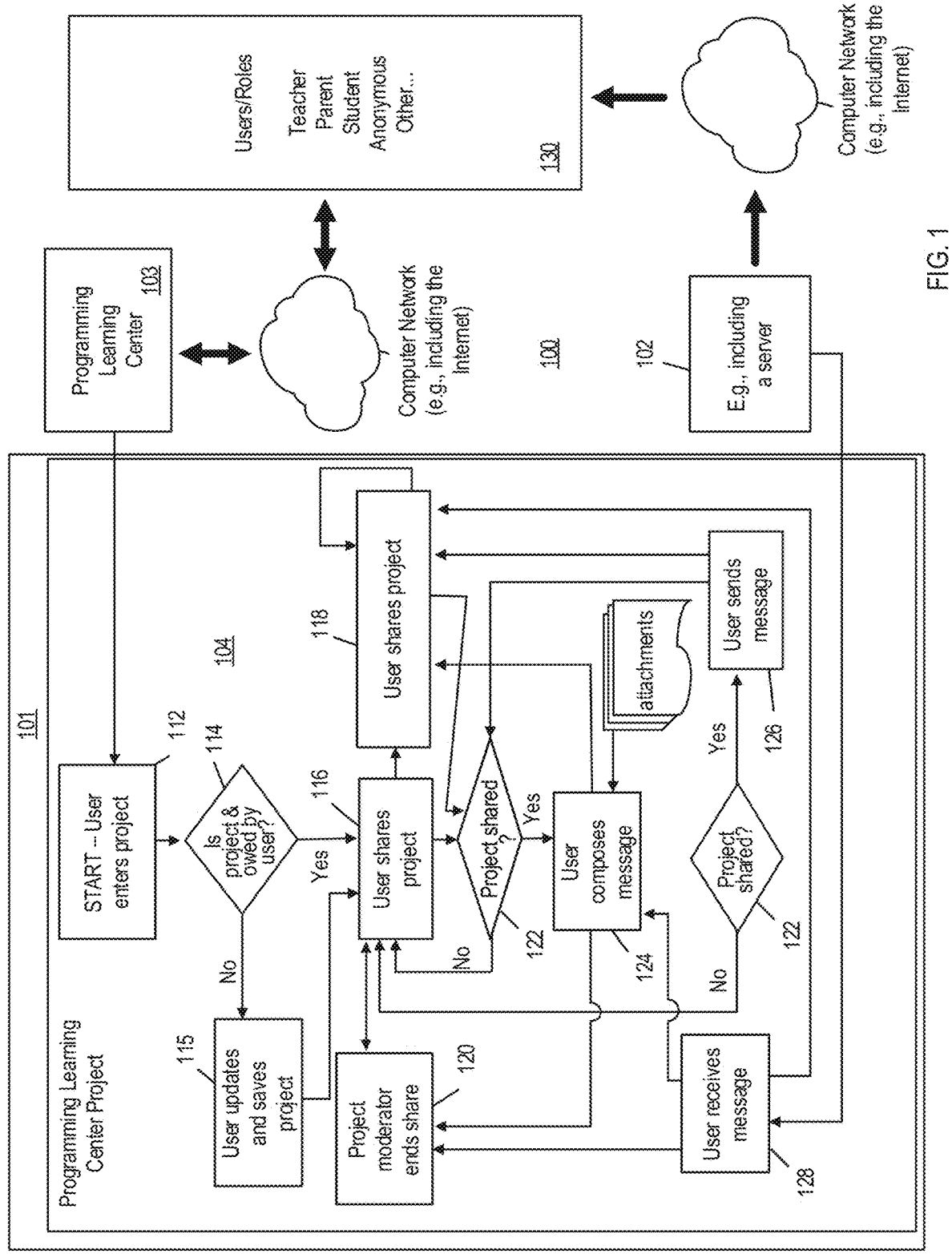
FIGS. 1, 2A and 2B illustrate example project sharing workflows of a collaborative learning system which include methods of the collaborative learning system, in accordance with some embodiments of the present disclosure.

The collaborative learning system can include a management computing system (which can include a management server), context-aware message attachments, and role and context-based message feeds (e.g., see at least FIG. 1). The management computing system (e.g., see management computing system 102 of FIG. 1) can be horizontally scalable and can include a custom real-time collaboration server responsible for managing access-controlled channels that different clients (e.g., socket.io, websockets, regular sockets, HTTP, etc.) can subscribe to and publish messages to. Subscribed clients receive messages from channels they successfully subscribed to. The management computing system can be the main control system for messaging and collaboration features described herein and elsewhere. Context-aware message attachments can provide an ability to attach multiple types of media to messages sent to feeds. The messages can be contextually interpreted within the collaborative learning system, enabling features that are unique to the collaborative learning system (e.g., attach code blocks to a message, which the receiver user can seamlessly drag into a project of the user and execute). Role and context-based message feeds provide an ability to receive contextually meaningful messages in real-time and browse the messages' history based on a user's role and current context (e.g., a classroom feed for the classroom of the user is currently visiting in a dashboard).

Figure 2A:
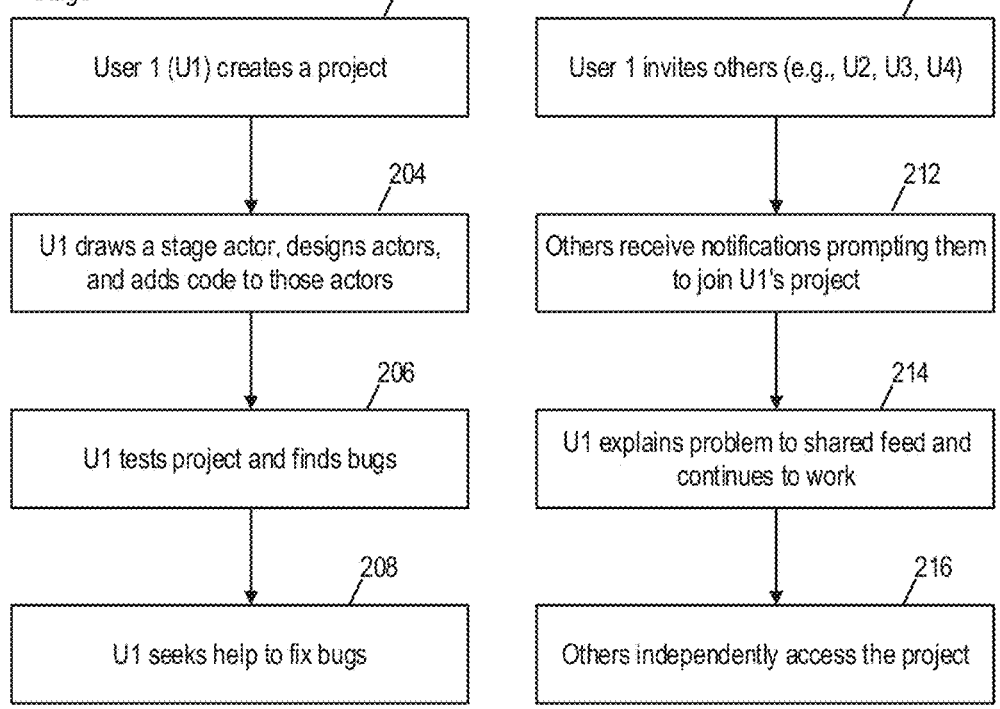
Figure 2B:
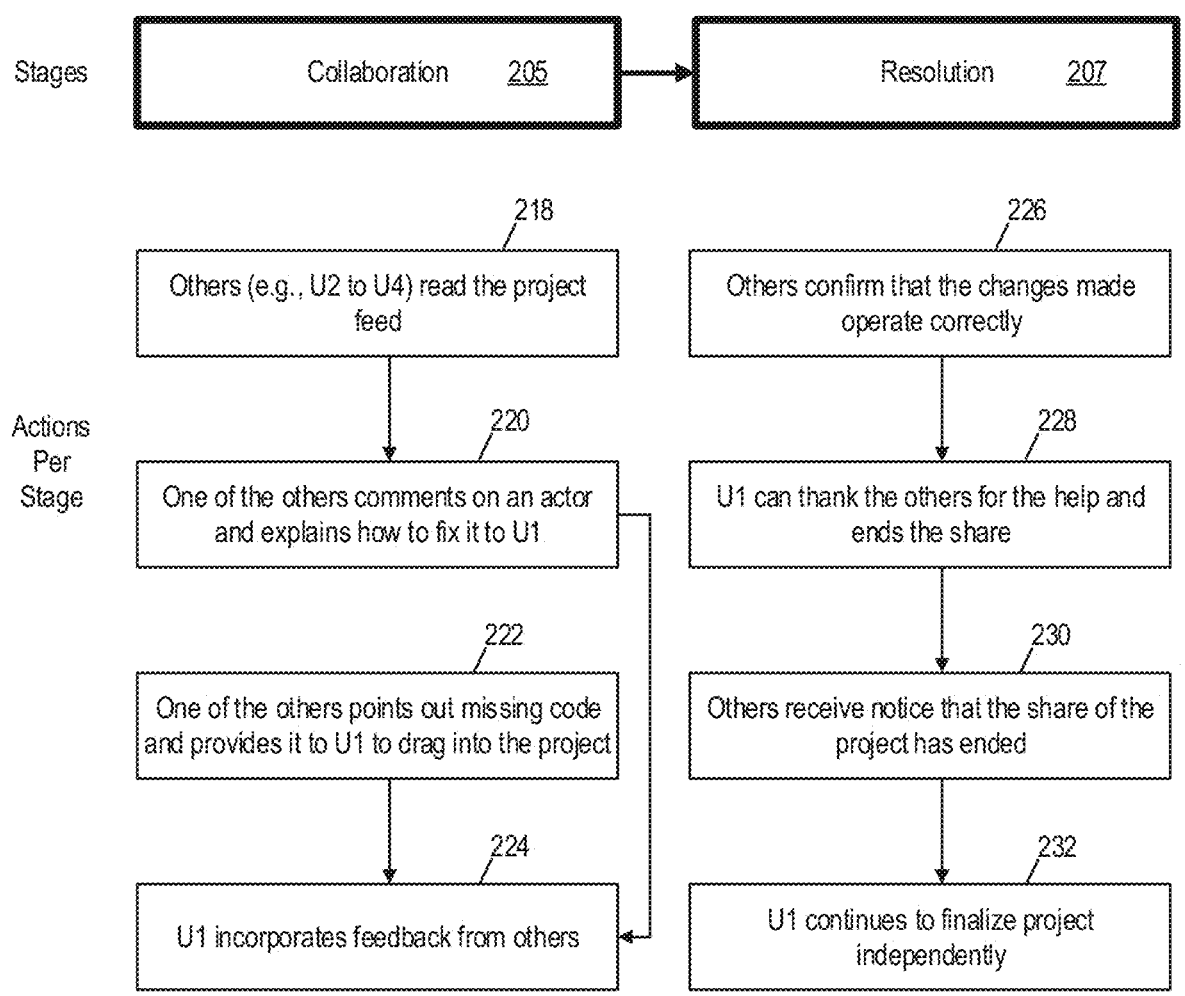

FIGS. 1, 2A, and 2B illustrate example project sharing workflows 100 and 200 respectively of a collaborative learning system which include methods of the collaborative learning system, in accordance with some embodiments of the present disclosure.

Specifically, FIG. 1 illustrates project sharing workflow 100 which is an example of a workflow using the management computing system 102 (which can include a management server), the context-aware message attachments, and the role and context-based message feeds.

A user of the collaborative learning system that owns a computer programming project (e.g., project 104) can share the project with other associated users (e.g., other students within a classroom the student user is enrolled in). The project is shared through a project sharing system 101 of the collaborative learning system at step 116. The system 101 can be accessed via a programming learning center application 103. Prior to step 116, a user enters a project and can start the project through the project sharing system 101 at step 112. The user can share the project when it is determined by the system 101 that the user owns or can share the project at step 114. At step 115, the user who owns the project can work on it via the system 101.

Once shared, a project feed for the project becomes available and the associated users of the project can share the project with each other, so that they can send and receive messages to and from the feed to collaborate in the project. The computer programming project can be replaced by a project in a different subject for learning that subject (such as for a math, science, or language arts project).

A user can be a moderator of a shared project and the user can add or remove users to the share via the project sharing system 101 at step 118 (e.g., the project owner who shared the project is moderator, and other supervisors, like associated parents and teachers can also be considered so and therefore will be able to add or remove users from the shared project as well). When a user is removed from a shared project, the feed can be removed from the project for that user by the project sharing system 101 at step 120.

In a case where the user is a project moderator, the user can end the share at any time via the project sharing system 101 at step 120. When the share is ended, the feed is removed for users that have access to the project. (e.g., a teacher may be considered a project moderator due to the project being shared within the context of a classroom, and the teacher can end project shares as a way to moderate stop unwanted classroom discussions). At step 122, the system 101 can determine whether the project is shared or if the share has been removed.

In feeds described herein, a user can compose a message by adding text to it as well as other optional attachments. And, a message can be generated via the project sharing system 101, at step 124. In the context of a project, a user can add actors of a project or computer program and blocks of a project or computer program as attachments (e.g., the blocks can be draggable from the feed into the project and used by users that are sharing the feed for the project).

When a user is finished composing the message (e.g., finished composing text, adding attachments, etc.), the user can click a graphical element to send the message to the feed via the system (at step 126), making it available to users using the feed. For example, the message is sent to the management computing system 102, which can include a server, and which can then broadcast to the clients, e.g., users and roles 130, that joined and are associated with the feed and project via a channel of the collaborative learning system that is associated with the project feed.

When a user sends a message via the project sharing system 101, in the project feed, at step 126, it will be relayed back to the user as well as other users that have access to the feed (e.g., users the project is currently shared with). When a user receives the message via the system 101 at step 128, along with its attachments, the message will be displayed in the feed. The feed can be displayed via a GUI of the programming learning center application 103.

As shown in FIG. 1, the systems of the collaborative learning system can communicate via the Internet or another computer network.

Specifically, FIGS. 2A and 2B illustrate a project collaboration workflow 200 which is an example of a workflow using the management computing system 102 (which can include a management server), the context-aware message attachments, and the role and context-based message feeds. FIGS. 2A and 2B illustrate a user experience outlining how someone can use the collaborative learning system to debug code of a project such as by using the programming learning center application 103.

In some embodiments, there are four stages of a shared project. As shown in FIG. 2A, in the development stage 201, a user creates a project and finds errors or problems in the project, at step 202. Also, in the development stage 201, the user can draw a stage actor, design actors, and add code to the actors, at step 204. The project can be tested to find bugs and help can be provided by the system, at step 206 of stage 201. At step 208 of stage 201, the user seeks help to fix bugs.

In the share initiation stage 203, the user can invite other users to work on the errors or problems in the project, at step 210. At step 212 of stage 203, other users receive notifications prompting them to join the project. At step 214 of stage 203, the user explains a problem to a shared feed and continues to work. At step 216 of stage 203, the other users independently access the project.

As shown in FIG. 2B, in the collaboration stage 205, users can work together to explain what is wrong, provide code samples, and explain what to fix or solve. For example, at step 218 of stage 205, the other users read the project feed. At step 220 of stage 205, one of the other users' comments on an actor and explains how to fix it to the user. At step 222 of stage 205, one of the other users points out missing code and provides it to the user to drag it into the project. At step 224 of stage 205, the user incorporates feedback from other users into the project.

In the resolution stage 207, a solution is found and the project can be fixed or updated, and the shared session for the project can be completed. For example, at step 226 of stage 207, other users confirm that the changes made to the project operate correctly. At step 228 of stage 207, the user can thank the other users for the help and can end the share of the project. At step 230 of stage 207, the other users receive notice that the share of the project has ended. At step 232 of stage 207, the user continues to finalize the project independently.

Also, as shown in FIGS. 2A and 2B each of the stages has an associated scene and associated actions. For example, in the development stage, a user can create a project, the user can add actors and code to the project, the user can test the project and find errors or bugs or problems in the project, and the user can request for help to fix the errors or bugs, or problems in the project from other users of the collaborative learning system. For example, in the share initiation stage, a user can invite other users to assist with the project (e.g., the user can invite three other users for the project). One of the other users can be prompted with a notification by the inviting user to join that user's project. The user of the project can share a feed and communicate with the user invited and can continue to work on the project. The other user who was invited can independently access the project and work on it too. In the collaboration stage, the invited user can review the work of the inviter user and can suggest updates to the project for the inviter user to try. The invited user can also suggest something is wrong and explain how to fix the problem. That invited user or another invited user can provide a solution or direct the users to a solution. The solution can be a code block that is dragged into the code of the project. The inviter user can incorporate at least part of the feedback from other users. In the resolution stage, the users can confirm that updates or changes to the code of the project work. The inviter user can further communicate with the other users and show appreciation via messages as well as end the sharing of the project. The other users receive a notification of the end of the project sharing. The inviter user can continue to work on the project after the project has ended for the other users.

FIGS. 3 to 18 show graphical user interfaces including aspects of the workflows shown in FIGS. 1, 2A and 2B, in accordance with some embodiments of the present disclosure.

Figure 3:
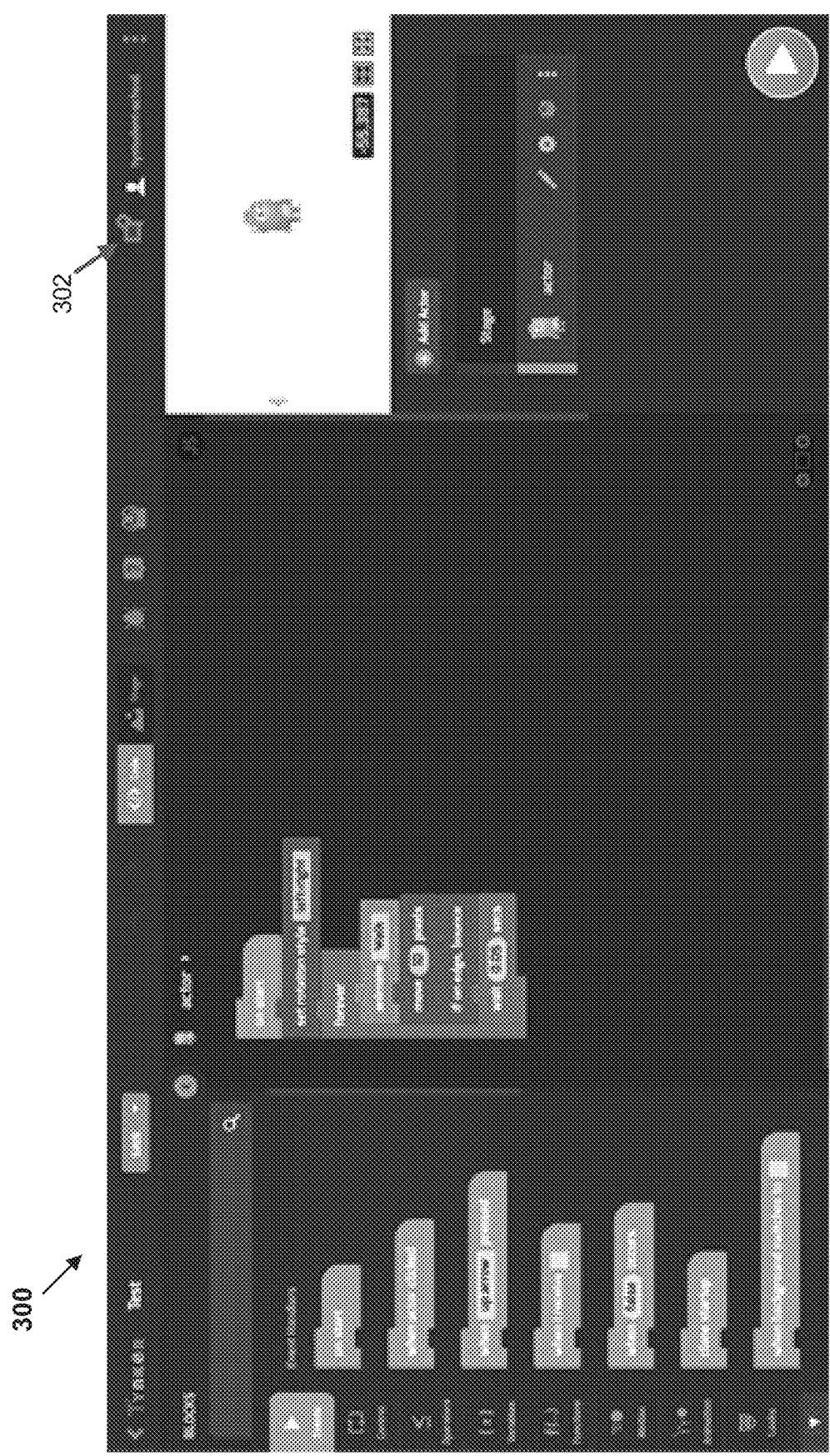
FIGS. 3 to 18 show graphical user interfaces including aspects of the workflows shown in FIGS. 1, 2A and 2B and other parts of the application, in accordance with some embodiments of the present disclosure.

Specifically, FIG. 3 shows a GUI 300 of the programming learning center application 103. In the GUI 300, a computer programming project of a user is displayed with a share button 302 in a toolbar. When the user selects the share button, the selection of the button initiates sharing of the project with other users over a computer network (such as a computer network including the Internet).

Figure 4:
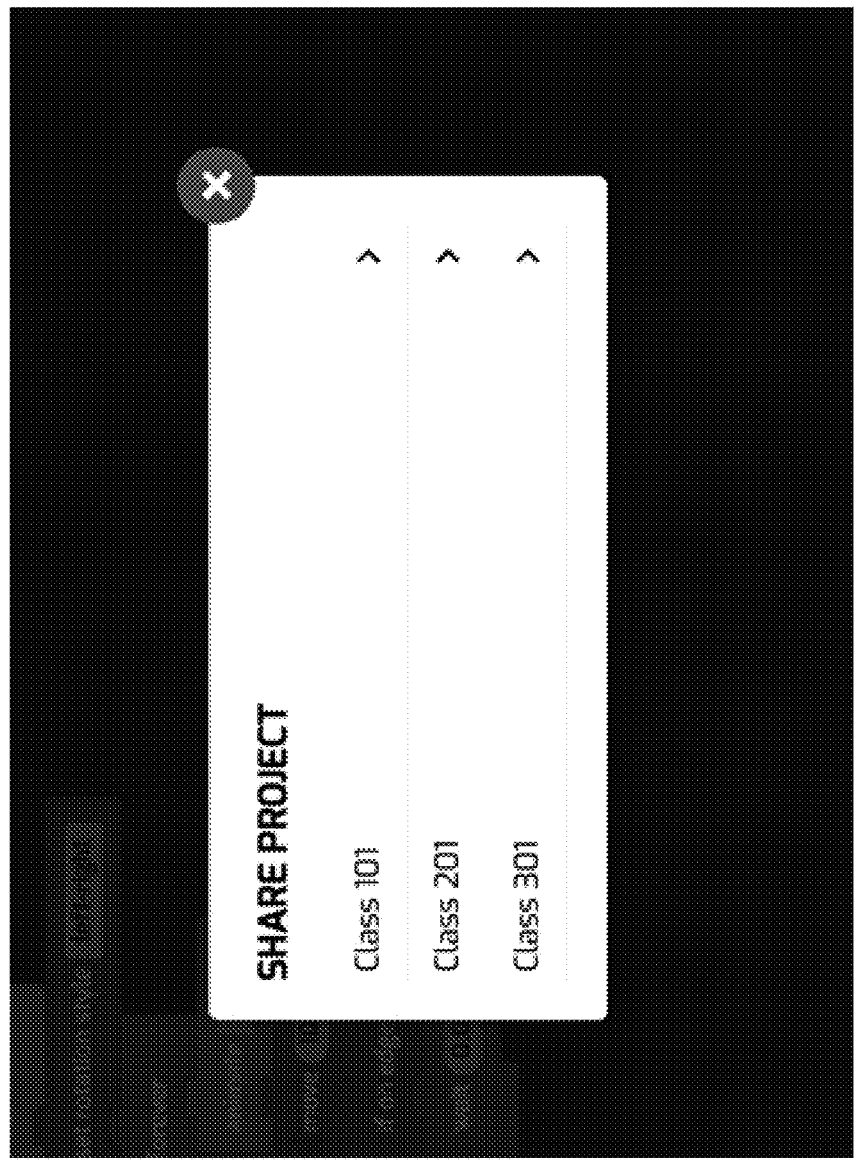

FIG. 4 shows a GUI 400 of the programming learning center application 103. In the GUI 400, the user can choose another user or group of users for sharing the computer programming project. The GUI 400 can occur after the share button 302 is selected. When the user selects a group or user (such as 'class 101', 'class 201', or 'class 301'), the selection of one of the users or groups initiates sharing of the project with that user or group over the computer network.

Figure 5:
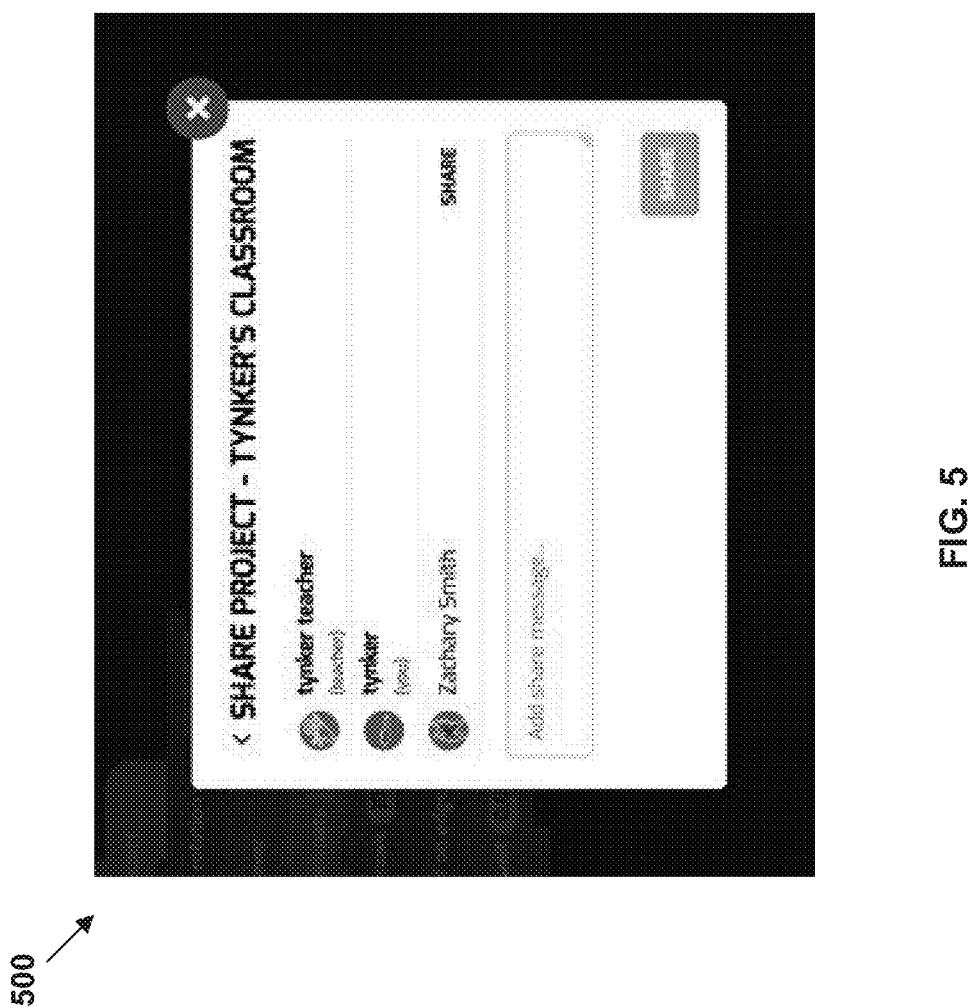

FIG. 5 shows a GUI 500 of the programming learning center application 103. In the GUI 500, the user can choose a specific user within a group, such as a specific user within a class of computer programming students. This is where the user can select students from within a student classroom to share the project with and the project can be shared with a classroom teacher and project owner by default.

Figure 6A:
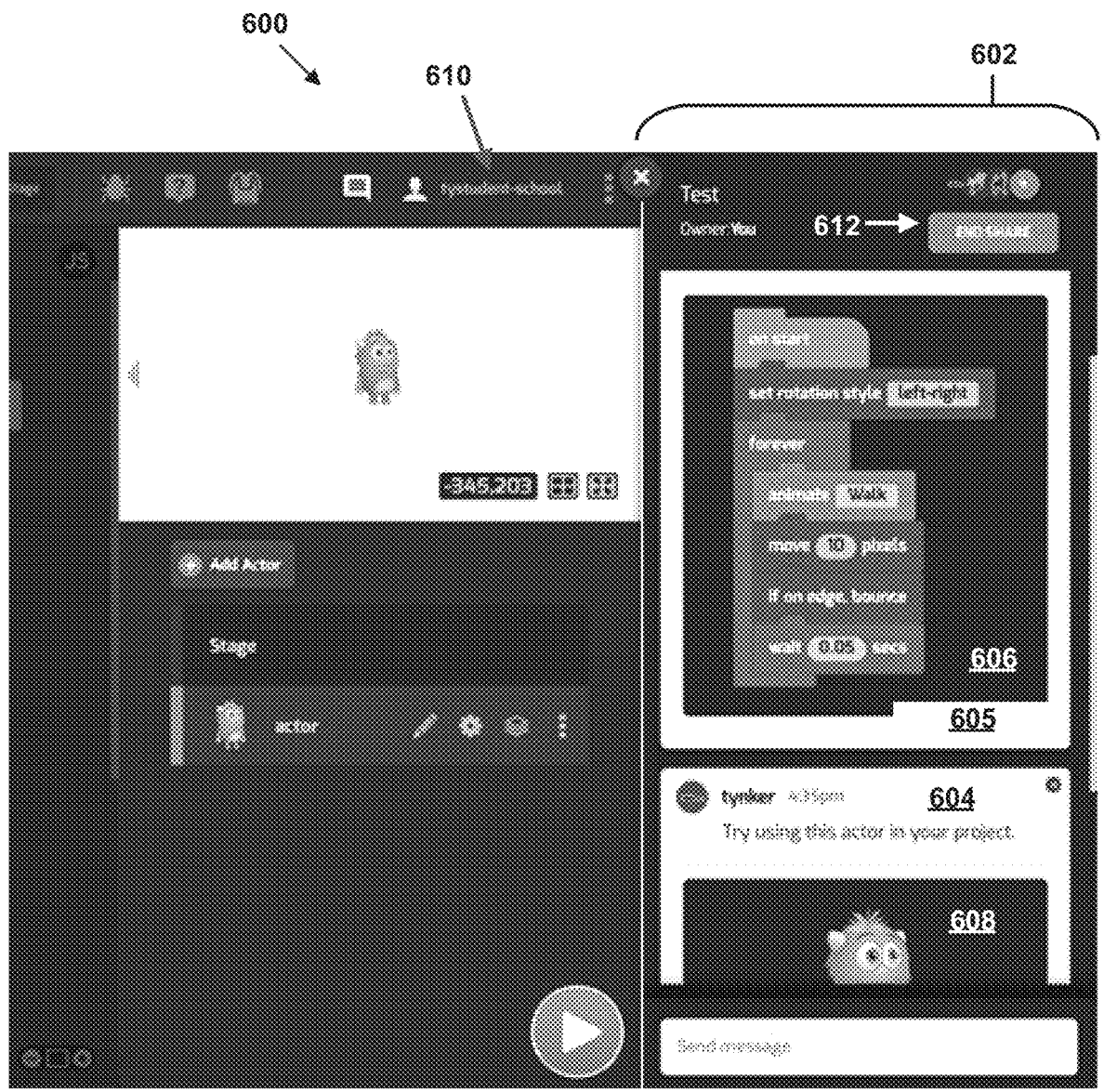
Figure 6B:
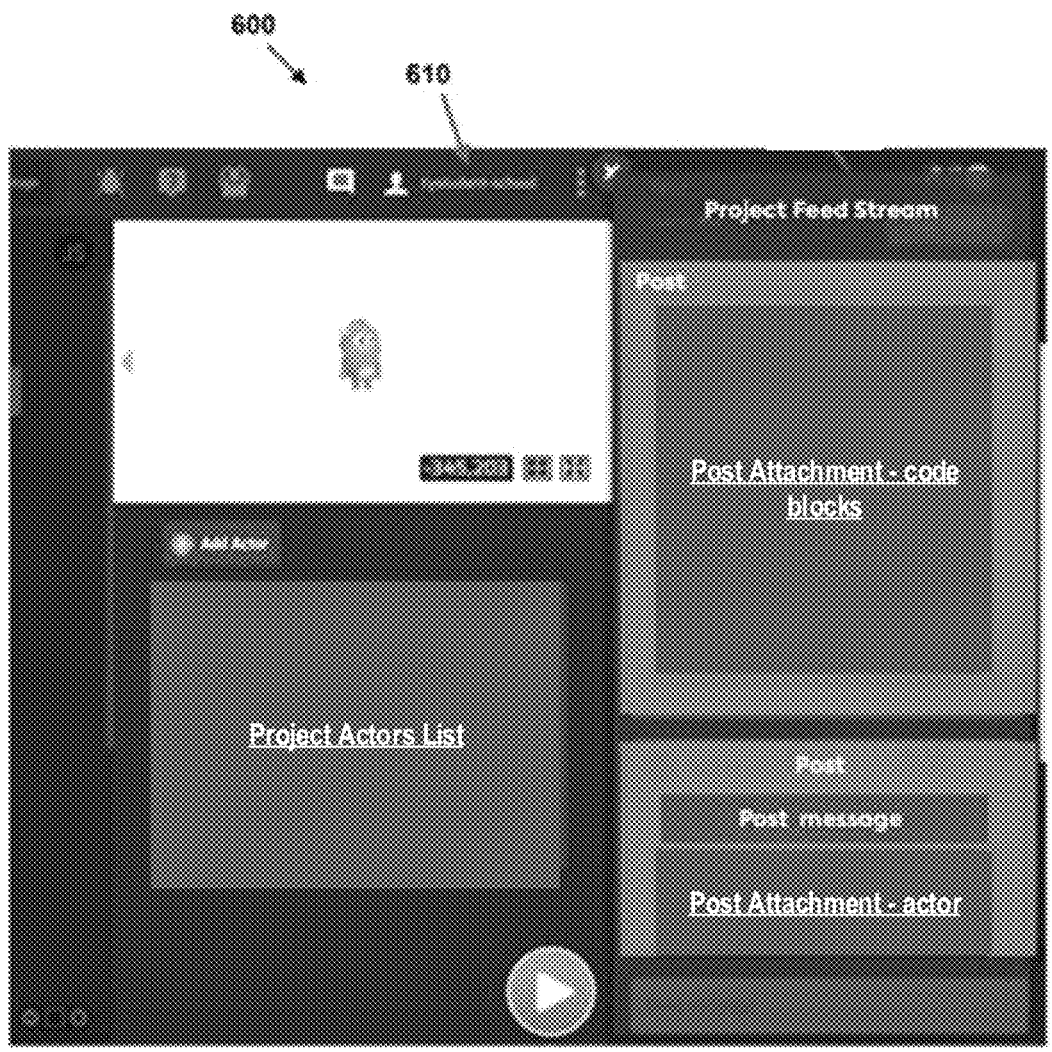

FIGS. 6A and 6B show a GUI portion 600 in GUI 300 of the programming learning center application 103. GUI portion 600 includes a project feed 602 that displays code blocks attachments 606 and actor attachment 608 in the project feed post 604 of the project feed 602. It also displays the current logged in user 610 and it can display share editing and ending buttons in the top right corner than can allow a user to start share editing the project in the feed or end sharing of editing of the project. As shown the user or owner of the project can end the sharing by selecting the end sharing button 612. The GUI portion 600 is a portion of GUI 300.

Figure 7:
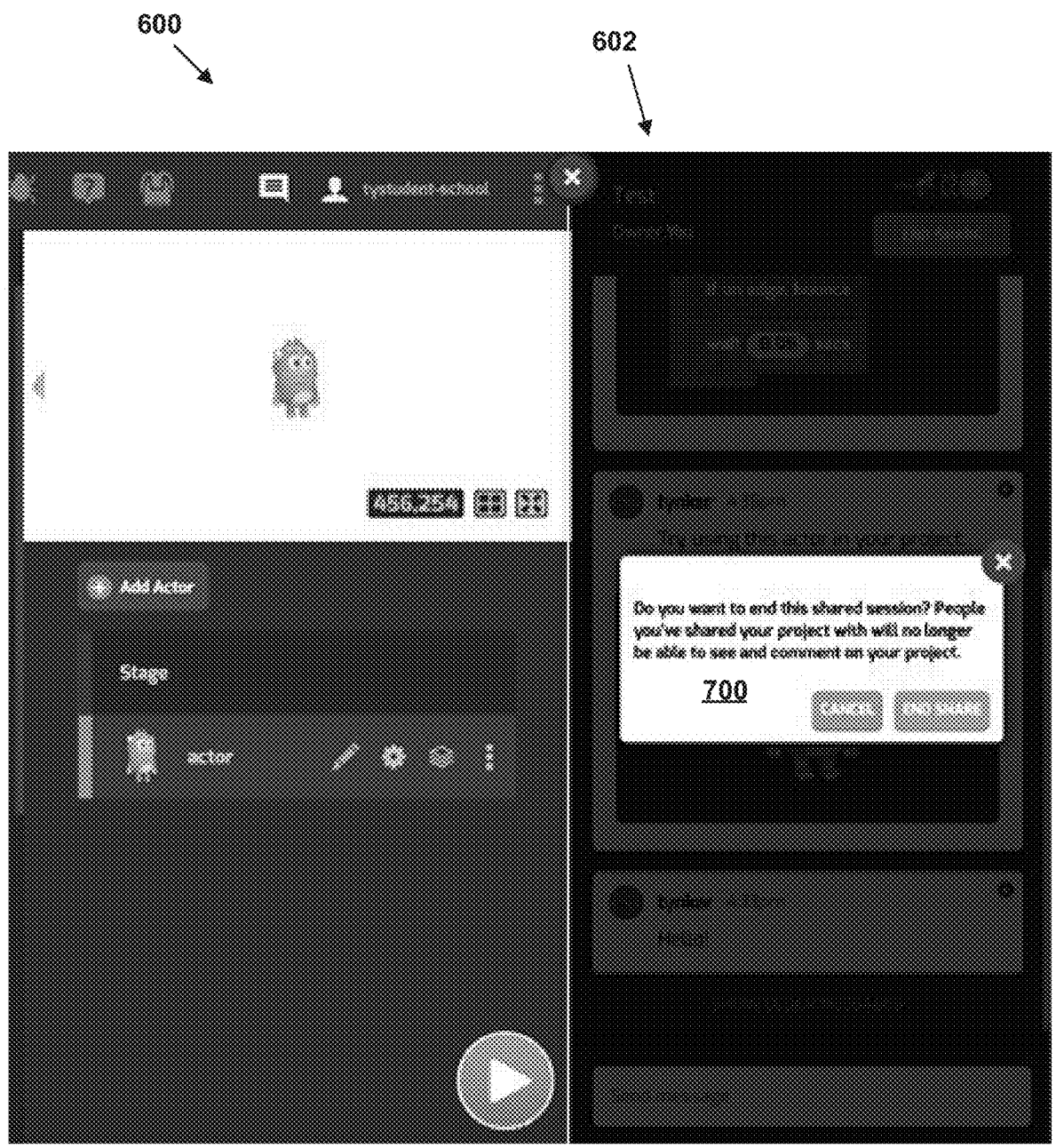

FIG. 7 shows a GUI 700 of the programming learning center application 103 that provides a prompt asking the user if the user wants to end project sharing. The GUI 700 can occur within the feed of GUI portion 600 after the end sharing button 612 is selected.

Figure 8:
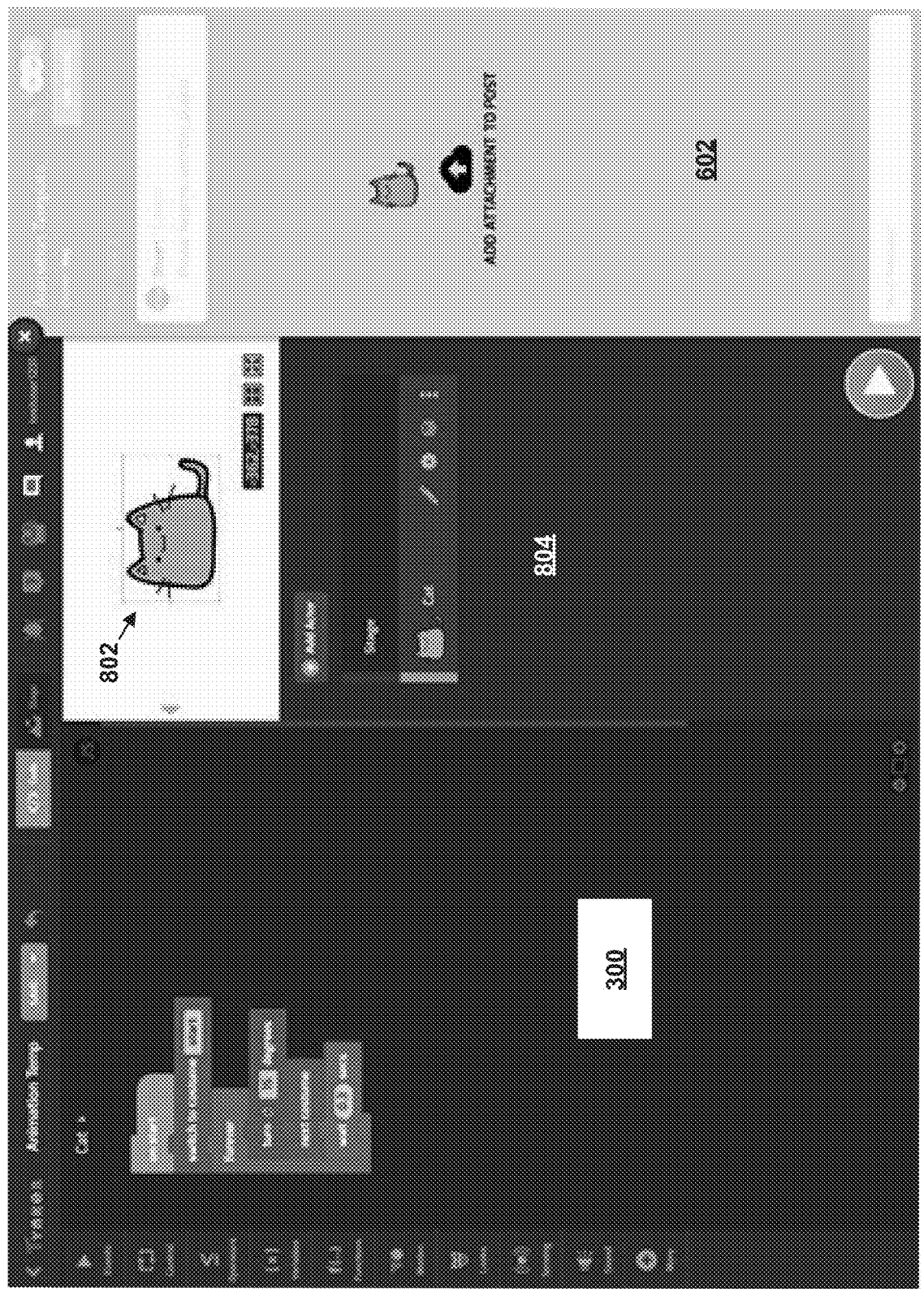

FIG. 8 shows GUI 300 in another state from FIG. 3 with the project feed 602 displayed. In FIG. 8, a user is shown dragging an actor 802 into an actor list 804. The actor 802 can be added as post attachment when dropped into the feed.

Figure 9:
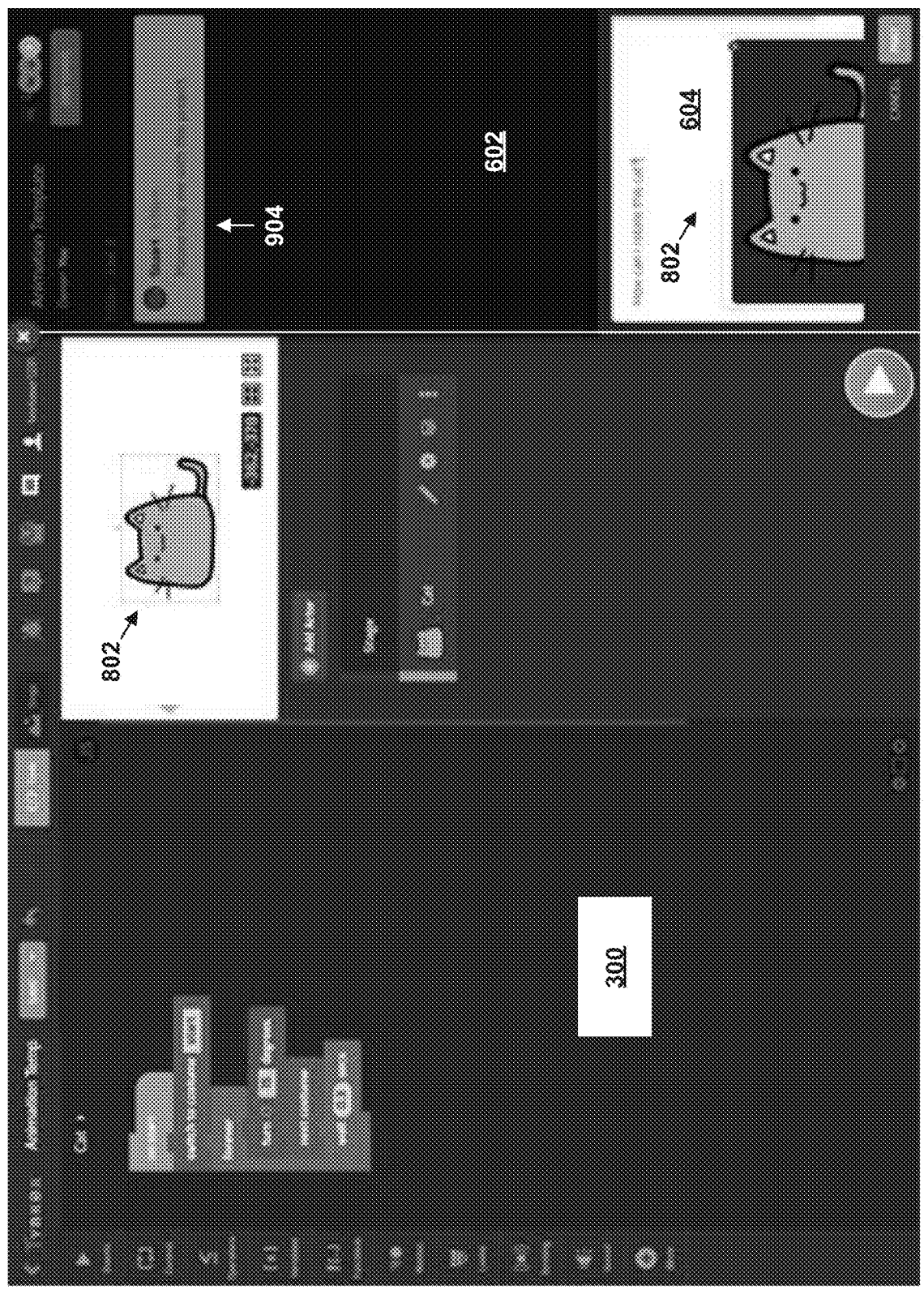

FIG. 9 shows GUI 300 in another state from FIGS. 3 and 8 with the project feed 602 displayed and the actor 802 is being added as an attachment to a project feed post 604 after being dropped in the project feed 602.

Figure 10:
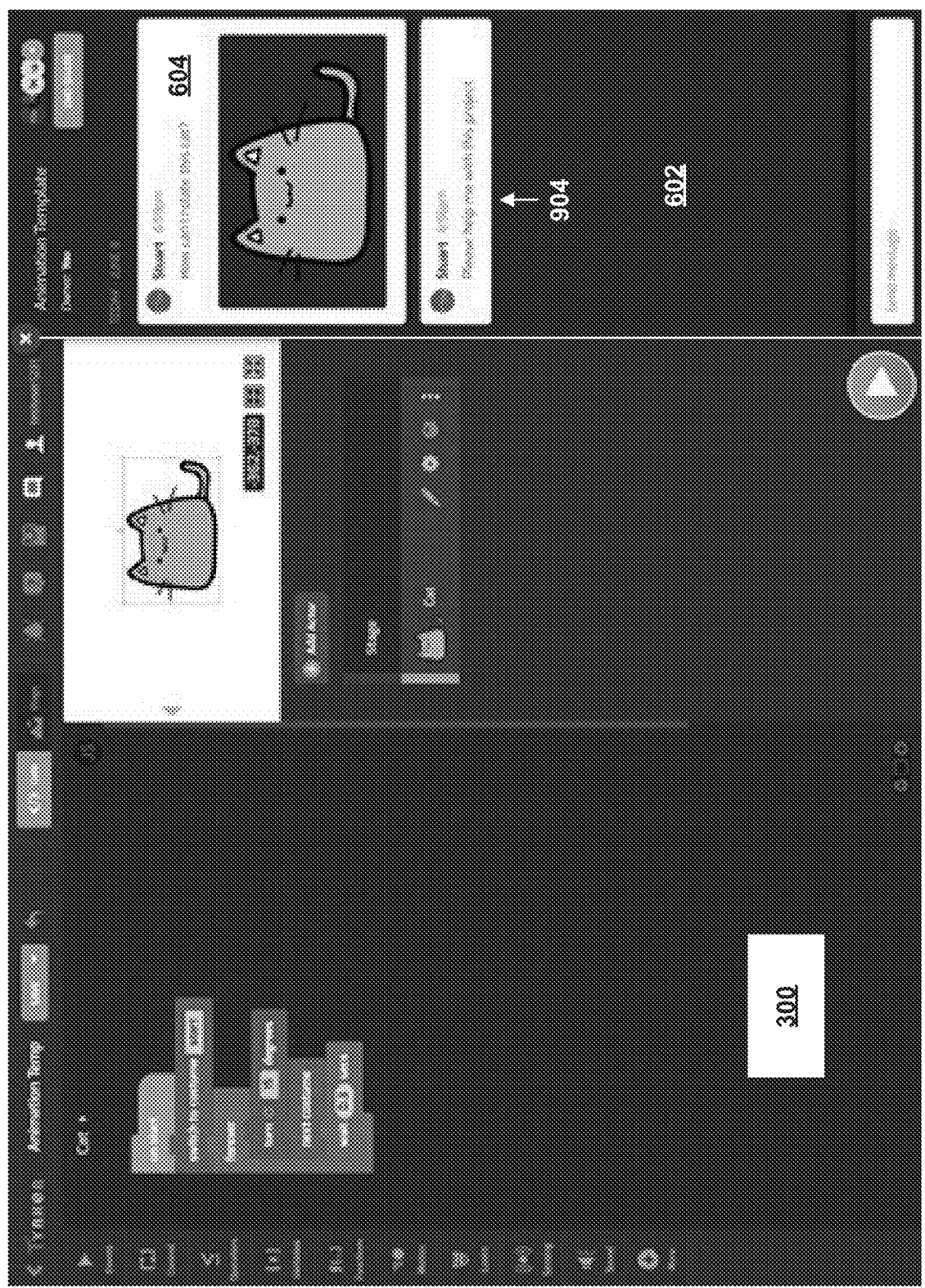

FIG. 10 shows GUI 300 in another state from FIGS. 3, 8, and 9 with the project feed 602 displayed and the actor 802 was added as an attachment to a project feed post 604 after being dropped in the project feed 602. As shown in FIG. 10, the post 604 is not obstructed by the action of adding the actor to the post. In FIG. 9, the post 604 is obstructed partially by the action of adding the actor to the post. As shown in FIG. 9, a message 904 in the post 604 is obstructed by being shown in a different shade of color than it is in FIG.

Figure 11:
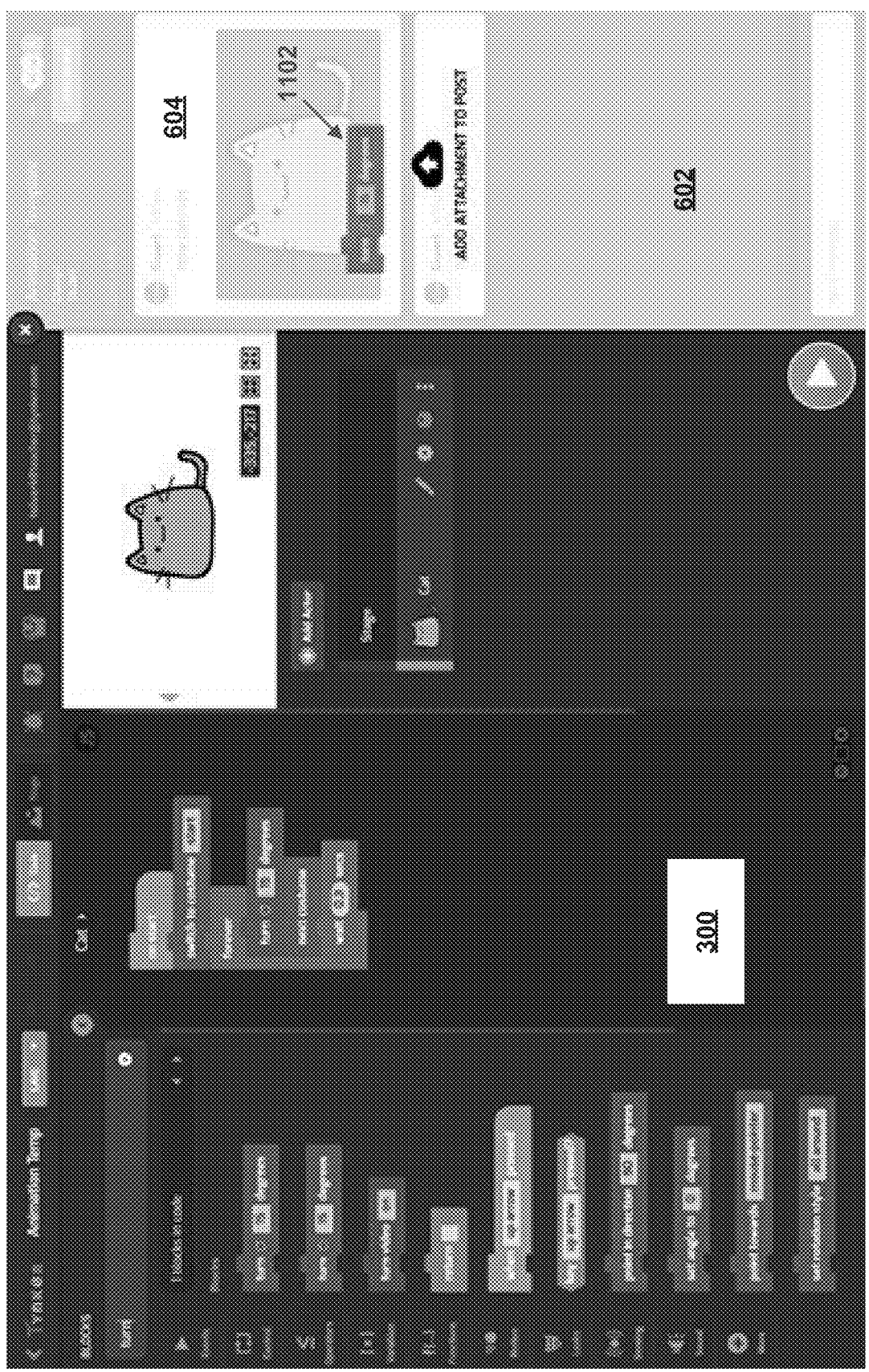

FIG. 11 shows GUI 300 in another state from FIGS. 3, 8, 9, and 10 with the project feed 602 displayed and a user dragging the computer program block 1102 into the project feed post 604 of the project feed 602 (such that the block 1102 can be added as a post attachment).

Figure 12:
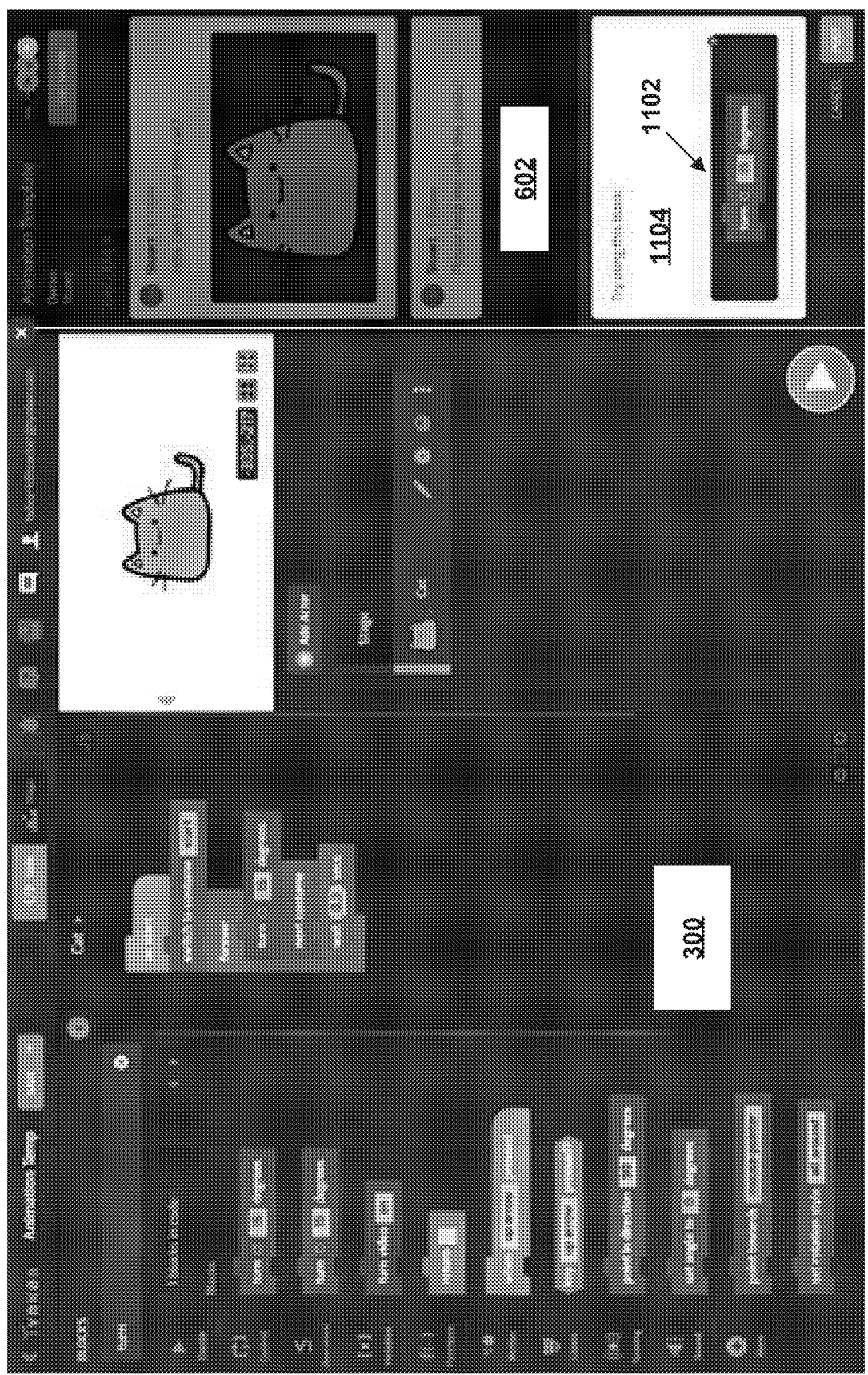

FIG. 12 shows GUI 300 in another state from FIGS. 3, 8, 9, 10, and 11 with the project feed 602 displayed and where the computer program block 1102 is being added to a post 1104 of the project feed 602 to become an attachment.

Figure 13:
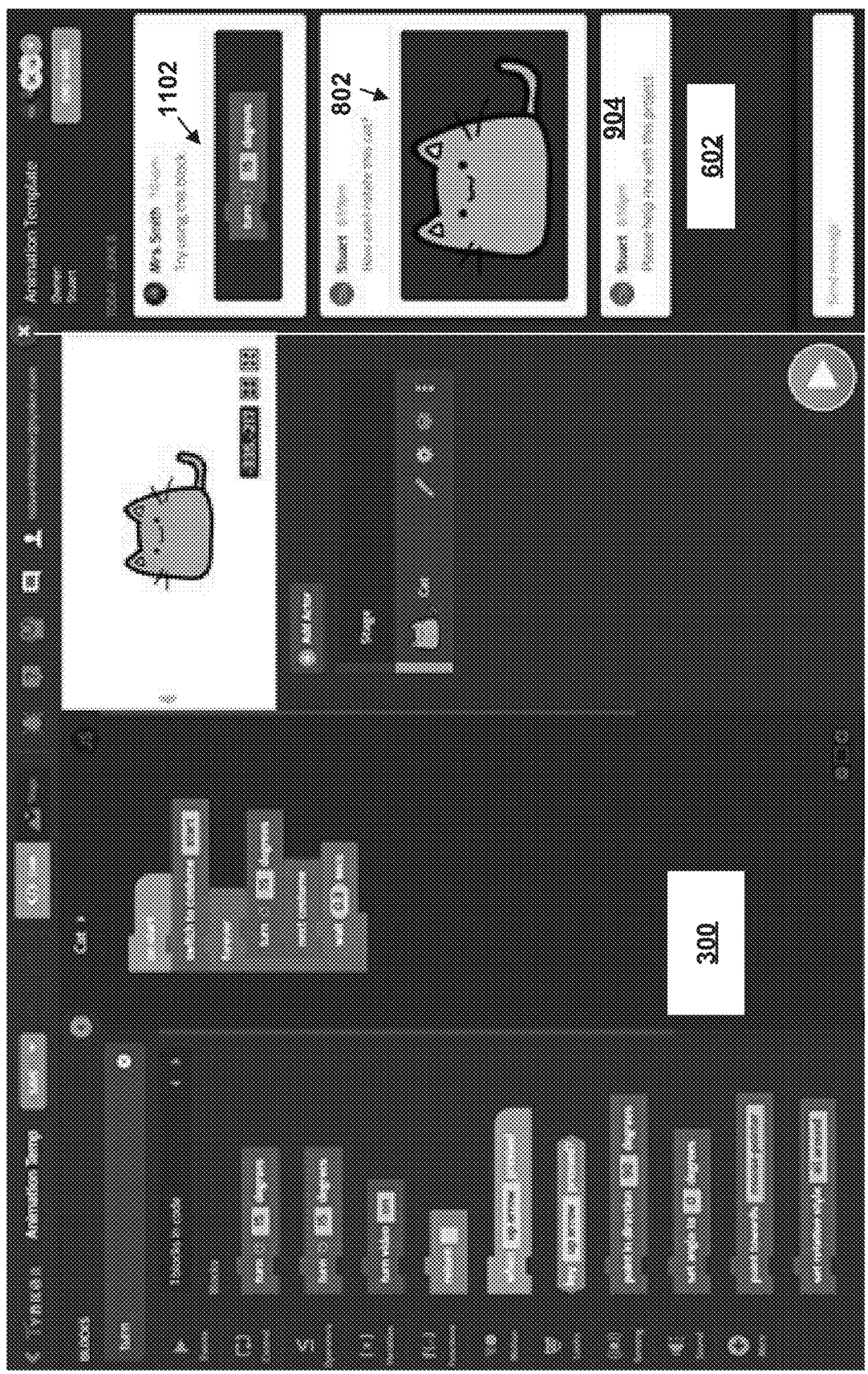

FIG. 13 shows GUI 300 in another state from FIGS. 3, 8, 9, 10, 11, and 12 with the project feed 602 displayed and where the computer program block 1102 has been added to the project feed post 604 of the project feed 602 as an attachment. As shown in FIG. 13, the post 604 is not obstructed by the action of adding the computer program block 1102 to the post. In FIG. 12, the post 604 is obstructed partially by the action of adding the block 1102 to the post. As shown in FIG. 12, the message 904 and actor 802 in the post 604 is obstructed by being shown in a different shade of color than it is in FIG. 13.

Figure 14:
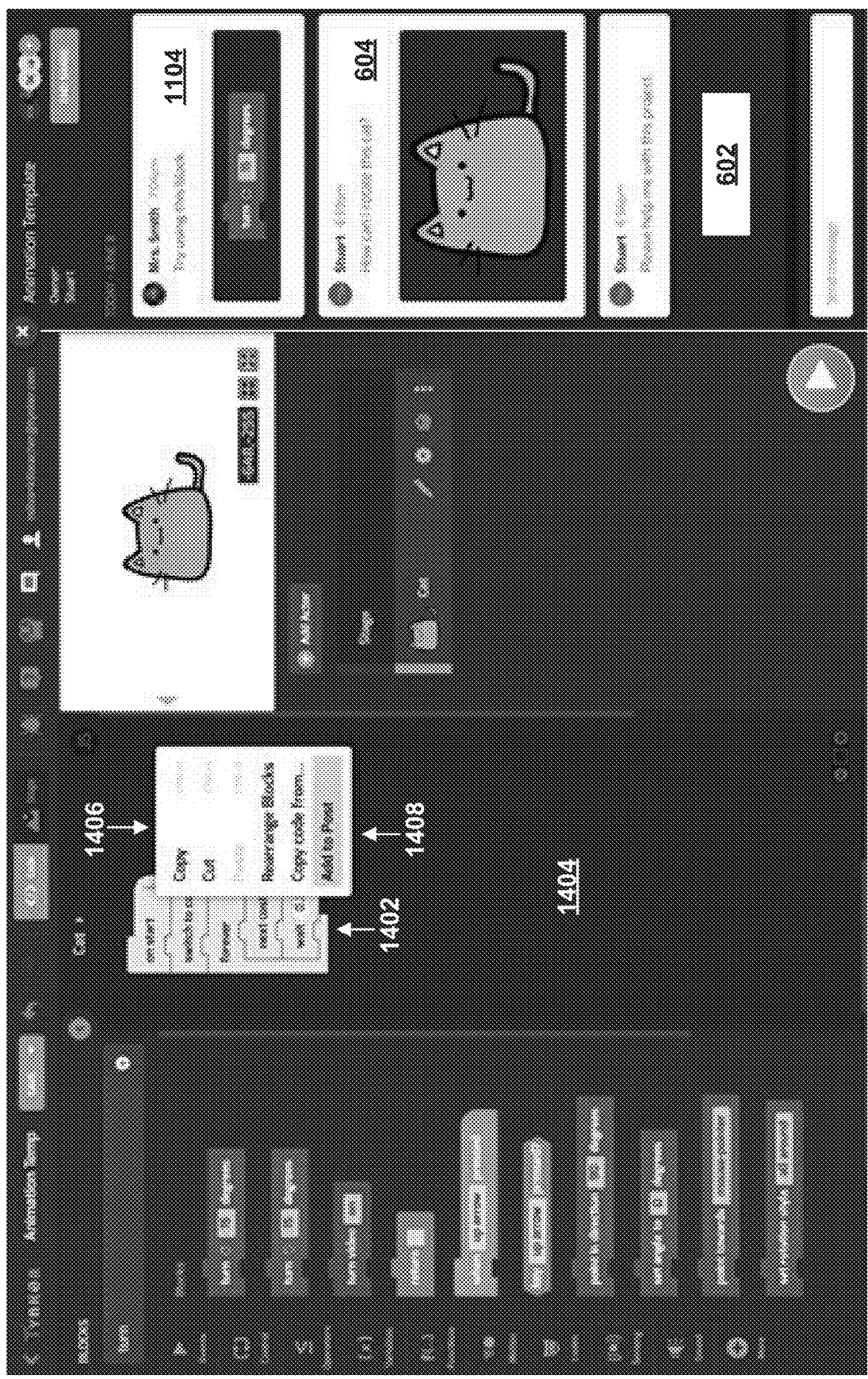
Figure 15:
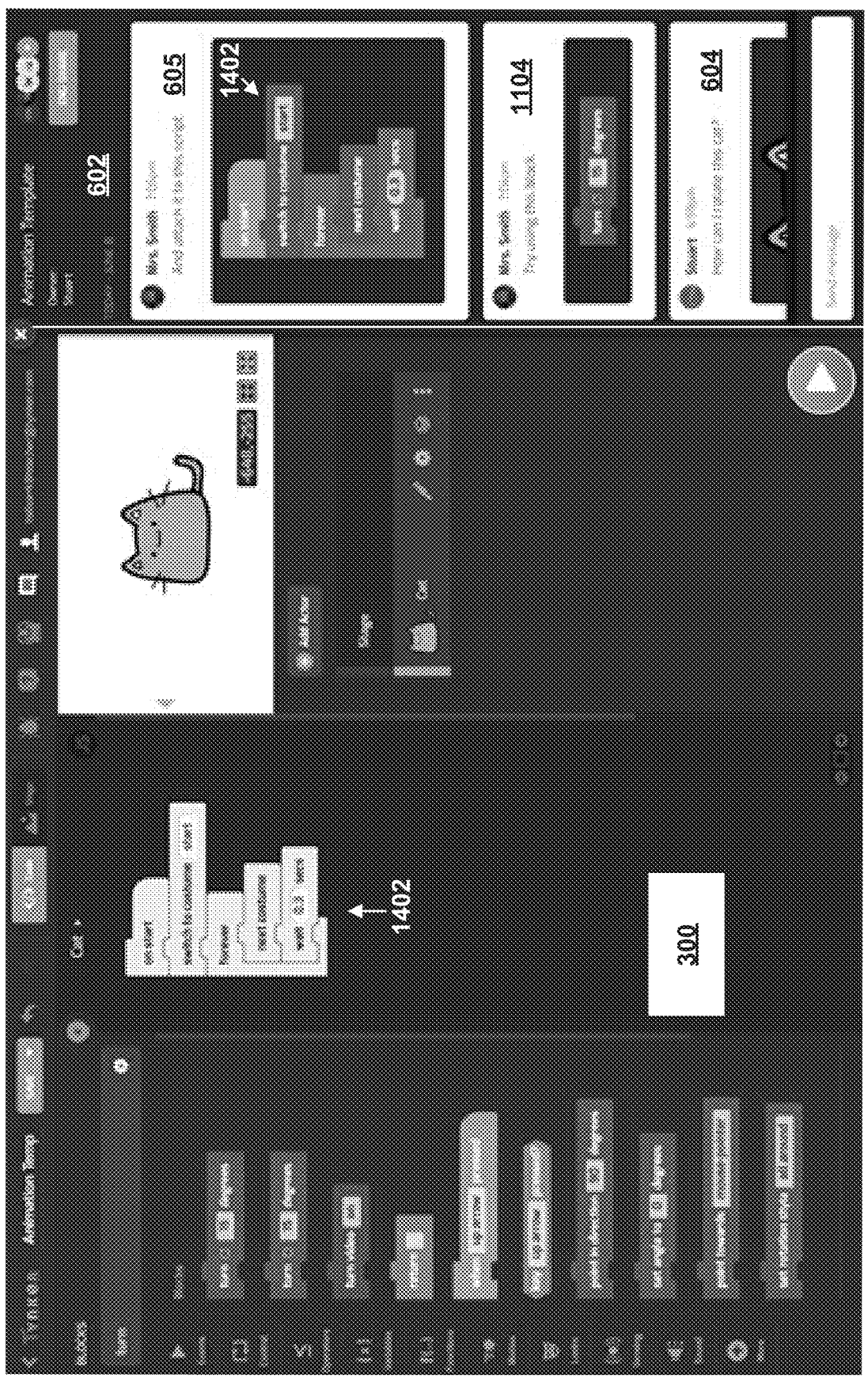

FIG. 14 shows GUI 300 in another state with the project feed 602 displayed and a user adding the code blocks 1402 from a user's code editor portion 1404 of GUI 300 as a new post attachment through an "Add to Post" option 1408 of a block editor right-click menu 1406. FIG. 15 shows GUI 300 in another state from FIG. 14 with the project feed 602 displayed and the code blocks 1402 added to project feed post 605 as an attachment of the post.

Figure 16:
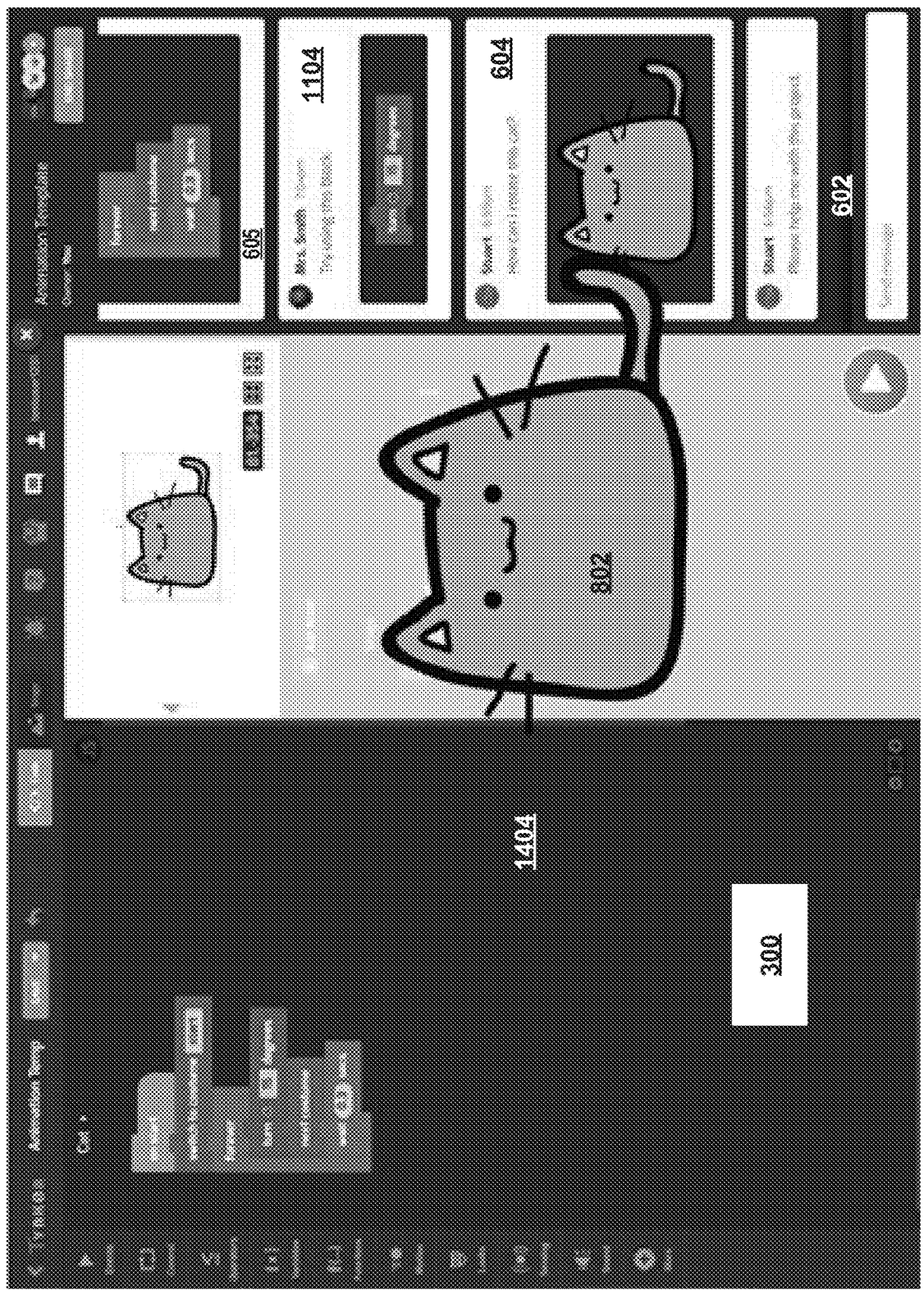

FIG. 16 shows GUI 300 in another state with the user dragging the actor 802 out of feed post attachment and into the project of the user by moving an icon of the actor 802 from the project feed post 604 of the project feed 602 into the user's code editor portion 1404 of GUI 300.

Figure 17:
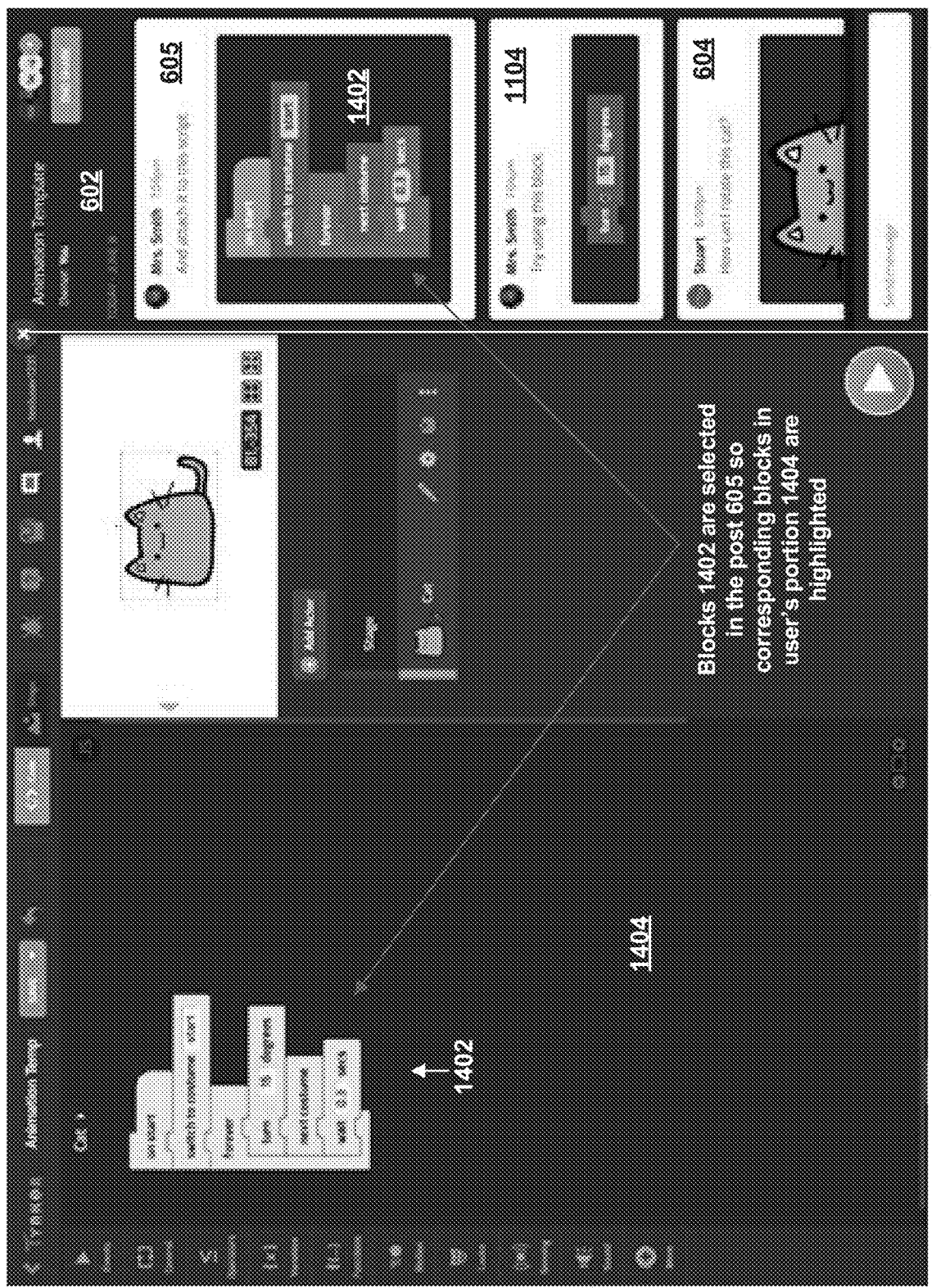

FIG. 17 shows GUI 300 in another state with the code blocks 1402 being highlighted when a script is clicked in the project feed post 604 (such as when shared blocks still exist in a receiver's end).

Figure 18:
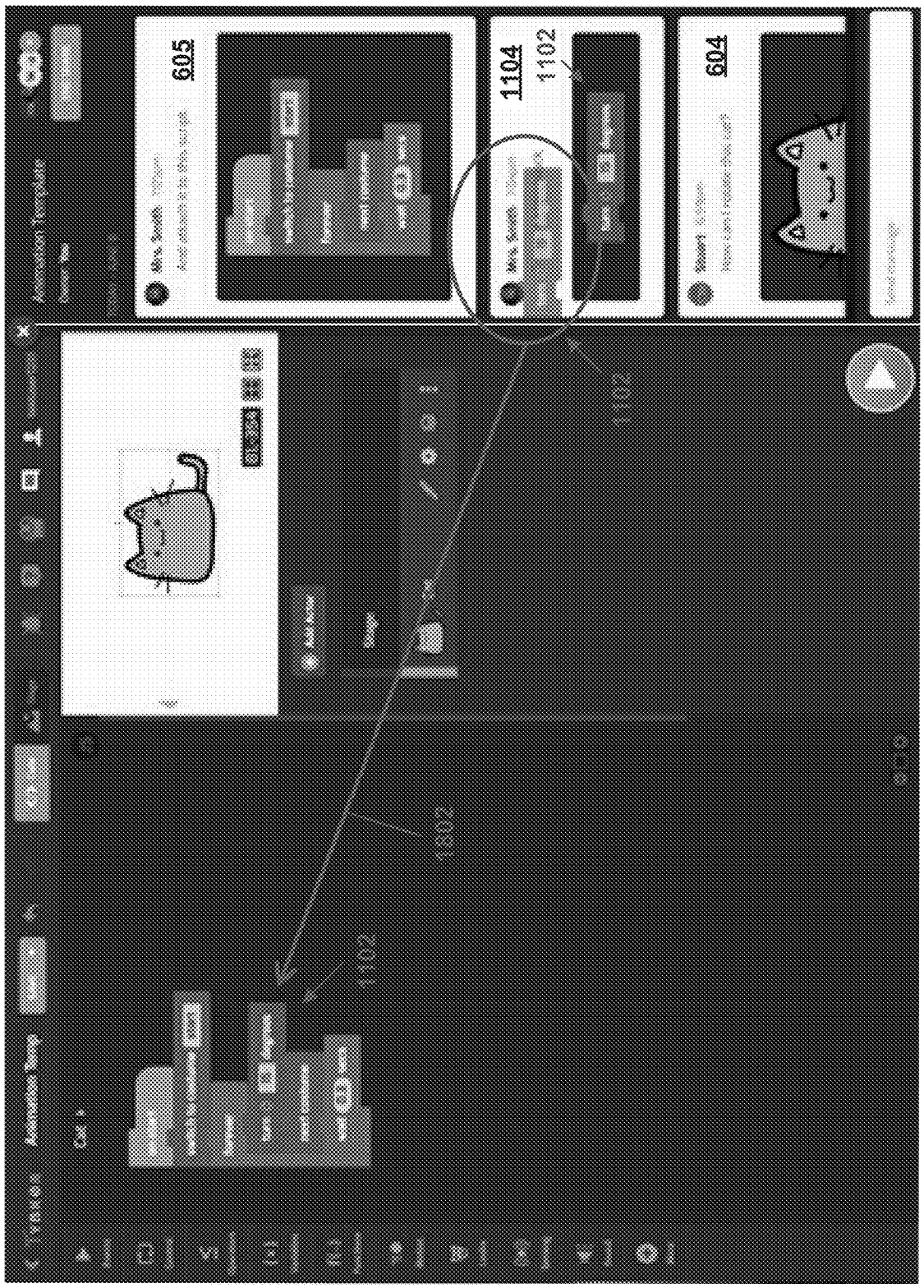

FIG. 18 shows GUI 300 in another state with the computer program block 1102 being dragged out of project feed post attachment so that it can be added to the blocks in the user's code editor portion. The block 1102 being dragged is circled for emphasis in FIG. 18. And, the block that is being dragged is also shown in the blocks in the user's code editor portion 1404. The red arrow 1802 shows how the block can be dragged from a post in a feed to the editor portion of the user.

Figure 19:
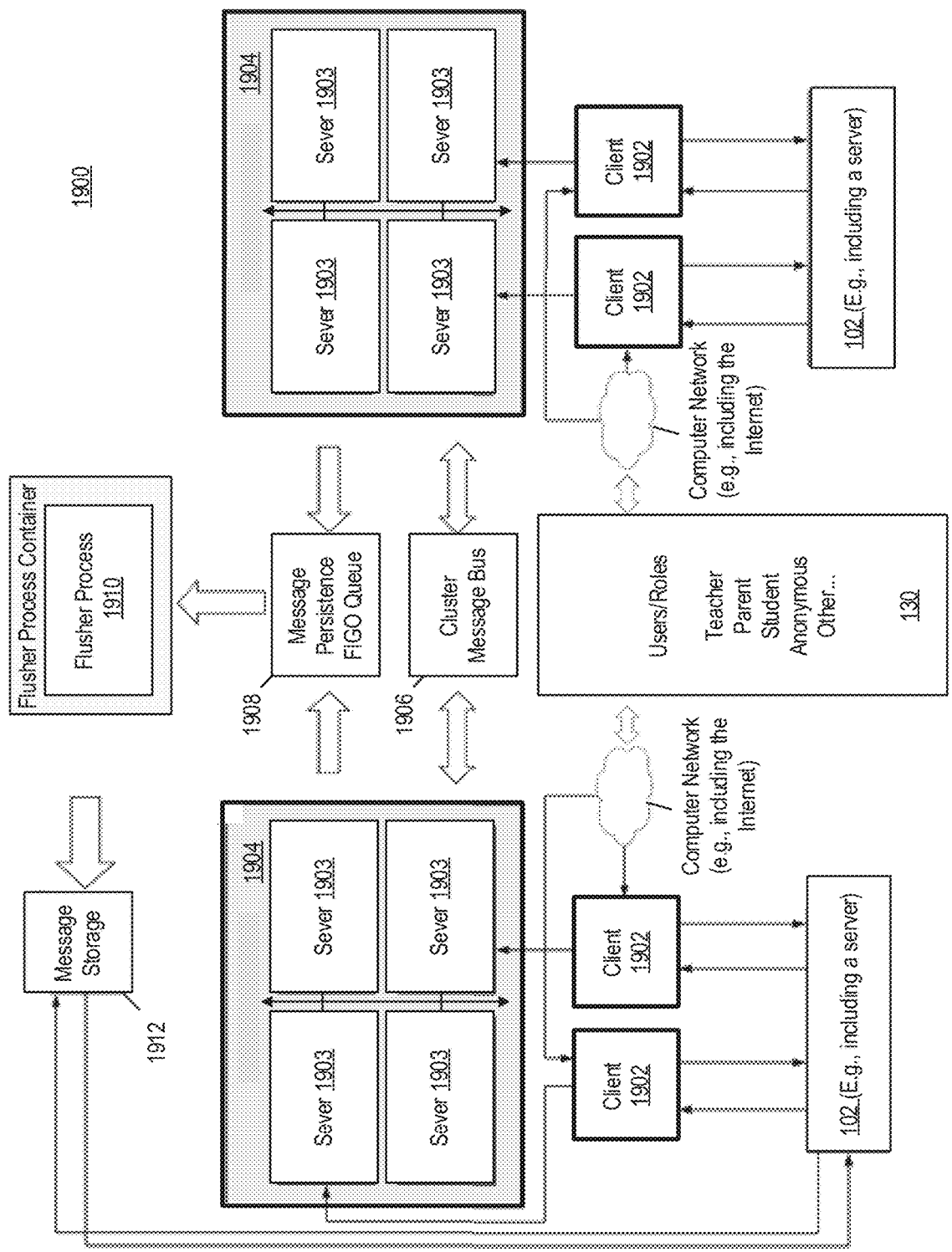
FIG. 19 illustrates an example workflow of sending messages between clients and servers of the collaborative learning system which includes methods of the collaborative learning system, in accordance with some embodiments of the present disclosure.

FIG. 19 illustrates an example workflow 1900 of sending messages between clients and servers (such as servers of the management computing system 102 of FIG. 1) of the collaborative learning system which includes methods of the collaborative learning system, in accordance with some embodiments of the present disclosure.

The management computing system 102 can relay messages between clients and client devices of the collaborative learning system. This can be done in real-time and still allow messages to be retrieved later on in stored message history. This can be any kind of message. It can be messages that end up being displayed to the user, or other types of messages not displayed to the user such as inter-process communication (IPC) messages (e.g., messages used to sync the state between two collaborative project sessions). The management computing system 102 can manage the sending and receiving of messages between users interacting in a feed. The management can be done in real-time. Also, the management computing system 102 can archive messages for retrieval after communications. The system 102 can also provide management of messages services (such as storage and deletion of messages on or off a schedule). The system 102 can also enforce access-control (such as not allowing users to read or write from feeds according to permissions).

The flow diagram of FIG. 19 shows client devices of the collaborative learning system (e.g., client devices 1902). Users of the collaborative learning system interact with clients or client devices of the system (e.g., via web browser, mobile app, etc.) as interfaces to features that are enabled by the management computing system 102—namely the feeds and project sharing features described herein. The clients or client devices can retrieve cryptographically signed user data, namely access-control constraints, which is then provided to the management computing system 102 while joining a channel so that the server of the system 102 knows which rights the user has regarding that channel (e.g., read/write/delete permissions).

Also, the management computing system 102 is responsible for serving data, assets, and processing business logic rules for the collaborative learning system. In the workflow 1900, the system 102 provides for authentication between actors of the collaborative learning system (such as by providing authentication data to connected devices in the collaborative learning system).

A management server cluster 1904, as shown in FIG. 19, includes a group of servers 1903 that can manage a number of processes of the management computing system 102. The processes can handle messages sent by the client devices (e.g., the client devices 1902), relaying them to the appropriate users (e.g., via programming learning center application 103), and queuing them to be saved to persistent storage. Each cluster handles messages from different clients as a means of being able to scale horizontally and serve any number of messages per second by scaling out. There are intra and extra-cluster mechanisms to communicate between clients connected to different processes.

A cluster-message bus 1906, as shown in FIG. 19, is a mechanism for processes of the management computing system 102 to be able to send messages to clients that are not connected to the system 102 directly. The cluster-message bus 1906 can be implemented through multiple mechanisms—an example would be a Redis PUB/SUB message queue. Clients' connections are shared to make sure that they always land on a specific process of the system 102 depending on certain criteria (such as IP address). Multiple clients can join to send or receive messages to or from the same channel of the system 102 (e.g., a shared project's feed being used by multiple users, whose connections are being handled by different processes). This allows sharing. Whenever a message is sent by a process, it is sent to the clients joined to the target channel of the system 102 and it is sent to the cluster-message bus 1906 which can be used by the processes of the system 102. The sharing can include checking for existing connections to the target channel within a process and relaying that message.

A message persistence FIFO queue 1908, as shown in FIG. 19, can queue the processes of the management computing system 102 and add messages that have been successfully relayed. The queue 1908 can later be used by a flusher process 1910. The flusher process 1910 can save data of the queue to persistent storage (such as a database). The flusher process 1910 uses the message persistence FIFO queue 1908 and saves the contents to persistent storage. The flusher process 1910 provides relaying and flushing of messages which are two decoupled processes to remove bottlenecks between when a message is received to when it is relayed to other clients.

Message storage 1912, as shown in FIG. 19, stores the messages saved by the flusher process 1910. When a client accesses a previously existing channel, it retrieves the old messages directly from the message storage 1912 without going through the management computing system 102. The direct retrieval of the messages removes a burden from the server(s) of system 102—such as for performance reasons.

Figure 20:
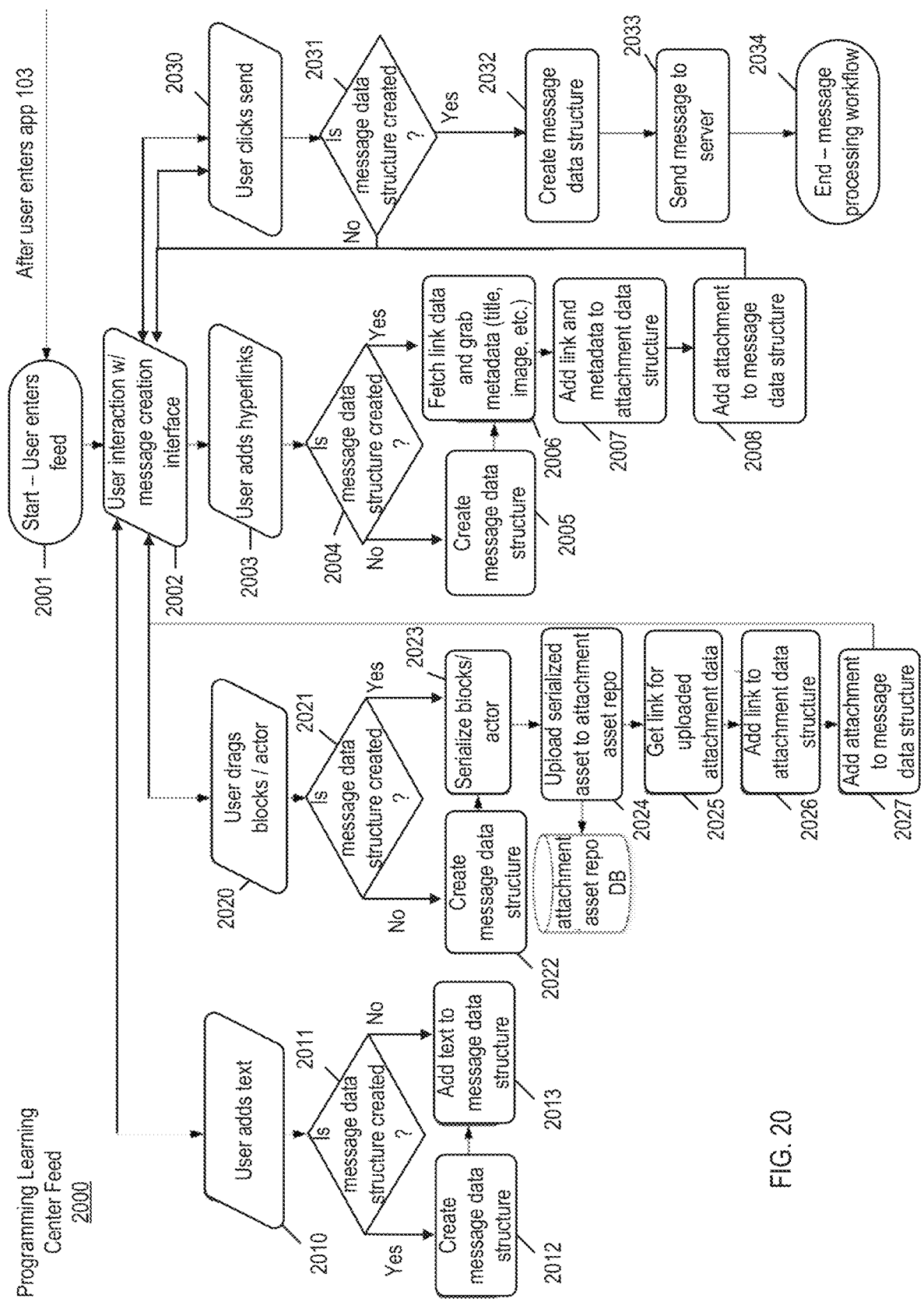
FIGS. 20 to 22 illustrate example workflows of communicating and processing messages in the collaborative learning system which includes methods of the collaborative learning system, in accordance with some embodiments of the present disclosure.
Figure 21:
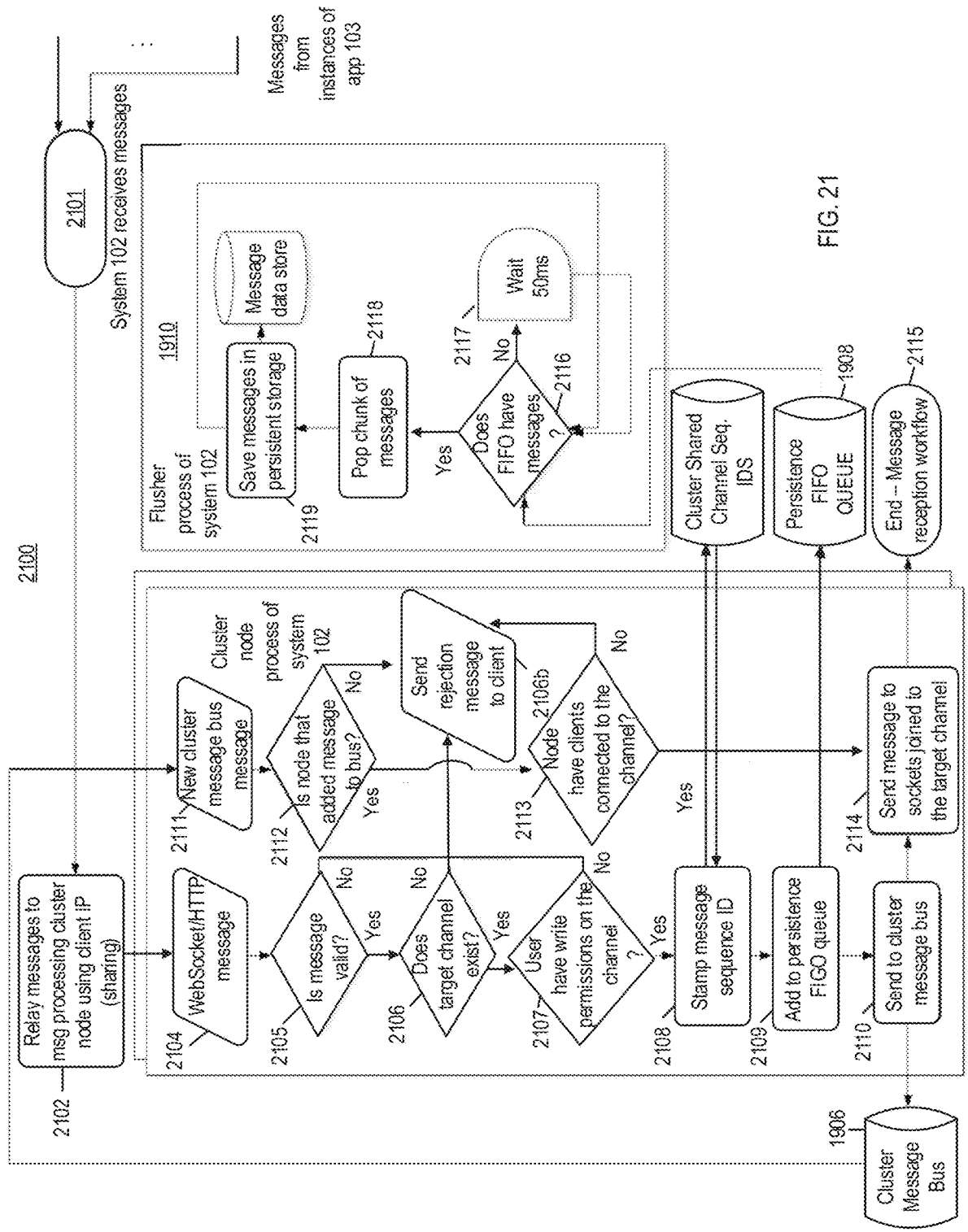
Figure 22:
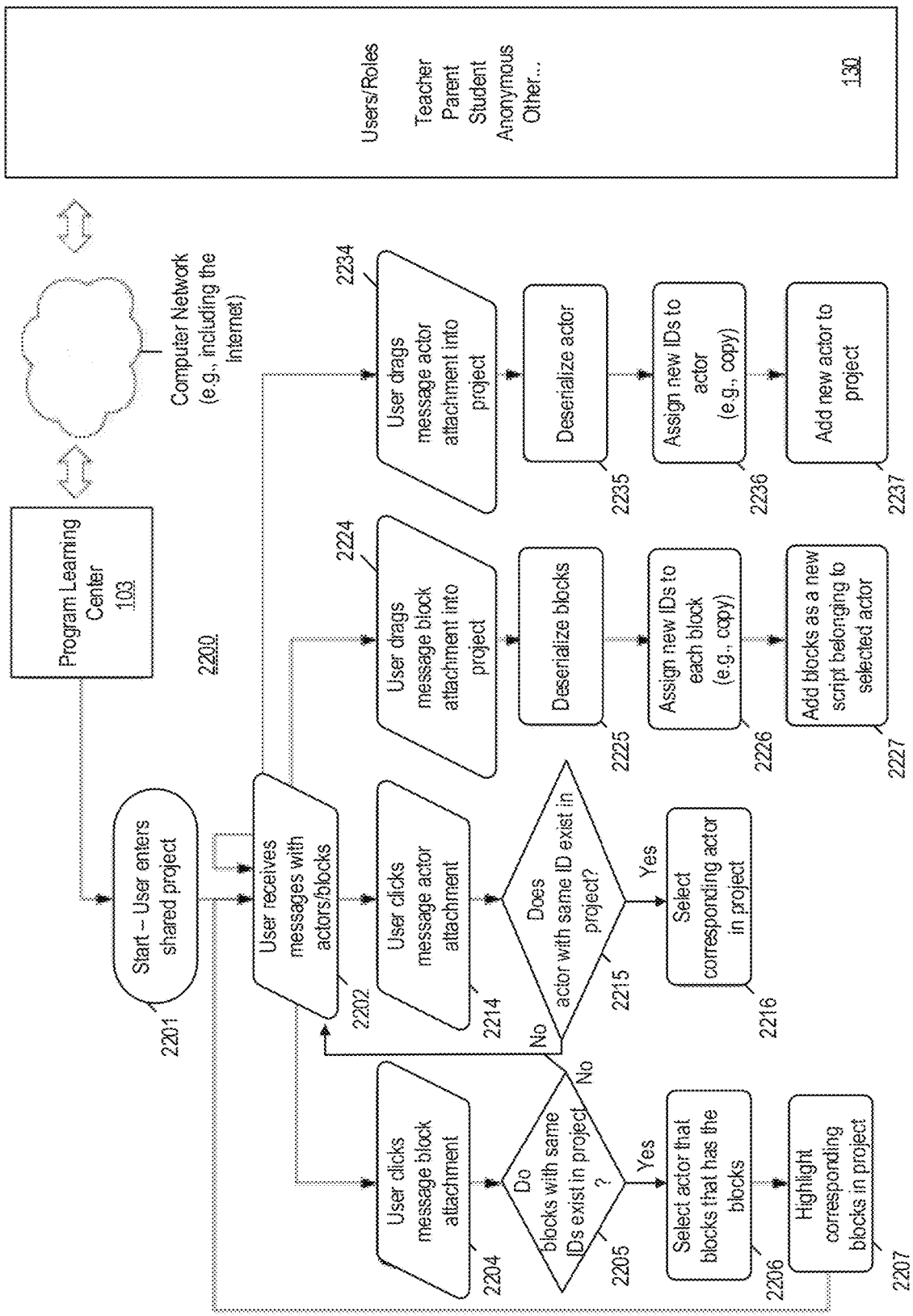

FIGS. 20 to 22 illustrate example workflows of communicating and processing messages in the collaborative learning system which includes methods of the collaborative learning system, in accordance with some embodiments of the present disclosure. The workflows of these figures relate to context-aware attachments. The collaborative learning system allows sending messages with regular attachments that open the correct context when used (e.g., YOUTUBE links will open a YOUTUBE player to play the video). For instance, attachments that are tied to a context they were sent from and/or are received in will open in the context (e.g., add blocks or actors from a project to a message and these can be added back to the receiver's project since context is tracked in the workflows).

The process of sending messages with context-aware attachments goes through a send message process that includes composing a message, adding attachments, and sending the message to the management computing system 102 for processing, persistence, and relaying. The process of sending messages with context-aware attachments goes through a server message process which includes receiving messages from clients, processing them, relaying them to destination clients, and saving them in persistent storage. The process of sending messages with context-aware attachments goes through a receive message process which includes receiving a message from system 102, parsing it, and then displaying the message to a user.

FIG. 20 shows process 2000, which is implement by a feed of the collaborative learning system such as the feeds described herein. The feed can also be implemented via the programming learning center application 103 and the management computing system 102. At step 2001, process 2000 starts with a user entering the feed via a GUI of programming learning center application 103. At step 2002, the user interacts with a message creation interface, via the GUI. At step 2003, the user can add hyperlinks to the message, via the GUI. At step 2004, the programming learning center application 103 or the system 102 determines whether the message data structure for the message is created. If it is not created, at step 2005, the application 103 or the system 102 creates a message data structure. At step 2006, when the data structure is created, the system 102 or app 103 continues with fetching link data and retrieving metadata (e.g., title, image, etc.). At step 2007, the system 102 or app 103 adds link and metadata to an attachment data structure. At step 2008, the system 102 or app 103 adds an attachment to a message data structure.

After step 2002 (including the user interacting with a message creation interface), the user can, at step 2010, add text to the message. At step 2011, the programming learning center application 103 or the management computing system 102 determines whether the message data structure for the message is created. If it is not created, then at step 2012, the app 103 or system 102 creates a message data structure. Otherwise, at step 2013, the app 103 or system 102 adds the text to message data structure.

After step 2002 (including the user interacting with a message creation interface), the user can, at step 2020, drag blocks to the feed via the GUI of the programming learning center application 103. At step 2021, the app 103 or system 102 determines whether the message data structure for the message is created. If it is not created, at step 2022, the app 103 or system 102 creates a message data structure. Otherwise, at step 2023, the app 103 or system 102 serializes blocks and/or actor to associate it with the message data structure. The serialization can occur by serializing the block or actor into a JSON format, with each block having a unique identifier associated with it. These IDs are the same used in the project it was dragged from, and the IDs can be cross-referenced by the app 103 or the system 102.

At step 2024, the programming learning center application 103 or the management computing system 102 uploads the serialized blocks or the actor to storage, such a cloud storage, and a URL is generated for each block, group of blocks and/or actor. At step 2025, a link is retrieved for uploading of attachment assets. At step 2026, an attachment data structure is created with a data type (which can be a SCRIPT) and a payload (which can be a URL) by the app 103 or system 102. Attachment data types can be flexible and support many different serializable data structures. The clients are responsible for having an interpreter for the data types they support. This allows using the same backend for other unrelated use cases. Attachment payloads can be small and in the case of large payload items such items can be uploaded to a data repository and reference to that data is stored in the attachment instead. For example, messages have a maximum data size to prevent performance issues in the messaging server and can mitigate denial of service attacks. At step 2027, the attachment is added to a message structure by the app 103 or system 102. Message data types are flexible and support any serializable data structure. The clients can be responsible for having an interpreter for the data types they support. This allows using the same backend for other unrelated use cases.

After step 2002 (including the user interacting with a message creation interface), the user can, at step 2030, click a graphical element to send the message to another user, via the programming learning center application 103 and/or the management computing system 102. At 2031, the app 103 or system 102 determines whether the message data structure for the message is created. If it is not created, the processor returns to step 2002. Otherwise, at step 2032, the app 103 or system 102 ties each feed to one or more channels provided by the system 102. The system 102 can relay messages to other listeners (e.g., other users that are seeing the project feed for the same shared project), so the messages can appear—such as appear in real-time. The system 102 also can store the messages in persistent storage, so they can be loaded back later. This way users can see messages received while offline or not in the previous project of interest. At step 2033, the app 103 or system 102 sends the message to the system 102. After the system 102 relays the message, the message processing workflow is finalized at step 2034.

In some embodiments, the collaborative learning system can provide message sequence integrity. It can also perform access control (e.g., controls permissions for when users can read or use or not read or use a project feed).

In some embodiments, message sequence integrity can be used for any use case where the system guarantees that a message came exactly after another message. An example of this is using the messaging system for multiplayer games. Here each client can recreate the same game state as other clients by computing the current state by using the initial state and applying actions performed since the start of the game. Such actions are relayed as messages. An example action could be clicking a card in a card game to select it. In such a use case, losing a single message or executing its described action out of sequence, can result in one of the clients computing a game state that is different from the other clients. The can lead to the actions being out of sync.

In some embodiments, a channel described herein is a stream of messages that clients (e.g., a web browser or mobile app client) can subscribe to. Once subscribed, whenever a message is sent to that channel, the subscriber can receive that message such as in real-time. Channels can be encoded in a namespace-like fashion. For example, a project feed channel can be named something like "tynker/projects/<projectid>/feed".

In FIG. 21, a process 2100 begins with step 2101, which includes the management computing system 102 receiving messages from instances of the programming learning center application 103. At step 2102, the system 102 relays messages to message processing cluster nodes using a client IP. The system 102 can include one or more servers. The system 102 can scale horizontally by having multiple processes handle client connections and their respective messages. Multiple processes can be running within the same machine (to make use of CPU cores) and/or amongst different machines. The processes can coordinate their actions using an inter-process communication service (e.g., using Redis PUB/SUB channels). Each client can be assigned a specific cluster node or process based on its IP. This can be implemented via IP sharding. Also, this can be done so that the same client will connect back to the same server on reconnection or during connection upgrades.

At step 2102, each cluster process can receive messages directly from the clients connected to them, or from the cluster message bus. This is because different clients may be joined to the same channels but assigned to different cluster processes. Whenever a message is sent through an active client connection to its assigned cluster node, it is sent to the active client connections that joined that channel within that node and to the inter-process communication bus so that other cluster nodes can send it to the active channel participants that are assigned to them. At step 2104, the message is sent (e.g., sent via a websocket or HTTP message). Also, the message can be sent via mobile app push messaging, SMS, MMS, or email.

At step 2105, it is determined if the message is valid. Then, at step 2106, it is determined whether a target channel exists. A client can only send a message if the client has successfully joined the channel (e.g., if the client went through an authentication process through which the management computing system 102 process acquired the users' current permissions for that channel) and has "write" permissions on that channel; otherwise, the message is rejected at step 2106b.

At step 2107, it is determined whether a user has "write" permission on a target channel. If not, the message is rejected at step 2106b. Otherwise, the message is stamped at step 2108. The message can be stamped with a sequential identifier. This sequence is shared across nodes (e.g., process 2 stamps message with 1, process 3 stamps next message with 2, process 1 stamps next message with 3). This message sequential stamping allows ensuring message sequence integrity on the client side as well as being able to know how many messages are missing within a set of known messages. This feature is required to enable stricter scenarios where messages must be parsed in sequence and no message can be skipped. This is useful for implementing multiplayer games.

At step 2109, messages can be stored in a long-term storage repository (e.g., a database) for later retrieval. To prevent the storage step from delaying the processing of more incoming messages, messages can be added to a FIFO queue (such as the queue shown in FIG. 19). The queue can be used by a separate process, which can be used for storing these messages. The message flusher process described in FIG. 19 can continuously monitor the associated FIFO queue, read a chunk of messages from it, attempt to persist messages to long-term storage, and remove successfully stored messages from the queue.

At step 2110, the management computing system 102 can send a message to the cluster message bus (e.g., cluster-message bus 1906). This provides that clients are connected to the same channel but whose connections are handled by other system 102 processes to also receive the message. At step 2114, the message is sent, by the system 102, to active client connections that are currently joined to the target channel specified in the message.

At step 2111, a new cluster message bus message is sent. At step 2112, it is determined if the node that added the message sent the message to the bus. If it did send the message, then step 2113 can be skipped. Otherwise, at step 2113, it is determined if the node has clients connected to a target channel. If no clients are connected to the channel, many things can occur. For example, the message can be rejected. Otherwise, if there is the connection to the channel, then step 2114 occurs (which includes the message being sent, by the management computing system 102, to active client connections that are currently joined to the target channel specified in the message). Finally, at step 2115, the message reception workflow is completed after step 2114.

Related to the aforesaid processes of the cluster of nodes of the management computing system 102, the flusher process of system 102 can occur subsequent to step 2109 (such as when messages are stored in a long-term storage repository). At step 2116, the system 102 determines if FIFO has messages. If there are no messages, then the system waits for a period of time—such as 50 ms (at step 2117). Otherwise, at step 2118, the system pops a chunk of the messages. And, at step 2119, the messages are saved by the system in persistent storage.

In FIG. 22, a process 2200 begins with step 2201 where a user enters a shared project (such as entering the project via a GUI of the programming learning center application 103). At step 2202, via a GUI of the app 103, the user receives messages with actors and/or computer programming blocks.

At step 2204, via the GUI of the programming learning center application 103, the user can click on a block attachment of a message. At step 2205, the app 103 or the management computing system 102 determines if the block has the same ID as the one that exists in the project. If a match is determined, then the app 103 or the system 102 selects, at step 2206, an actor that has the block; otherwise, the selection of the block can be rejected. At step 2207, the app 103 or the system 102 can highlight a block or blocks in the project that correspond to the match. At step 2207, highlighting of blocks can occur. The highlighting of blocks in the project is the mechanism through which multiple users can communicate back and forth about a particular piece of code within the same project. The message can show the code blocks next to it so the user can quickly know what the comment is referring to. And, clicking on the blocks to see the code in the project allows the user to see the associated code that surrounds it as well as providing a quick mechanism to also interact with that code and send back parts of it as a response.

At step 2214, via a GUI of the programming learning center application 103, the user can click on an actor attachment of a message. At step 2215, the app 103 or the management computing system 102 determines if the actor has the same ID as the one that exists in the project. If a match is determined, then the app 103 or the system 102 selects, at step 2216, the corresponding actor in the project; otherwise, the selection of the actor can be rejected. Selecting an actor is the mechanism through which multiple users can communicate back and forth about a specific actor within the same project (and a similar process can occur for selecting blocks).

At step 2224, via a GUI of the programming learning center application 103, the user can drag a block attachment of a message into the project of the user. At step 2225, the app 103 or the management computing system 102 can deserialize the block. At step 2226, the app 103 or the system 102 can assign a new ID to each block (such as by copying the ID of a corresponding block in the project). At step 2227, a block can be added as a new script belonging to a selected actor.

At step 2234, via a GUI of the programming learning center application 103, the user can drag an actor attachment of a message into the project of the user. At step 2235, the app 103 or the management computing system 102 can deserialize the actor. At step 2236, the app 103 or the system 102 can assign a new ID to the actor (such as by copying the ID of a corresponding actor in the project or another project). At step 2237, a new actor can be added to a project.

In some embodiments, deserialized blocks or actors are assigned new unique IDs so that clicking the block or actor preview within the message feed highlights the original code that was dragged as an attachment to that particular message, but not the new code that was cloned by dragging a copy out of it. This can include attached multiple specific deep links including lessons, projects, users, game stats, project assets, and specific code lines. This can be used to add multiple types of media as attachments—such as videos, pictures, links, etc. The media types can include anything that can be serialized and stored and distributed. Such processes for attachments are also applicable to other domains, e.g., add molecule designs, math formulae, chats, and other subject matter as attachments.

Figure 23:
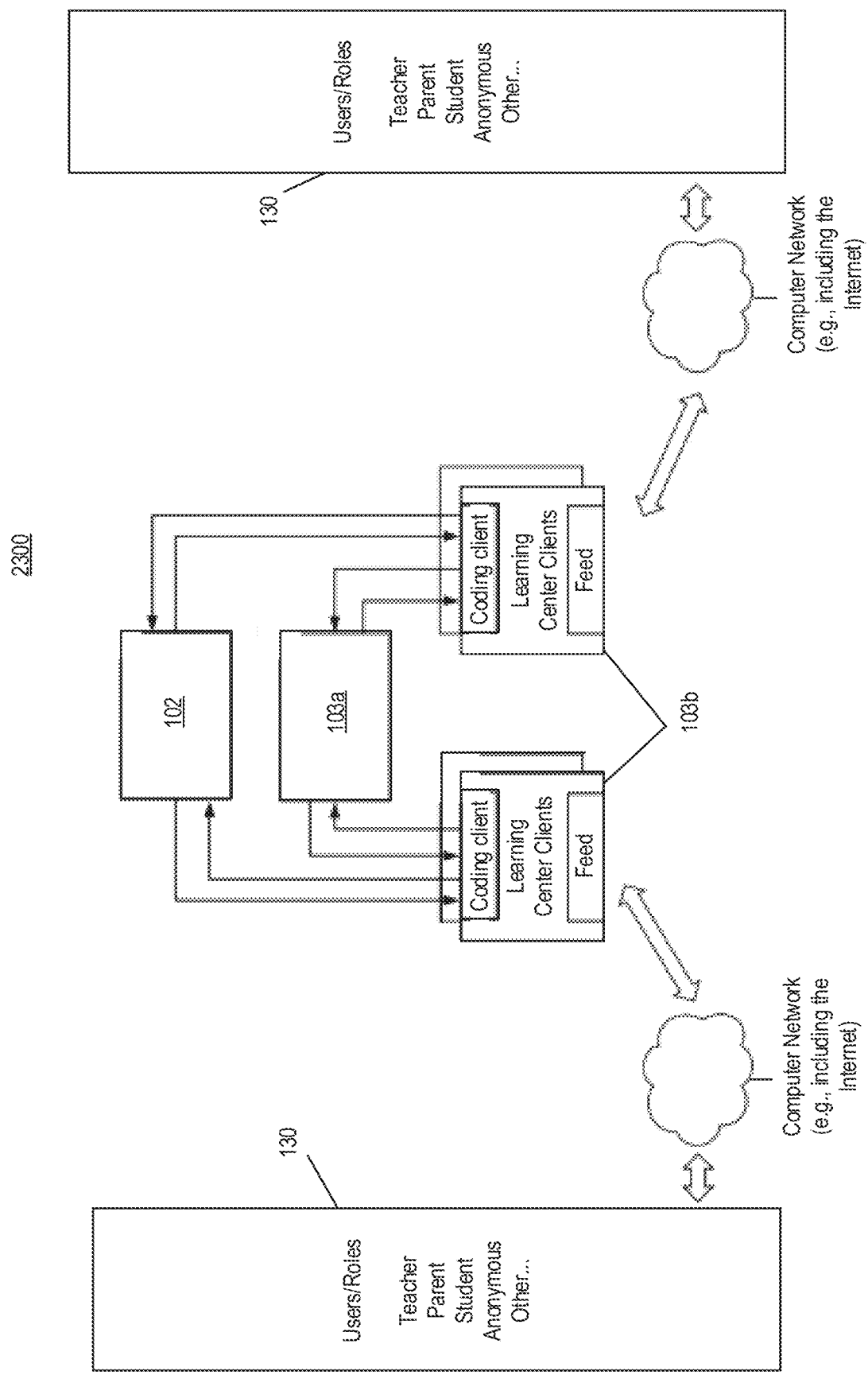
FIG. 23 illustrates a feed system within the collaborative learning system, in accordance with some embodiments of the present disclosure.

FIG. 23 illustrates a feed system 2300 within the collaborative learning system, in accordance with some embodiments of the present disclosure. The system 2300 of FIG. 23 relates to role and context-based feeds. Feeds are message streams that display content posted to feed parts of GUIs (such as content posted in real-time). In this example, each user role has access to different feeds and can access different features to interact with the feeds. The rules for the setup for the feeds are configurable, like in any other role-based system, and allow establishing communication between combinations of roles within the collaborative learning system (e.g., roles can include parent-child roles, child-teacher roles, parent-child-coach roles, etc.). The roles are, for example, represented by users and roles 130 shown in at least FIGS. 1 and 23. The users and roles 130 include different types of user roles of the collaborative learning system that are able to interact with feeds that are configured to provide the content that is most appropriate for that role.

In the example shown in FIG. 23, learning center clients 103b can be one of multiple combinations of software and hardware devices that allow the user to interact with a program learning center server 103a. The clients 103b can be distributed by the server 103a which can be provided in a desktop browser opening a website for application 103 or a mobile app for application 103. The clients 103b provide feeds that users interact with. When a user sends a message to one of the feeds, the feed sends the message to the management computing system 102 through the clients 103b and/or the server 103a.

The feeds are set up using data obtained from the program learning center server 103a. The feeds can be updated by receiving messages from the learning center clients 103b that is connected to the management computing system 102. Each feed's messages can be received from one or more channels of the system 102 that are associated with that feed.

The program learning center server 103a can serve data, process business logic, and deliver assets requested by the learning center clients 103b. Also, it can provide data to enrich the feeds (e.g., a feed message may be referring to a lesson assignment and the assignment can belong to the server 103*a*). The server 103*a* can also provide the users with authentication data they can use to prove their identity and permissions with the management computing system 102.

The management computing system 102 can include one or more servers and can relay messages posted in a feed so that the messages are received by users and clients using such feeds. The roles provided herein and their parameters are provided as examples, and other roles and parameters could be a part of the system.

Roles, such as roles in users and roles 130, can include roles that can interact with the feeds along with the feed features provided for a role. One of the roles is a teacher, who can see official notifications of the system (e.g., new projects launched). The teacher role has access to a feed for each of the classrooms taught by the teacher. The teacher role can post messages to each classroom feed, which are broadcasted to students in those classes. The teacher role can have conversations with individual students and/or groups. The teacher role can discuss specific posts by replying to them (posts are treated as individual threads). The teach role can have access to private group discussions between students that are enrolled in the teachers' classrooms. The teacher role can moderate student conversations (e.g., delete messages, stop private group discussions, etc.).

One of the roles is a student, who can see official system notifications (e.g., new projects launched). The student role has access to a feed for each of the classrooms the student is enrolled in. The student role receives teacher posts from the subscribed classroom feeds. The student role cannot directly post to classroom feeds. These are access controlled. The student role can send replies to individual classroom posts (e.g., to ask questions about a project assignment). The student role can share projects with students within a particular classroom the student is enrolled in. The student role cannot see other private group discussions (e.g., student groups, teacher-student groups), that the student has not been invited to.

In some embodiments, the collaborative learning system also provides different contexts. One of the contexts is through a student dashboard. The student dashboard is accessible by student user role. The student dashboard can show one feed per classroom the student is enrolled in, and/or group discussions the student has created or has been invited to. The student dashboard can open a classroom dashboard page when a classroom feed is selected. The student dashboard can show a classroom feed when a classroom is selected in a dashboard. The student dashboard can show assignments posted by teacher in classroom feeds and take the student to the correct context when a corresponding graphical element is clicked (e.g., a course assignment takes the student to the corresponding course page, a project assignment takes the student to that project, etc.).

Another one of the contexts is through a teacher dashboard, which can be accessible by the teacher user role. The teacher dashboard can show official system notifications (e.g., new projects launched). It can show one feed per classroom the teacher manages. It can show group discussions the teacher has created or any of the students of the teacher have created. It can open a classroom dashboard page when a classroom feed is selected. It can show a classroom feed when a classroom is selected in a dashboard. It can provide for a teacher to delete specific student messages, end student group discussions, and/or enable or disable the ability for students to be able to create group discussions.

Another one of the contexts is through a parent dashboard, which can be accessible by the parent user role. The parent role and dashboard can be the same as the teacher role and dashboard in some embodiments. In some embodiments, the parent dashboard can provide official system notifications (e.g., new projects launched). It can show feeds the parent's children are subscribed to. And, it can allow a parent to communicate with the parent's children and with one of their child's teachers.

In some embodiments, a system IDE for the collaborative learning system can be accessible by any user role or specific roles. The system IDE can show feeds related a project currently being worked on. The IDE can show teachers and classmates involved with a project and can be used to invite such users to collaborate in a project, gaining the ability to post messages in that feed. Through the IDE, project assets can be added to the feed (e.g., blocks, actors, etc.). Through the IDE, project assets added to a feed can be retrieved by the other users the project was shared with and applied back to their project (assets are serializable and deserializable). Through the IDE, a user that shared a project, or any of its moderators (e.g., teacher and parent) can add/remove users from the list of shared users and/or terminate the share.

In some embodiments, the system can be Multimodal. This includes that the system can monitor feeds and start and continue conversations across different devices (IPADS, IPHONES, websites, etc.). Also, the feeds can occur via mobile app push messaging, SMS, MMS, or email.

In some embodiments, the system can have flexible access control. Each user can read, write, and/or delete content from a feed based on its role. This fine-grained permission control can enable other features like the ability to mute a user (e.g., temporarily remove write permissions for that channel).

In some embodiments, the system can have real-time moderation. Users with the appropriate privileges can edit and delete messages from the feed. These changes are propagated to viewers instantly (such as without reloading). In some embodiments, the system can flag the potentially inappropriate content and prevent the message from being broadcasted until the teacher approves the post. For example, if a student posts inappropriate content, the teacher can delete that post and it will disappear instantly to prevent students from viewing the inappropriate content in the feed. The system can also include the ability to modify channel access control for users. Users with the appropriate privileges (e.g., teacher has admin privileges over classroom feed) can change the permissions for other users either permanently (e.g., don't let user see that feed again) or temporarily (e.g., suspend "write" privileges temporarily in order to mute a student that is disturbing the rest of the classroom).

FIGS. 24 to 33 show graphical user interfaces including aspects of the feed system of FIG. 23 and the collaborative learning system, in accordance with some embodiments of the present disclosure.

Figure 24:
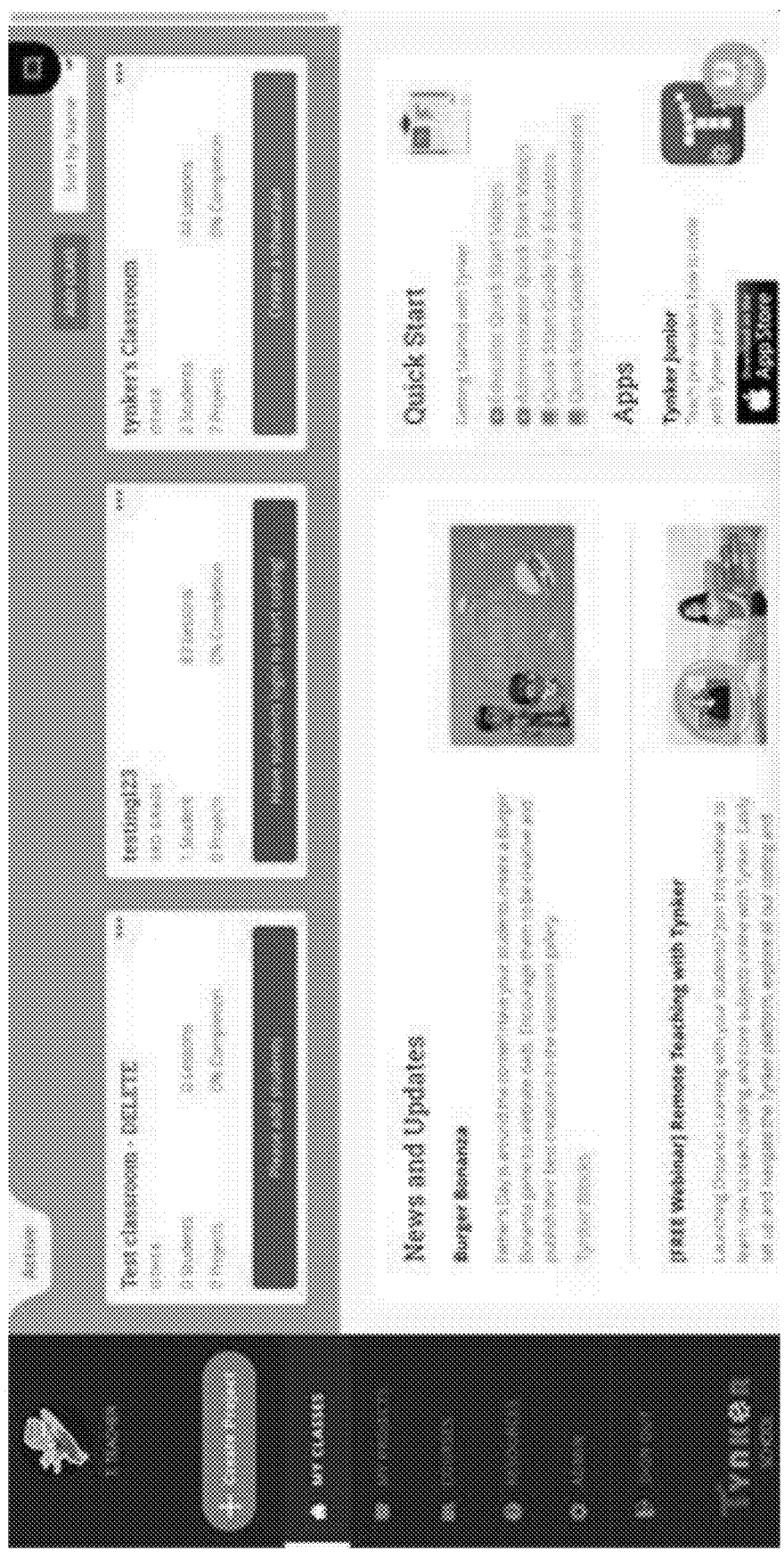
FIGS. 24 to 33 show graphical user interfaces including aspects of the feed system of FIG. 23 and the collaborative learning system, in accordance with some embodiments of the present disclosure.
Figure 37:
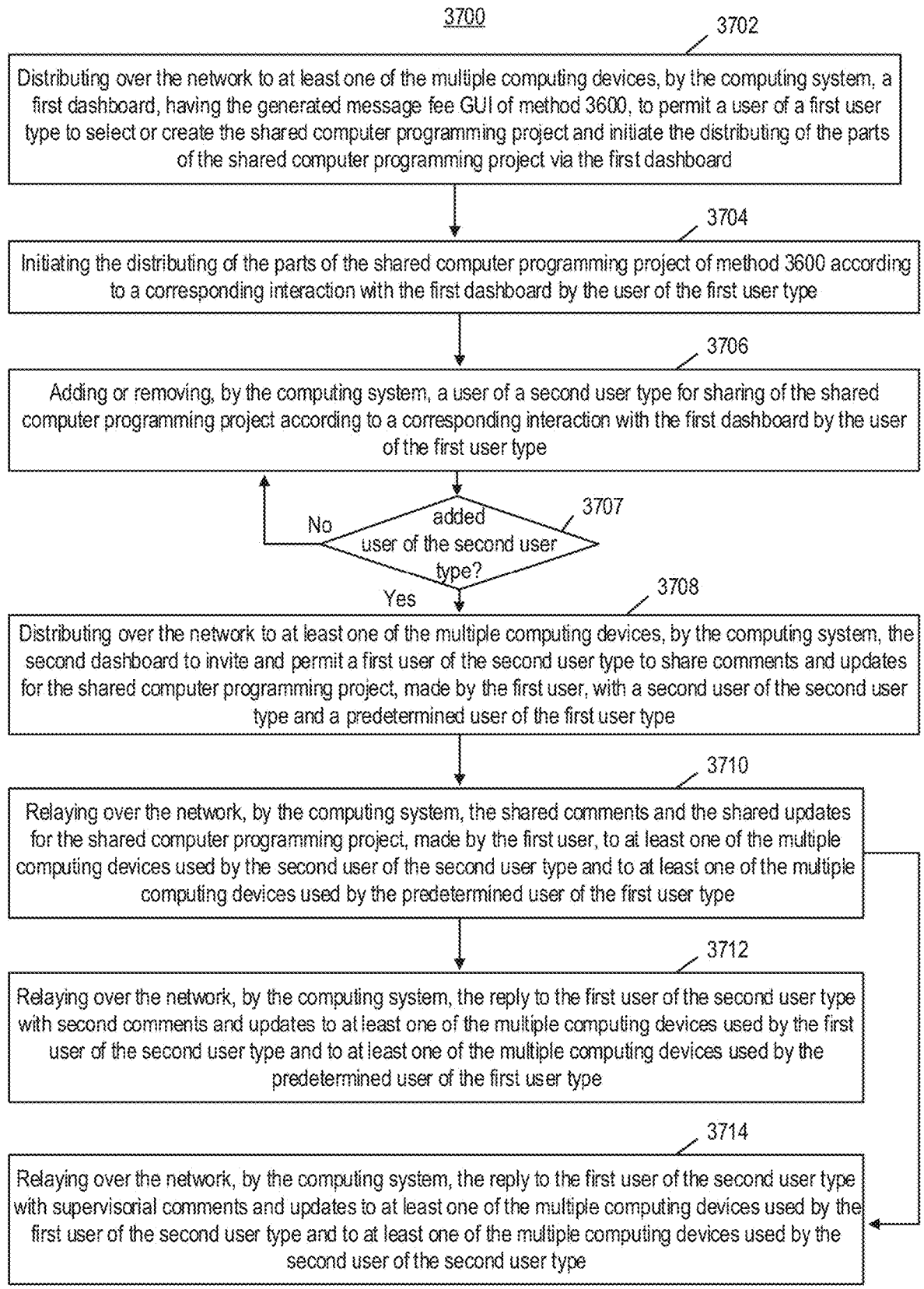
Figure 38:
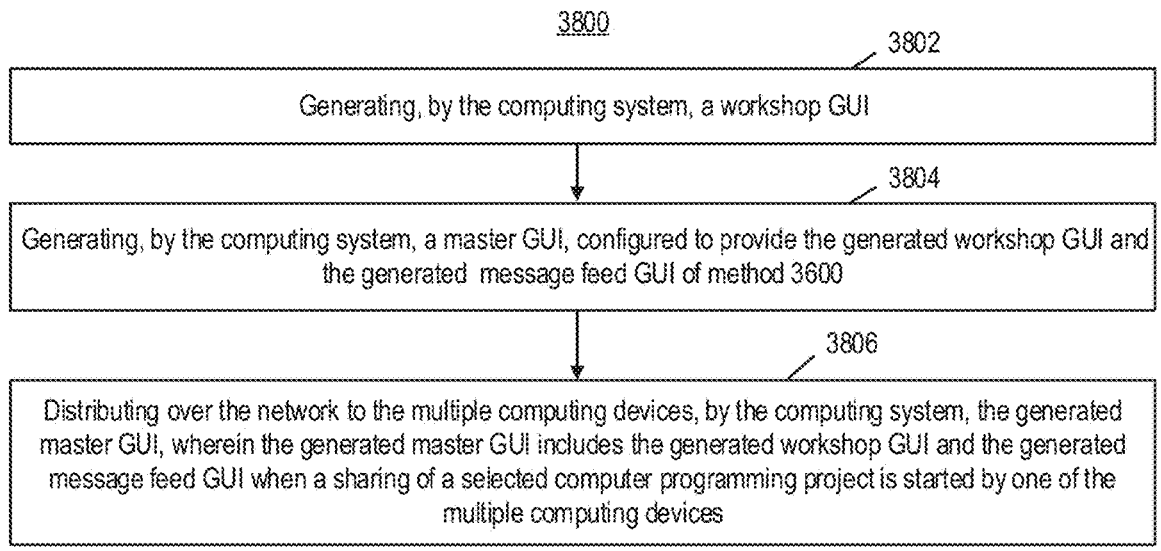
Figure 39:
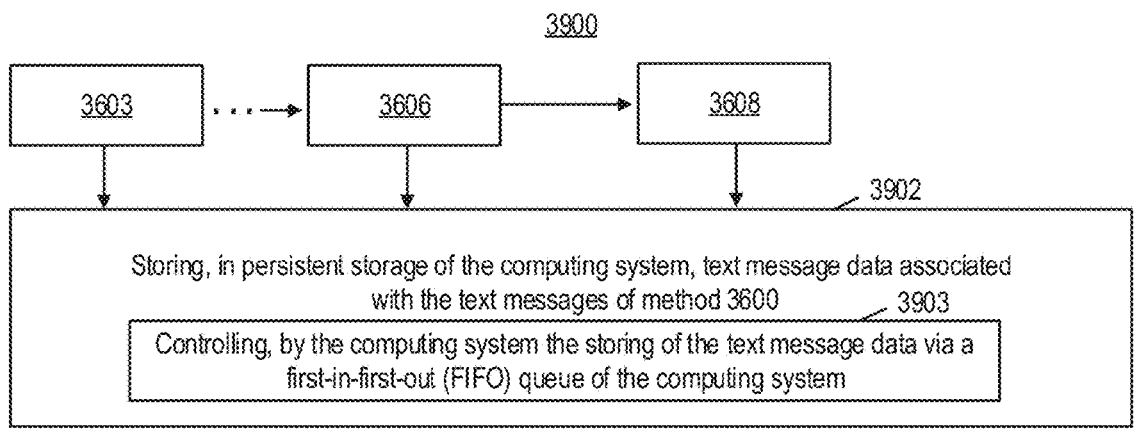
Figure 40:
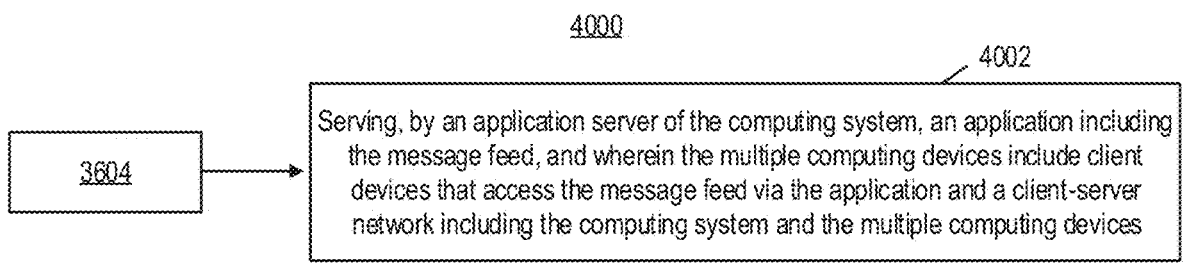

FIG. 24 shows a teacher feed and a teacher dashboard with a notification icon in the top right (access to feeds feature). E.g., see the first dashboard of method 3700 shown in FIG. 37.

Figure 25:
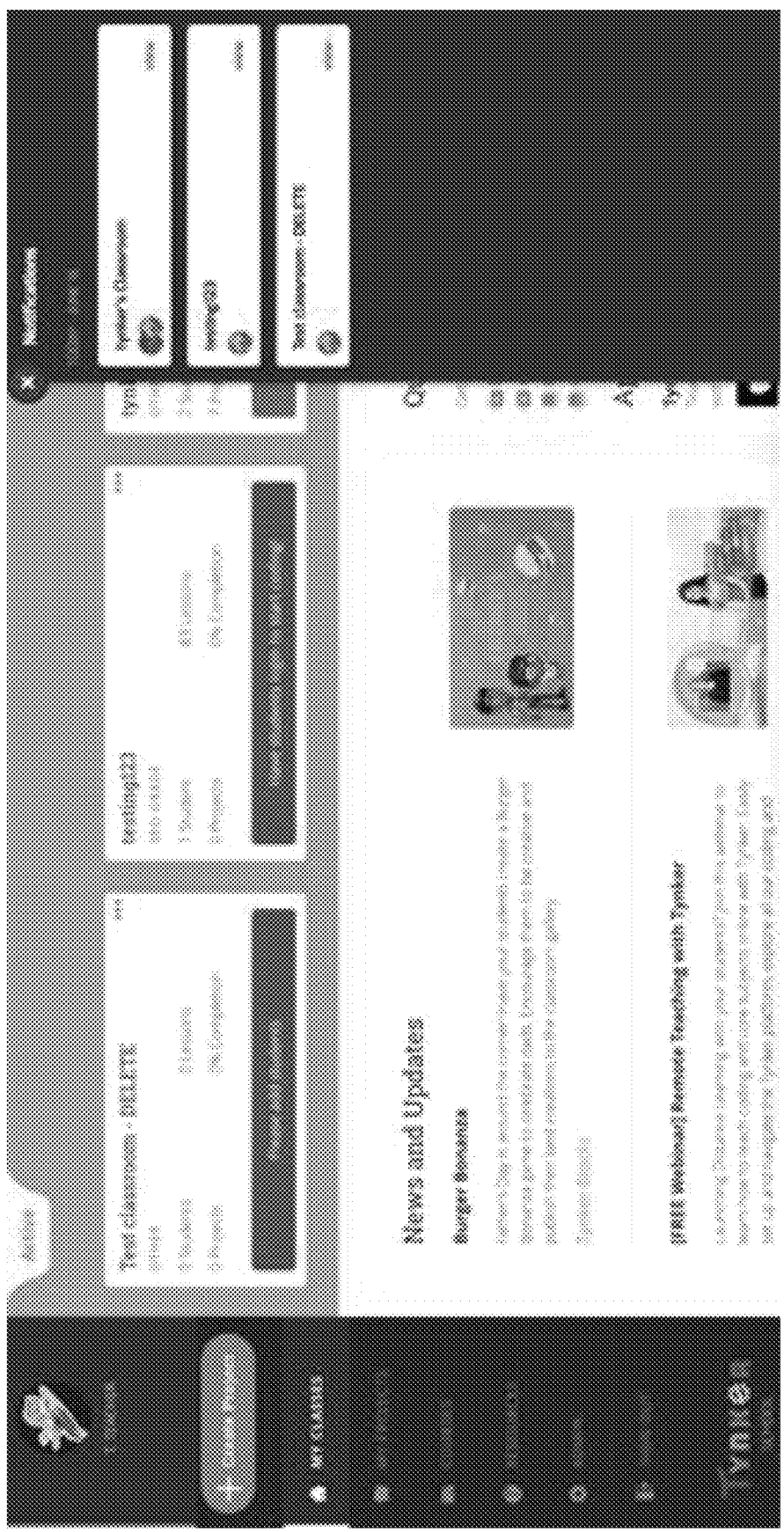

FIG. 25 shows the teacher feed and the teacher dashboard feed showing feed groups for each of a teacher's classrooms. E.g., see the first dashboard of method 3700.

Figure 26:
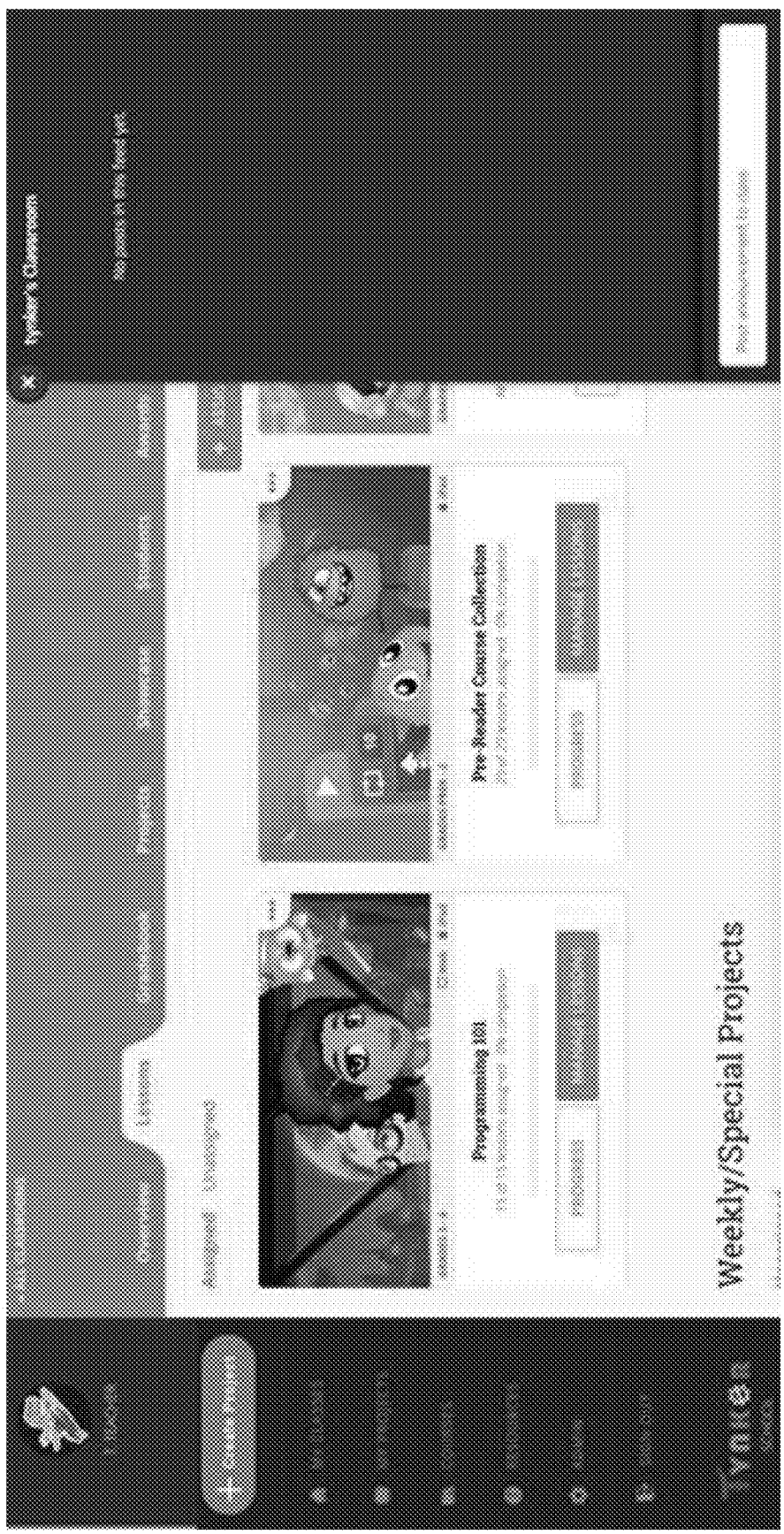

FIG. 26 shows the teacher feed with no posts and shows a dashboard that is showing a selected classroom. When a classroom is selected in the feed, the classroom is selected in the dashboard and vice-versa. E.g., see the first dashboard of method 3700.

Figure 27:
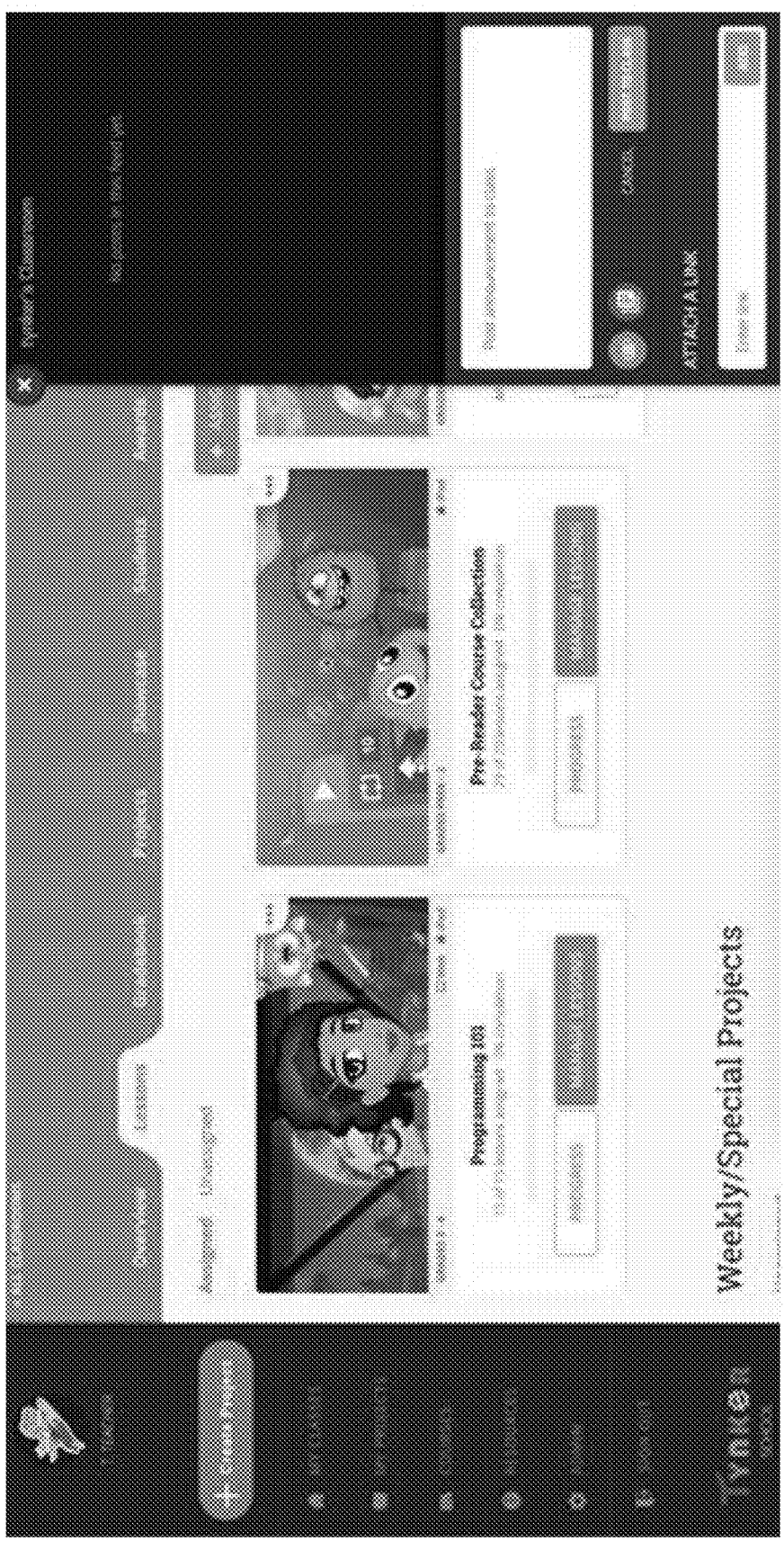

FIG. 27 shows the teacher feed and the teacher composing a new post for a classroom feed, in this case attaching a link to the post. E.g., see the first dashboard of method 3700.

Figure 28:
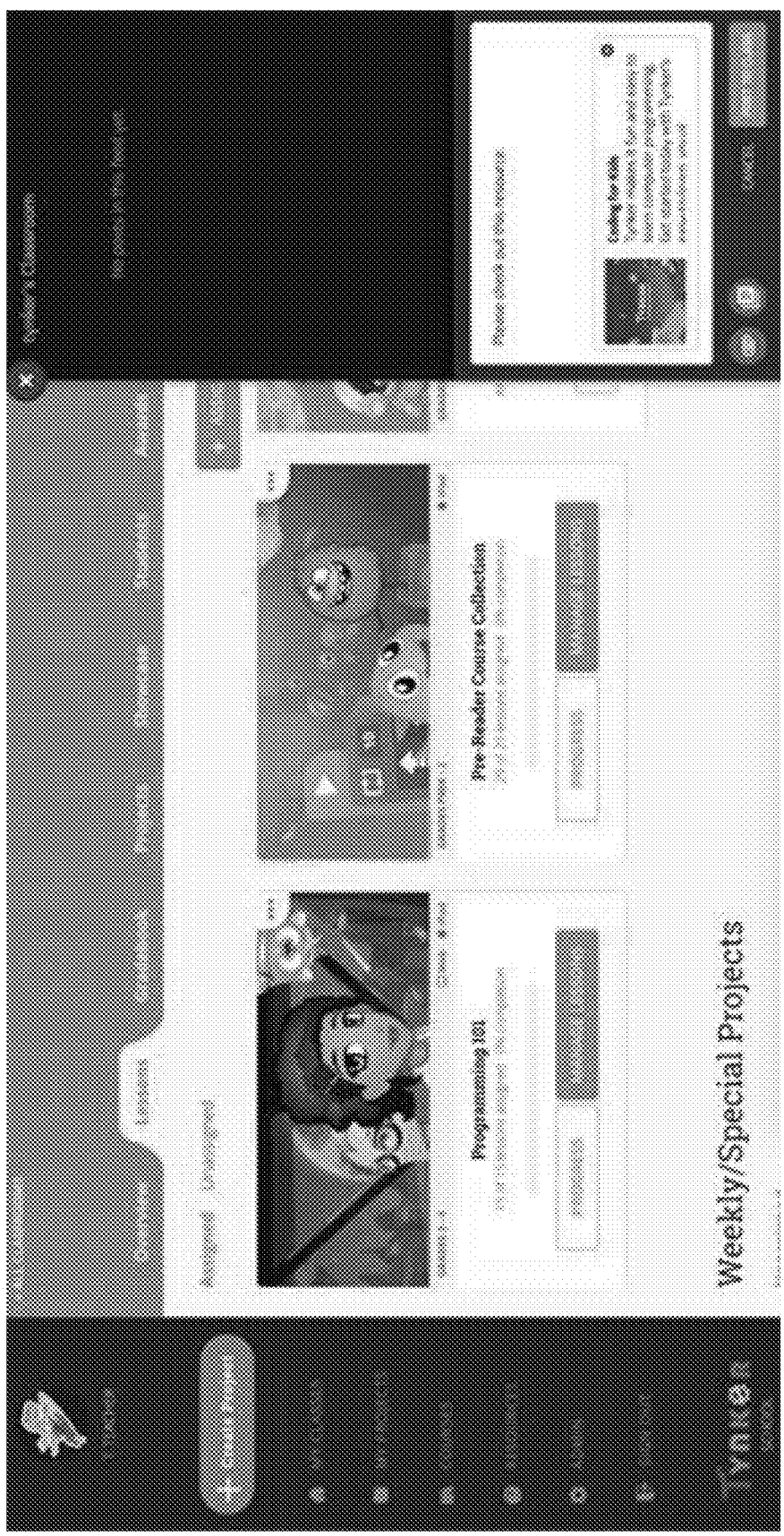

FIG. 28 shows the teacher feed and the teacher added link as an attachment to a new classroom post being composed. E.g., see the first dashboard of method 3700.

Figure 29:
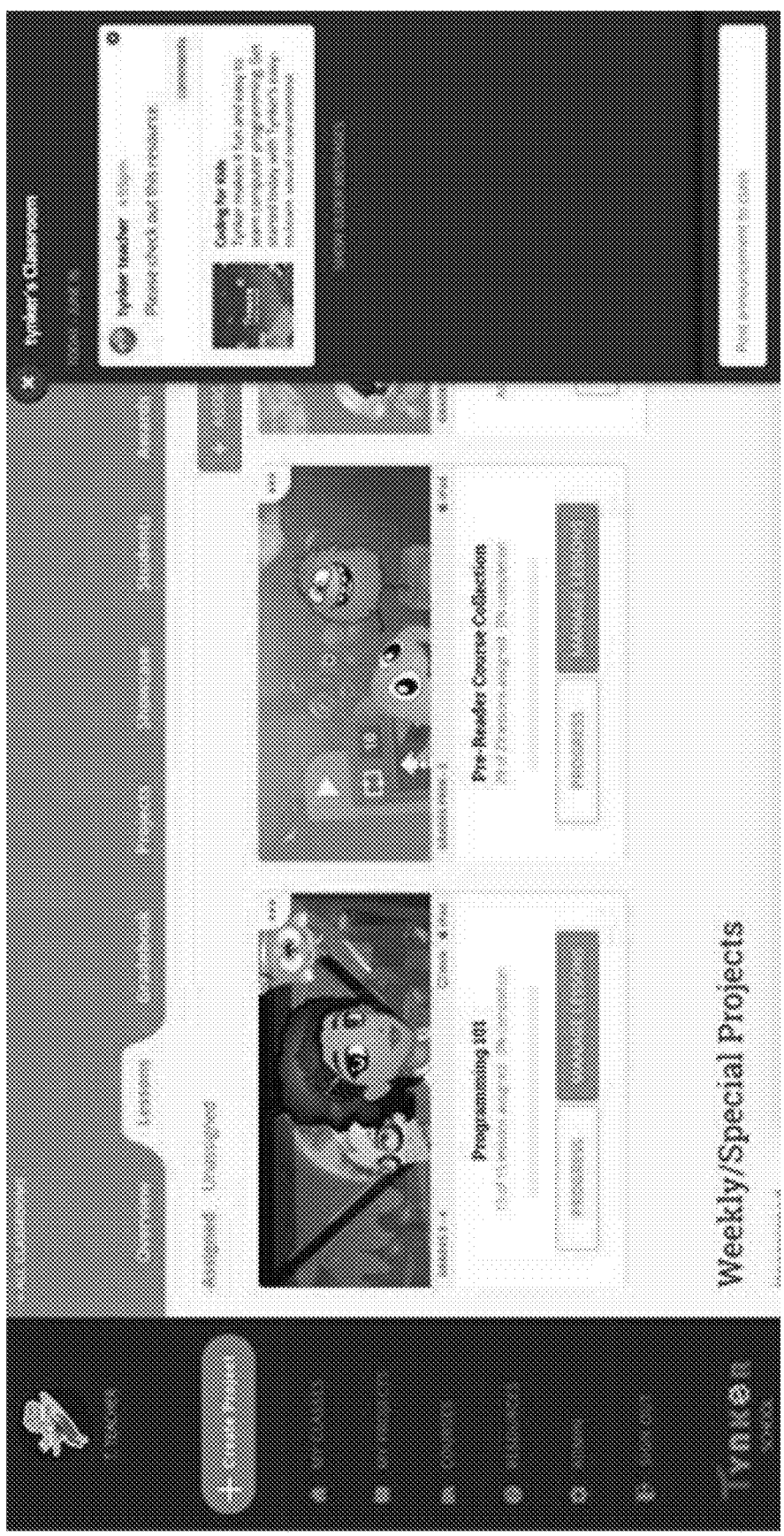

FIG. 29 shows the teacher feed and new post to classroom feed. E.g., see the first dashboard of method 3700.

Figure 30:
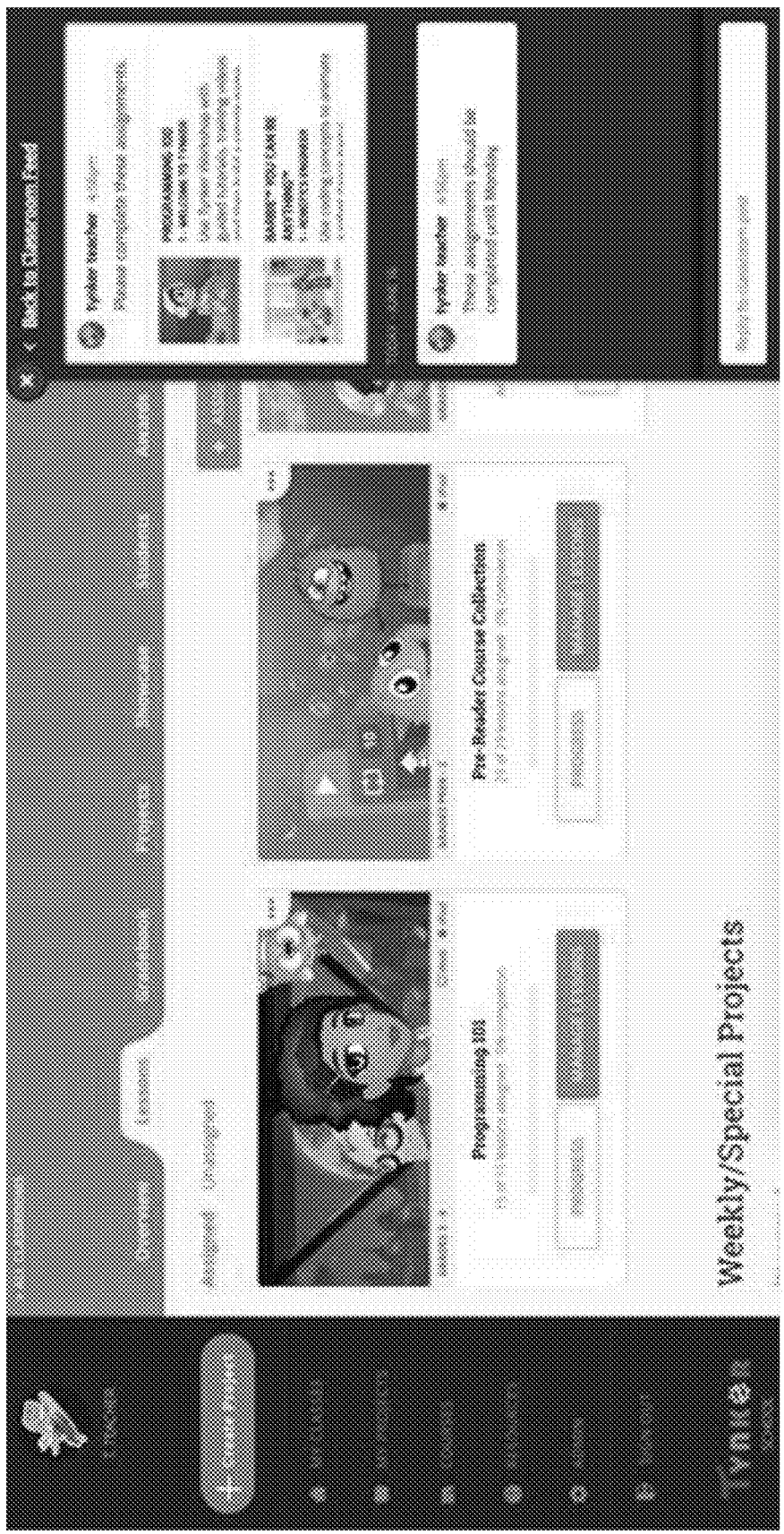

FIG. 30 shows the teacher feed and the teacher replying to a previously sent project's thread. E.g., see the first dashboard of method 3700.

Figure 31:
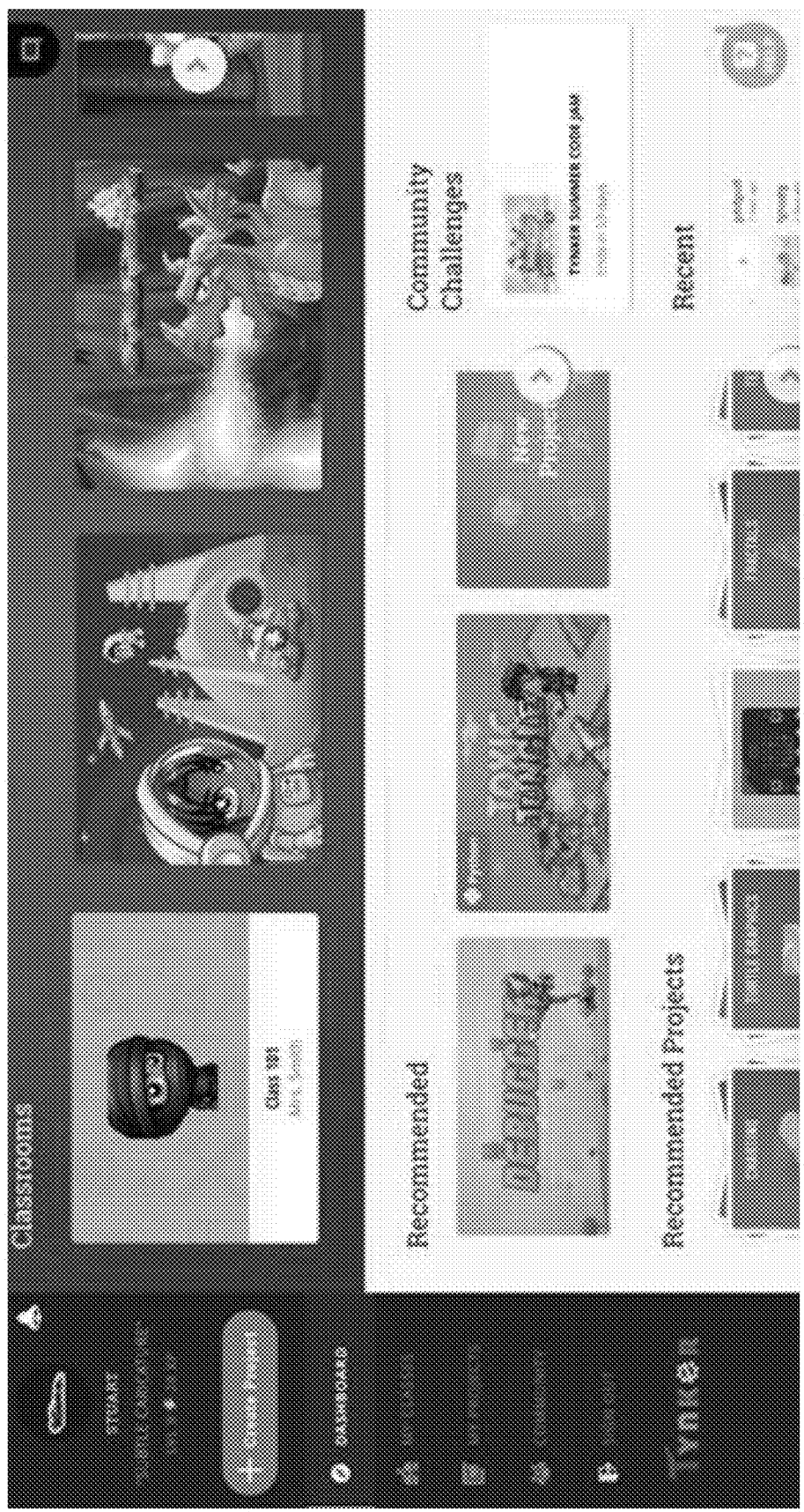

FIG. 31 shows a student feed and classrooms a student is enrolled in. E.g., see the second dashboard of method 3700 shown in FIG. 37.

Figure 32:
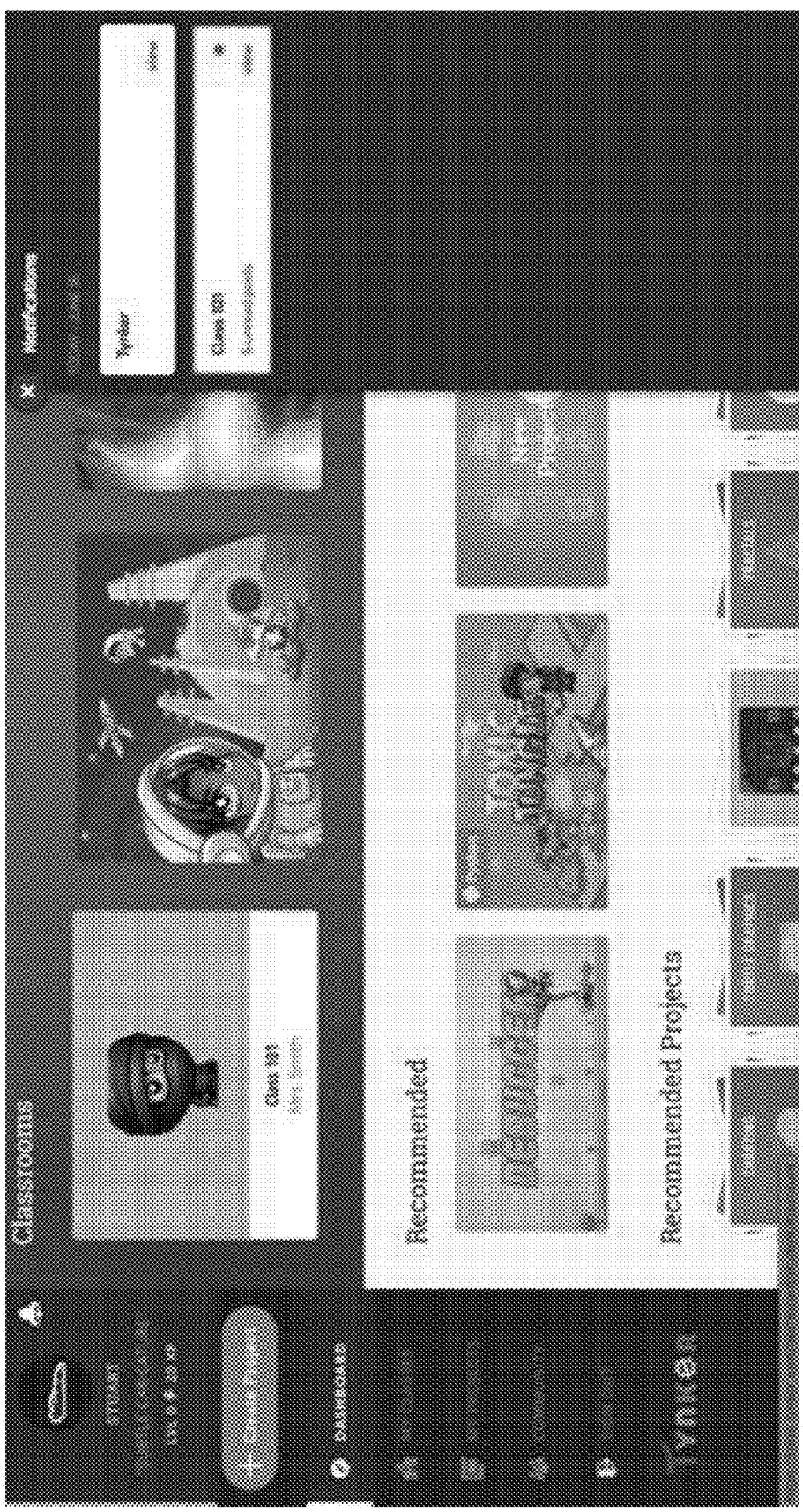

FIG. 32 shows the student feed and the student replying to a previously sent project's thread. E.g., see the second dashboard of method 3700.

Figure 33:
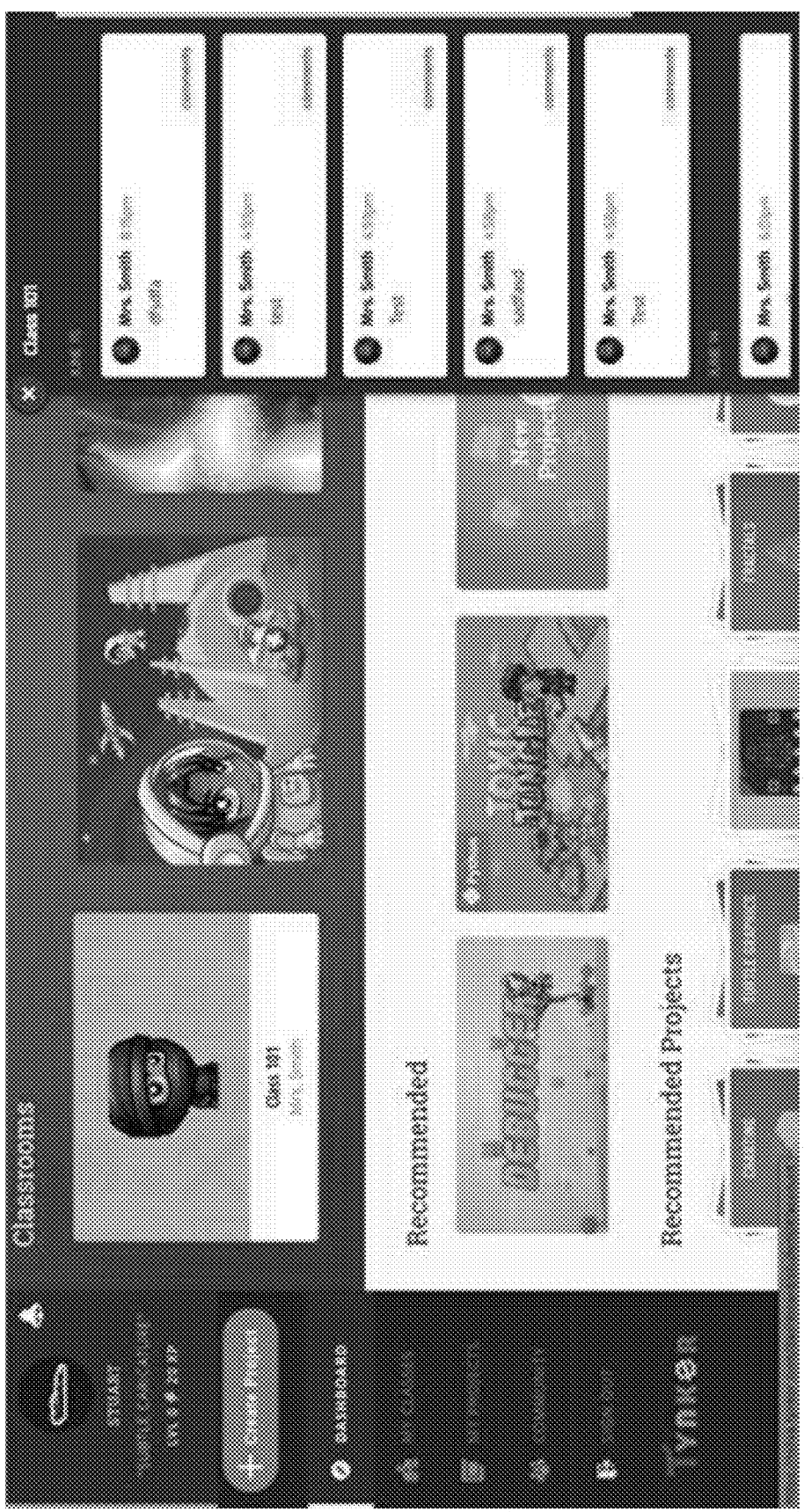

FIG. 33 shows the student feed and posts within a selected classroom feed. E.g., see the second dashboard of method 3700.

In some embodiments, the system includes a collaborative tutorial creation. This can be a type of feed that is used as the tutorial viewer and composer system and can be used for multiple users to collaboratively create tutorials (e.g., multiple users can collaborate to write the same Wikipedia article—such as in real time). This collaboration can be done within a closed group or using a crowdsourcing process that allows these projects to be open and contributed to by any user (e.g., hierarchical moderation system).

In some embodiments, the system includes a code template distribution. This can include a distribution mechanism for code patterns or templates for direct usage or remixing (such as for actor sharing or remixing).

In some embodiments, the system includes coding challenges. For example, quizzes where users must answer questions quickly under time constraints. The users that answered the most questions correctly win.

In some embodiments, the system includes an expert forum. This can be a group that can help anyone with their debugging issues (e.g., user would request help, and a request would be allocated to the next free expert, which would be assigned to the project's feed and be able to help through the same mechanisms with which user groups can collaborate within a project).

In some embodiments, the system includes questioning and answering bots. These can include messaging bots that join a specific feed and reply to provided content in a meaningful way. Dropping a set of blocks can lead to showing links with help for those blocks. The help can include sample projects that use the blocks. Dropping a single block can lead to showing that block's help. The system can also include user-made bots. A user can use the system to code bots that participate in chat rooms with their code (e.g., listen to specific text and reply accordingly). The system can also include hardware bots. Connect internet-connected hardware devices and have them respond to chat room messages or send chat room messages when a button is pressed. A user can deploy code to them by dropping it in a chat room the bot is listening to.

In some embodiments, the system can include programmable avatars. The avatars can include code actors with blocks that can be added to posts like any other attachment but respond to actions like clicking on them, moving mouse over them, etc. (e.g., actor moves eyes in direction of mouse pointer). This acts as a communication artifact, which can be similar to or include a GIF or an emoji. The avatar can be more interactive then the aforesaid graphical element and can be another vehicle for the user to learn how to code.

In some embodiments, the system can include multiplayer turn-based asynchronous games. Users can create their own multiplayer games in the system and play them with their friends (uses the management computing system 102 for distributing game actions/state, and to coordinate the game session flow, like inviting users, having users join the game lobby, chat during the game, etc.)

In some embodiments, the system can include real-time domain-based analytics. This can track user information in real-time. This can provide for teachers or parents to see which students or children are online. Or, can permit teachers or parents to see what students or children are currently doing within the system. Student can see multi-player match results of multi-player game-based coding competitions in real time (e.g., these are frequent enough to provide an interesting active feed). Insights provided by user tracking can include: How active a class or user is? How do they learn? What are the common problems that learners have? What are collaborative learning habits? Such features and insights can improve the system and enhance learning. Also, messages inserted in a new user's feed or feed replay can occur for multiplayer functionality.

In some embodiments, when a feed is opened, the latest messages are retrieved from persistent storage. Afterwards, any new message is directly received from an active server connection and added to the feed. In case of connection loss, messages received while the connection is down will be retrieved from persistent storage, and as with the initial connection, new messages will be received from the active server connection upon reconnecting.

With multiplayer games, the same messaging infrastructure used for the feeds feature can be used as an inter-process communication system between system runtime clients running the game.

In some examples, when a game is created, a new unique channel is created for that game. Players can write or read to the channel depending on their permissions (e.g., users that were invited to the game have write permissions, whereas watchers can only read, otherwise they could corrupt the game if they wanted by sending messages to that channel). In some examples, game states can be computed as a result of combining the original game state with the actions performed during the game until that point. Current Game State=Initial State+Action 1+Action 2+Action . . . .

In some embodiments, to ensure that clients start with the same initial state without having to share initial state information, a pseudo-random number generator is used—where the random seed for that generator is randomly selected when the game session and its associated channel are created and assigned to that session. Clients retrieve that seed when they compute their initial state and use it to generate random numbers, making them start with the same initial state. Since each game session has a different seed, different game sessions will have different initial states.

When a user performs a game action, that action can be encoded as a message and relayed through that channel to clients using the active server connection.

When a game client receives a game action message, it can update its current state by applying the action received in the message. For example, an initial state in a card game is the hand that each player has. And, when a user plays a card, the action will be applied to client's initial states, creating a new state where that card was played by that user. The process is the same for the user playing the turn. The user message is sent to the server, relayed back to the user, and upon received, applied to the user's own state to create the new state. This is essential because there is no guarantee that the user's action will be the next performed action (e.g., a card game where any user can play a turn at any time). The order can be established by the server by timestamping a sequence number on each received message before relaying them.

In some examples, action messages are stamped with a sequence number (see FIG. 21, step 2108), so that each client will execute the player actions in exactly the same order as other clients, in order to make sure that they recreate the game state. Since action messages are stored in persistent storage, if a user loses connection, upon reconnecting, the client can be able to catch up to the current game state by applying messages that were sent meanwhile, fetching them directly from persistent storage associated with that game session.

In some embodiments, real-time collaboration sessions can be implicitly attached to contexts (e.g., URI can be contexts) so that the system can provide context-aware message types and users do not have to explicitly create a session. The contexts could be student dashboards, block or text coding projects, multiplayer games, etc.

In some embodiments, session initiation through different contexts can occur, such as any one of the contexts described herein. An embodiment can include a method to initiate a collaborative session and to provide context-specific message types based on the current context (opened project, student dashboard, a multiplayer game, etc.). For example, the system can provide visual coding block drag-and-drop for block coding projects, math formula editor for math lessons, etc. Contexts can be encoded in a URI. Sessions can start by visiting that URI (e.g., users do not have to look for a feed to join).

Embodiments can also include learning apps for subjects like math, science, and language arts. Users can collaborate on academic problems to learn from each other. The payload in these applications can be equations, formulae, explanations, interactive diagrams, charts etc. Embodiments can also include user interface design apps, or application or game interaction design applications.

Figure 34:
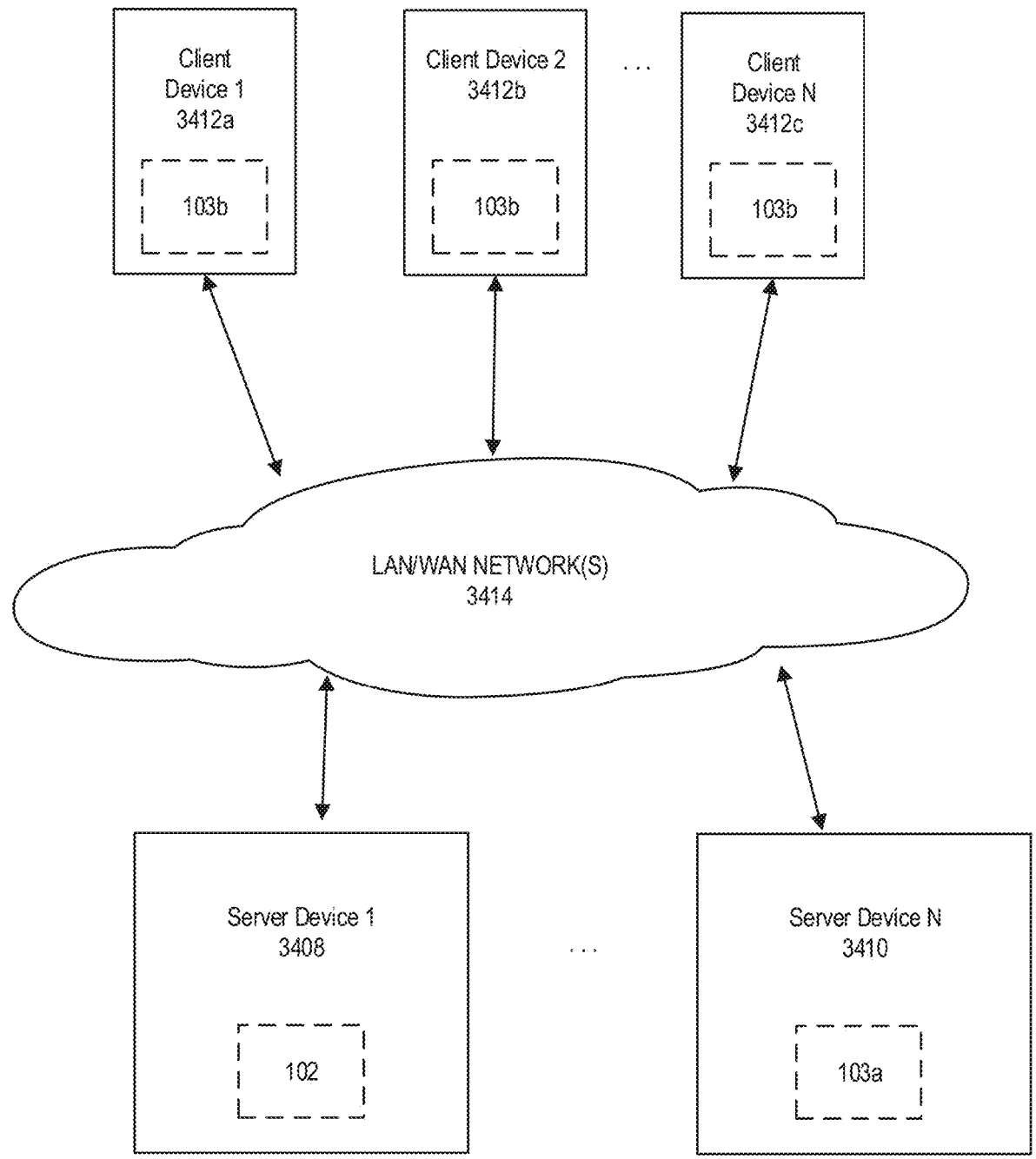
FIG. 34 illustrates an example network of computer systems to implement technologies for the collaborative learning system, in accordance with some embodiments of the present disclosure.

FIG. 34 illustrates an example network of computer systems 3400 to implement technologies for the collaborative learning system, in accordance with some embodiments of the present disclosure. The network of computer systems 3400 can implement any of the aforesaid components and operations as well as any component or operation described herein.

The network of computer systems 3400 is shown including the management computing system 102, program learning center server 103a, and the learning center clients 103b. As shown in FIG. 34, the system 102 can be hosted on one or more server computers (e.g., see server device 3408). Also, as shown in FIG. 34, server 103a can be hosted on one or more server computers (e.g., see server device 3410). The network of computer systems 3400 is also shown including learning center clients 103b hosted on client devices that can receive data from the system 102 and the program learning center server 103a (e.g., see client devices 3412a, 3412b, and 3412c).

The network of computer systems 3400 is also shown including one or more LAN/WAN networks 3414 which are shown communicatively coupling the servers hosting the management computing system 102, server 103a and the learning center clients 103b. The LAN/WAN network(s) 3414 can include one or more local area networks (LAN(s)) and/or one or more wide area networks (WAN(s)). The LAN/WAN network(s) 3414 can include the Internet and/or any other type of interconnected communications network. The LAN/WAN network(s) 3414 can also include a single computer network or a telecommunications network. More specifically, the LAN/WAN network(s) 3414 can include a local area network (LAN) such as a private computer network that connects computers in small physical areas, a wide area network (WAN) to connect computers located in different geographical locations, and/or a metropolitan area network (MAN)—also known as a middle area network—to connect computers in a geographic area larger than that covered by a large LAN but smaller than the area covered by a WAN.

At least each shown component of the network of computer systems 3400 can be or include a computer system which can include memory that can include media. The media can include or be volatile memory components, non-volatile memory components, or a combination of such. In general, each of the computer systems can include a host system that uses the memory. For example, the host system can write data to the memory and read data from the memory. The host system can be a computing device such as a desktop computer, laptop computer, network server, mobile device, or such computing device that includes a memory and a processing device. The host system can include or be coupled to the memory so that the host system can read data from or write data to the memory. The host system can be coupled to the memory via a physical host interface. The physical host interface can provide an interface for passing control, address, data, and other signals between the memory and the host system.

Figure 35:
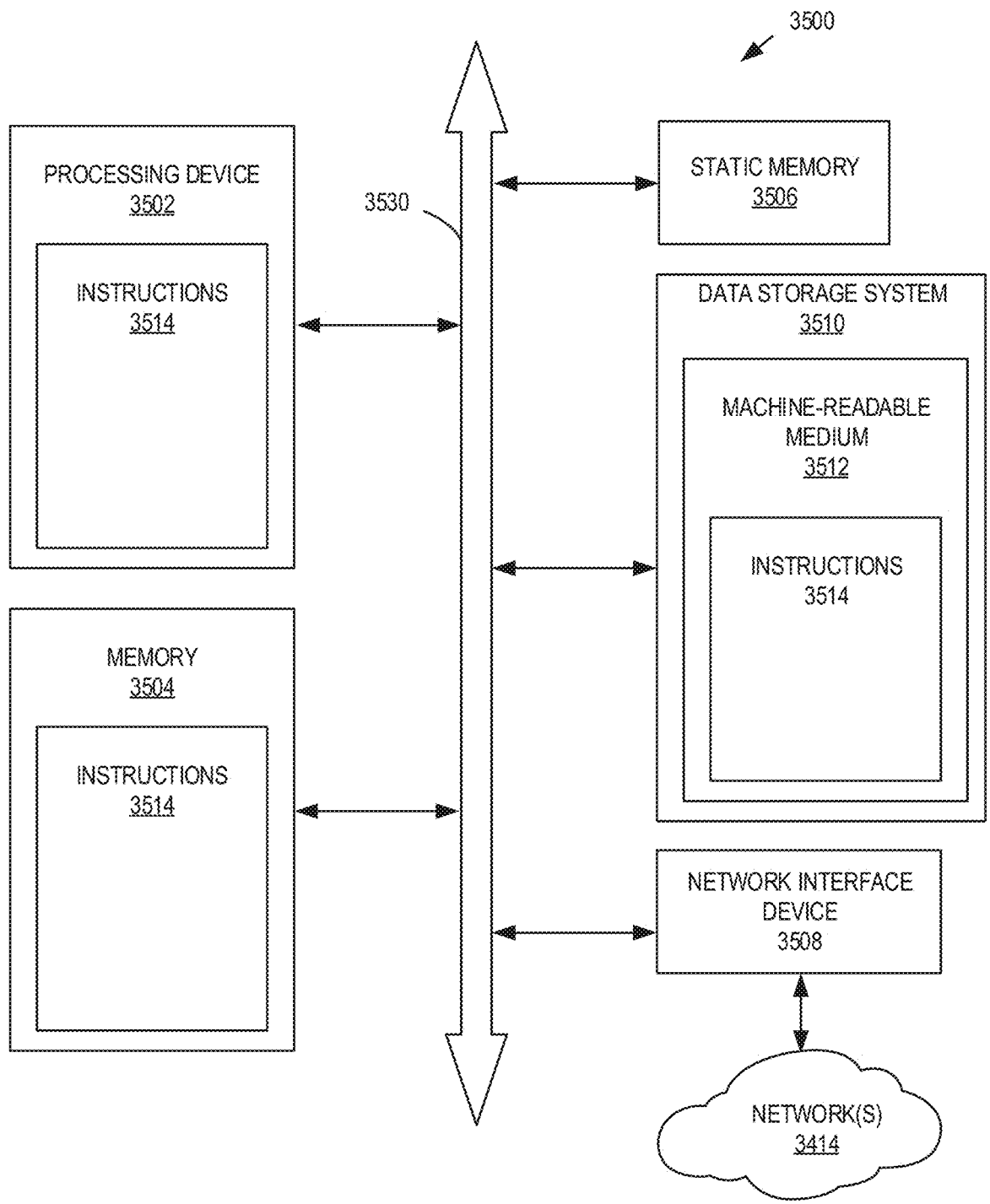
FIG. 35 is a block diagram of example aspects of an example computer system, in accordance with some embodiments of the present disclosure.
Figure 36:
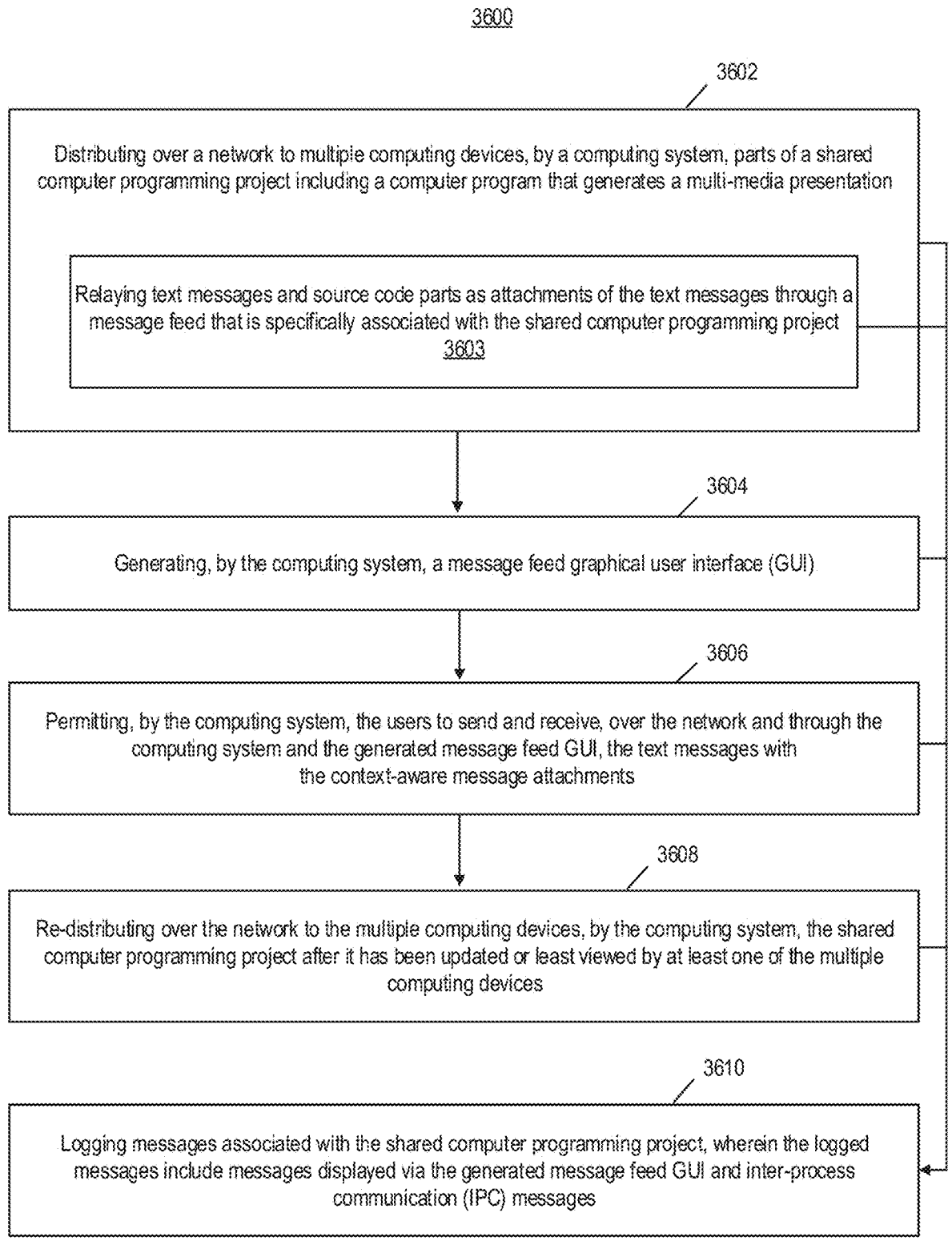
FIGS. 36 to 40 illustrate example operations of the collaborative learning system, in accordance with some embodiments of the present disclosure.

FIG. 35 is a block diagram of example aspects of an example computer system 3500, in accordance with some embodiments of the present disclosure. FIG. 35 illustrates parts of the computer system 3500 within which a set of instructions, for causing the machine to perform any one or more of the methodologies discussed herein, can be executed. In some embodiments, the computer system 3500 can correspond to a host system that includes, is coupled to, or utilizes memory or can be used to perform the operations of a controller (e.g., to execute an operating system to perform operations corresponding to the management computing system 102, the server 103a, the learning center clients 103b, or the programming learning center application 103). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 3500 includes a processing device 3502, a main memory 3504 (e.g., read-only memory (ROM), flash memory, dynamic random-access memory (DRAM), etc.), a static memory 1206 (e.g., flash memory, static random-access memory (SRAM), etc.), and a data storage system 3510, which communicate with each other via a bus 3530.

The processing device 3502 represents one or more general-purpose processing devices such as a microprocessor, a central processing unit, or the like. More particularly, the processing device can be a microprocessor or a processor implementing other instruction sets, or processors implementing a combination of instruction sets. The processing device 3502 can also be one or more special-purpose processing devices such as an application specific integrated circuit (ASIC), a field programmable gate array (FPGA), a digital signal processor (DSP), network processor, or the like. The processing device 3502 is configured to execute instructions 3514 for performing the operations discussed herein. The computer system 3500 can further include a network interface device 3508 to communicate over the LAN/WAN network(s) 3414 of FIG. 34.

The data storage system 3510 can include a machine-readable storage medium 3512 (also known as a computer-readable medium) on which is stored one or more sets of instructions 3514 or software embodying any one or more of the methodologies or functions described herein. The instructions 3514 can also reside, completely or at least partially, within the main memory 3504 and/or within the processing device 3502 during execution thereof by the computer system 3500, the main memory 3504 and the processing device 3502 also constituting machine-readable storage media.

In one embodiment, the instructions 3514 include instructions to implement functionality corresponding to the management computing system 102, the server 103a, the learning center clients 103b, or the programming learning center application 103. While the machine-readable storage medium 3512 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

FIGS. 36 to 40 illustrate example operations of the collaborative learning system, in accordance with some embodiments of the present disclosure. FIGS. 36 to 40 illustrate methods 3600, 3700, 3800, 3900, and 4000, respectively.

The method 3600, at operation 3602, includes distributing over a network to multiple computing devices, by a computing system, parts of a shared computer programming project including a computer program that generates a multi-media presentation. In some embodiments, the shared computer programming project can be a part of or include a programming lesson that can include the computer program along with other computer programs. The programming lesson can include multiple programming projects and/or computer programs. And, such projects and computer programs can include do-it-yourself (DIY) projects, puzzles, tutorials, and/or quizzes. At operation 3603, the distributing of the shared computer programming project at operation 3602 includes relaying text messages and source code parts as attachments of the text messages through a message feed that is specifically associated with the shared computer programming project to provide a context-aware message feed and context-aware message attachments that include the source code parts. The computer program of the shared computer programming project includes at least one of the source code parts. In some embodiments, the distributing of the shared computer programming project at operation 3602 includes relaying voice annotations, links to other projects and reference materials such as answer keys and sample projects as well as websites.

The method 3600, at operation 3604, includes generating, by the computing system, a message feed graphical user interface (GUI). The message feed GUI is configured to display graphical elements of the message feed via the multiple computing devices. The graphical elements of the message feed include the relayed text messages and the context-aware message attachments. The message feed GUI is also configured to permit users to interact with the message feed and the context-aware message attachments, via the multiple computing devices, to update or at least view the source code parts. In some embodiments, the message feed GUI is also configured to permit users to interact with the message feed and the context-aware message attachments, via the multiple computing devices, to update messages of the feed and other types of attachments of the messages of the feed besides source code parts.

The method 3600, at operation 3606, includes permitting, by the computing system, the users to send and receive, over the network and through the computing system and the generated message feed GUI, the text messages with the context-aware message attachments. In some embodiments, the operation 3606 can include distributing over the network to the multiple computing devices, by the computing system, the generated message feed GUI to permit the users to send and receive, over the network and through the computing system, the text messages with the context-aware message attachments.

The method 3600, at operation 3608, includes re-distributing over the network to the multiple computing devices, by the computing system, the shared computer programming project after it has been updated or least viewed by at least one of the multiple computing devices.

The method 3600, at operation 3610, includes logging messages associated with the shared computer programming project. In some embodiments, the logged messages include messages displayed via the generated message feed GUI. Also, in some embodiments, the logged messages include inter-process communication (IPC) messages that include messages used to synchronize states between collaborative project sessions of the shared computer programming project.

In some embodiments of the method 3600 as well as some other embodiments, the source code parts include a graphical actor and a plurality of graphical source code pieces that are linked to the graphical actor to provide graphical control to the graphical actor in the multi-media presentation. In some embodiments, the plurality of graphical source code pieces include at least one coding block. In some embodiments, the plurality of graphical source code pieces include at least one coding block and/or text code. In some embodiments, the source code parts can include code that provides non-graphical functionality such as code that provides non-graphical control or management of elements associated with the actor. For example, the actor can be used to hold variables and logic for parts of the computer program that are graphical or non-graphical.

The method 3700 includes operations for when the generated message feed GUI of method 3600 is a part of a first dashboard (e.g., a supervisory dashboard such as a teacher dashboard) and a second dashboard (e.g., a student dashboard). The method 3700, at operation 3702, includes distributing over the network to at least one of the multiple computing devices, by the computing system, the first dashboard to permit a user of a first user type to select or create the shared computer programming project and initiate the distributing of the parts of the shared computer programming project via the first dashboard. The method 3700, at operation 3704, includes initiating the distributing of the parts of the shared computer programming project of method 3600 according to a corresponding interaction with the first dashboard by the user of the first user type. The first dashboard is configured to permit the user of the first user type to add or remove a user of a second user type for sharing of the shared computer programming project. And, the first user type has a supervisor credential over the second user type.

The method 3700, at operation 3706, includes adding or removing, by the computing system, the user of the second user type for sharing of the shared computer programming project according to a corresponding interaction with the first dashboard by the user of the first user type. At 3707 of the method 3700, it is determined, by the computing system, if a user of the second user type has been added. If it is determined that the user of the second user type has been added, the method 3700 continues with operation 3708 which includes distributing over the network to at least one of the multiple computing devices, by the computing system, a second dashboard to invite and permit a first user of the second user type to share comments and updates for the shared computer programming project, made by the first user, with a second user of the second user type and a predetermined user of the first user type. Otherwise, the method 3700 returns to operation 3706.

The generated message feed GUI is a part of a second dashboard. The second dashboard is configured to permit the second user of the second user type to reply to the first user of the second user type with second comments and second updates for the shared computer programming project. The second comments include at least one of the text messages with the context-aware message attachments. In some embodiments, the second comments, other comments within the feed, and/or the attachments can include recorded voice and/or text comments. The second updates include at least one of the context-aware message attachments.

The method 3700, at operation 3710, includes relaying over the network, by the computing system, the shared comments and the shared updates for the shared computer programming project, made by the first user, to at least one of the multiple computing devices used by the second user of the second user type and to at least one of the multiple computing devices used by the predetermined user of the first user type. The shared comments include at least one of the text messages with the context-aware message attachments. The shared updates include at least one of the context-aware message attachments.

The method 3700, at operation 3712, includes relaying over the network, by the computing system, the reply to the first user of the second user type with the second comments and updates to at least one of the multiple computing devices used by the first user of the second user type and to at least one of the multiple computing devices used by the predetermined user of the first user type.

The first dashboard is also configured to permit the predetermined user of the first user type to reply to the first user of the second user type with supervisorial comments and supervisorial updates for the shared computer programming project. The supervisorial comments include at least one of the text messages with the context-aware message attachments. In some embodiments, the supervisorial comments, other comments within the feed, and/or the attachments can include recorded voice and/or text comments. The supervisorial updates include at least one of the context-aware message attachments.

The method 3700, at operation 3714, includes relaying over the network, by the computing system, the reply to the first user of the second user type with the supervisorial comments and updates to at least one of the multiple computing devices used by the first user of the second user type and to at least one of the multiple computing devices used by the second user of the second user type.

In some embodiments of the methods 3600 and 3700 as well as some other embodiments, the source code parts are draggable from a workshop GUI into the generated message feed GUI to add the source code parts to the text messages of the message feed as the context-aware message attachments. In such embodiments, when a source code part of the source code parts is being dragged from the workshop GUI to a post of a message in the generated message feed GUI, other posts in the generated message feed GUI are obstructed visually to make it clear visually which post will include the source code part as a context-aware message attachment. Also, in some embodiments of the methods 3600 and 3700, the source code parts are insertable (such as insertable by right-clicking to a contextual menu that allows for options for insertion as well as insertable using keyboard shortcuts, e.g., cut-and-paste keyboard shortcuts) from a workshop GUI into the generated message feed GUI to add the source code parts to the text messages of the message feed as the context-aware message attachments. In such embodiments, when a source code part of the source code parts is being inserted from the workshop GUI to a post of a message in the generated message feed GUI, other posts in the generated message feed GUI can be obstructed visually to make it clear visually which post will include the source code part as a context-aware message attachment.

Also, such embodiments can include method 3800, which includes generating, by the computing system, the workshop GUI (at operation 3802). The method 3800 also includes generating, by the computing system, a master GUI (at operation 3804), configured to provide the generated workshop GUI and the generated message feed GUI of method 3600. Also, the method 3800 includes distributing over the network to the multiple computing devices, by the computing system, the generated master GUI (at operation 3806). The generated master GUI includes the generated workshop GUI and the generated message feed GUI when a sharing of a selected computer programming project is started by one of the multiple computing devices. Also, the master GUI includes a project share graphic clickable to start the sharing of the selected computer programming project and open one or more GUIs to select a group of users or a user in the group of users for the sharing of the selected computer programming project. And, the generated message feed GUI includes an end-share graphic clickable to end the sharing of the selected computer programming project.

Some embodiments can include method 3900, which includes at least operations 3603, 3606, and 3608 of method 3600 as well as storing, in persistent storage of the computing system, message data (such as text message data) associated with the text messages of method 3600 (at operation 3902). The method 3900 also includes controlling the storing of the message data via a first-in-first-out (FIFO) queue of the computing system (at operation 3903). The message data includes attachment data associated with the context-aware message attachments.

Some embodiments can include method 4000, which includes at least operation 3604 of method 3600 as well as serving, by an application server of the computing system, an application including the message feed, at operation 4002. The multiple computing devices include client devices that access the message feed via the application and a client-server network including the computing system and the multiple computing devices. In some embodiments, the application server is implemented by a server cluster, and the server cluster performs the distributing of the parts of the shared computer programming project via a cluster-message bus.

The aforesaid operations can be implemented through a non-transitory computer-readable storage medium tangibly encoded with computer-executable instructions, that when executed by a processor of a computing device the processor performs the operations. For example, s non-transitory computer-readable storage medium tangibly encoded with computer-executable instructions, that when executed by a processor of a computing device the processor performs a method including the following operations: distributing over a network to multiple computing devices, by a computing system, parts of a shared computer programming project including a computer program that generates a multi-media presentation, the distributing of the shared computer programming project including relaying text messages and source code parts as attachments of the text messages through a message feed that is specifically associated with the shared computer programming project to provide a context-aware message feed and context-aware message attachments that include the source code parts, generating a message feed graphical user interface (GUI) configured to: display graphical elements of the message feed via the multiple computing devices, the graphical elements of the message feed including the relayed text messages and the context-aware message attachments; and permit users to interact with the message feed and the context-aware message attachments, via the multiple computing devices, to update or at least view the source code parts; permitting, by the computing system, the users to send and receive, over the network and through the computing system and the generated message feed GUI, the text messages with the context-aware message attachments; and re-distributing over the network to the multiple computing devices, by the computing system, the shared computer programming project after it has been updated or least viewed by at least one of the multiple computing devices.

In some embodiments, a system, including a computing device, including a processor and a non-transitory computer-readable storage medium for tangibly storing thereon computer program code for execution by the processor, the computer program code including executable logic for implementing the aforesaid operations. For example, a system, including a computing device, including a processor and a non-transitory computer-readable storage medium for tangibly storing thereon computer program code for execution by the processor, the computer program code including: executable logic for distributing over a network to multiple computing devices, by a computing system, parts of a shared computer programming project including a computer program that generates a multi-media presentation, the distributing of the shared computer programming project including relaying text messages and source code parts as attachments of the text messages through a message feed that is specifically associated with the shared computer programming project to provide a context-aware message feed and context-aware message attachments that include the source code parts, executable logic for generating a message feed graphical user interface (GUI) configured to: display graphical elements of the message feed via the multiple computing devices, the graphical elements of the message feed including the relayed text messages and the context-aware message attachments; and permit users to interact with the message feed and the context-aware message attachments, via the multiple computing devices, to update or at least view the source code parts; executable logic for permitting the users to send and receive, over the network and through the generated message feed GUI, the text messages with the context-aware message attachments; and executable logic for re-distributing over the network to the multiple computing devices, by the computing system, the shared computer programming project after it has been updated or least viewed by at least one of the multiple computing devices.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a predetermined desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
    distributing over a network to multiple computing devices, by a computing system, parts of a computer programming project comprising a computer program that generates a multi-media presentation,
        the distributing of the computer programming project comprising relaying text messages and source code parts as attachments of the text messages through a message feed that is specifically associated with the computer programming project to provide a context-aware message feed and context-aware message attachments that comprise the source code parts, and
        the computer program of the computer programming project comprising at least one of the source code parts;
    generating, by the computing system, a message feed graphical user interface (GUI) configured to:
        display graphical elements of the message feed via the multiple computing devices, the graphical elements of the message feed including the relayed text messages and the context-aware message attachments; and
        permit users to interact with the message feed and the context-aware message attachments, via the multiple computing devices, to update or at least view the source code parts;
    permitting, by the computing system, the users to send and receive, over the network and through the computing system and the generated message feed GUI, the text messages with the context-aware message attachments; and
    re-distributing over the network to the multiple computing devices, by the computing system, the computer programming project after it has been updated or least viewed by at least one of the multiple computing devices,
    wherein the generated message feed GUI is a part of a first dashboard,
    wherein the method further comprises:
        distributing over the network to at least one of the multiple computing devices, by the computing system, the first dashboard to permit a user of a first user type to select or create the computer programming project and initiate the distributing of the parts of the computer programming project via the first dashboard; and
        initiating the distributing of the parts of the computer programming project according to a corresponding interaction with the first dashboard by the user of the first user type,
    wherein the first dashboard is configured to permit the user of the first user type to add or remove a user of a second user type for sharing of the computer programming project,
    wherein the first user type has a supervisor credential over the second user type,
    wherein the method further comprises adding or removing, by the computing system, the user of the second user type for sharing of the computer programming project according to a corresponding interaction with the first dashboard by the user of the first user type,
    wherein the generated message feed GUI is a part of a second dashboard,
    wherein the method further comprises:
        distributing over the network to at least one of the multiple computing devices, by the computing system, the second dashboard to invite and permit a first user of the second user type to share comments and updates for the computer programming project, made by the first user, with a second user of the second user type and a predetermined user of the first user type; and
        relaying over the network, by the computing system, the shared comments and the shared updates for the computer programming project, made by the first user, to at least one of the multiple computing devices used by the second user of the second user type and to at least one of the multiple computing devices used by the predetermined user of the first user type,
    wherein the shared comments comprise at least one of the text messages with the context-aware message attachments, and
    wherein the shared updates comprise at least one of the context-aware message attachments.

2. The method of claim 1, wherein the source code parts comprise a graphical actor and a plurality of graphical source code pieces that are linked to the graphical actor to provide graphical control to the graphical actor in the multi-media presentation.

3. The method of claim 2, wherein the plurality of graphical source code pieces comprises at least one coding block.

4. The method of claim 1,
    wherein the second dashboard is configured to permit the second user of the second user type to reply to the first user of the second user type with second comments and second updates for the computer programming project,
    wherein the second comments comprise at least one of the text messages with the context-aware message attachments,
    wherein the second updates comprise at least one of the context-aware message attachments, and wherein the method comprises relaying over the network, by the computing system, the reply to the first user of the second user type with the second comments and updates to at least one of the multiple computing devices used by the first user of the second user type and to at least one of the multiple computing devices used by the predetermined user of the first user type.

5. The method of claim 4, wherein the first dashboard is configured to permit the predetermined user of the first user type to reply to the first user of the second user type with supervisorial comments and supervisorial updates for the computer programming project, wherein the supervisorial comments comprise at least one of the text messages with the context-aware message attachments, wherein the supervisorial updates comprise at least one of the context-aware message attachments, and wherein the method comprises relaying over the network, by the computing system, the reply to the first user of the second user type with the supervisorial comments and updates to at least one of the multiple computing devices used by the first user of the second user type and to at least one of the multiple computing devices used by the second user of the second user type.

6. The method of claim 1, wherein the source code parts are draggable from a workshop GUI into the generated message feed GUI to add the source code parts to the text messages of the message feed as the context-aware message attachments.

7. The method of claim 6, wherein, when a source code part of the source code parts is being dragged from the workshop GUI to a post of a message in the generated message feed GUI, other posts in the generated message feed GUI are obstructed visually to make it clear visually which post will include the source code part as a context-aware message attachment.

8. The method of claim 6, comprising:
generating, by the computing system, the workshop GUI;
generating, by the computing system, a master GUI, configured to provide the generated workshop GUI and the generated message feed GUI; and
distributing over the network to the multiple computing devices, by the computing system, the generated master GUI, wherein the generated master GUI comprises the generated workshop GUI and the generated message feed GUI when a sharing of a selected computer programming project is started by one of the multiple computing devices.

9. The method of claim 8, wherein the master GUI comprises a project share graphic clickable to start the sharing of the selected computer programming project and open one or more GUIs to select a group of users or a user in the group of users for the sharing of the selected computer programming project.

10. The method of claim 9, wherein the generated message feed GUI comprises an end-share graphic clickable to end the sharing of the selected computer programming project.

11. The method of claim 1, comprising logging messages associated with the computer programming project, wherein the logged messages comprise messages displayed via the generated message feed GUI.

12. The method of claim 11, wherein the logged messages comprise inter-process communication (IPC) messages that comprise messages used to synchronize states between collaborative project sessions of the computer programming project.

13. The method of claim 1, comprising:
storing, in persistent storage of the computing system, message data associated with the text messages, wherein the message data comprises attachment data associated with the context-aware message attachments; and
controlling the storing of the message data via a first-in-first-out (FIFO) queue of the computing system.

14. The method of claim 1, comprising serving, by an application server of the computing system, an application comprising the message feed, and wherein the multiple computing devices comprise client devices that access the message feed via the application and a client-server network comprising the computing system and the multiple computing devices.

15. The method of claim 14, wherein the application server is implemented by a server cluster, and the server cluster performs the distributing of the parts of the computer programming project via a cluster-message bus.

16. A non-transitory computer-readable storage medium tangibly encoded with computer-executable instructions that when executed by a processor of a computing device the processor performs a method comprising the following operations:
distributing over a network to multiple computing devices, by a computing system, parts of a computer programming project comprising a computer program that generates a multi-media presentation,
the distributing of the computer programming project comprising relaying text messages and source code parts as attachments of the text messages through a message feed that is specifically associated with the computer programming project to provide a context-aware message feed and context-aware message attachments that comprise the source code parts;
generating a message feed graphical user interface (GUI) configured to:
display graphical elements of the message feed via the multiple computing devices, the graphical elements of the message feed including the relayed text messages and the context-aware message attachments; and
permit users to interact with the message feed and the context-aware message attachments, via the multiple computing devices, to update or at least view the source code parts;
permitting, by the computing system, the users to send and receive, over the network and through the computing system and the generated message feed GUI, the text messages with the context-aware message attachments; and
re-distributing over the network to the multiple computing devices, by the computing system, the computer programming project after it has been updated or least viewed by at least one of the multiple computing devices,
wherein the generated message feed GUI is a part of a first dashboard,
wherein the method further comprises:
distributing over the network to at least one of the multiple computing devices, by the computing system, the first dashboard to permit a user of a first user type to select or create the computer programming project and initiate the distributing of the parts of the computer programming project via the first dashboard; and initiating the distributing of the parts of the computer programming project according to a corresponding interaction with the first dashboard by the user of the first user type, wherein the first dashboard is configured to permit the user of the first user type to add or remove a user of a second user type for sharing of the computer programming project, wherein the first user type has a supervisor credential over the second user type, wherein the method further comprises adding or removing, by the computing system, the user of the second user type for sharing of the computer programming project according to a corresponding interaction with the first dashboard by the user of the first user type, wherein the generated message feed GUI is a part of a second dashboard, wherein the method further comprises:

distributing over the network to at least one of the multiple computing devices, by the computing system, the second dashboard to invite and permit a first user of the second user type to share comments and updates for the computer programming project, made by the first user, with a second user of the second user type and a predetermined user of the first user type; and relaying over the network, by the computing system, the shared comments and the shared updates for the computer programming project, made by the first user, to at least one of the multiple computing devices used by the second user of the second user type and to at least one of the multiple computing devices used by the predetermined user of the first user type, wherein the shared comments comprise at least one of the text messages with the context-aware message attachments, and wherein the shared updates comprise at least one of the context-aware message attachments.

17. A system, comprising a computing device, comprising a processor and a non-transitory computer-readable storage medium for tangibly storing thereon computer program code for execution by the processor, the computer program code comprising:

executable logic for distributing, over a network to multiple computing devices, parts of a computer programming project comprising a computer program that generates a multi-media presentation, the distributing of the computer programming project comprising relaying text messages and source code parts as attachments of the text messages through a message feed that is specifically associated with the computer programming project to provide a context-aware message feed and context-aware message attachments that comprise the source code parts;

executable logic for generating a message feed graphical user interface (GUI) configured to:

display graphical elements of the message feed via the multiple computing devices, the graphical elements of the message feed including the relayed text messages and the context-aware message attachments; and permit users to interact with the message feed and the context-aware message attachments, via the multiple computing devices, to update or at least view the source code parts;

executable logic for permitting the users to send and receive, over the network and through the generated message feed GUI, the text messages with the context-aware message attachments; and executable logic for re-distributing, over the network to the multiple computing devices, the computer programming project after it has been updated or least viewed by at least one of the multiple computing devices, wherein the generated message feed GUI is a part of a first dashboard, wherein the computer program code further comprises:

executable logic for distributing over the network to at least one of the multiple computing devices, the first dashboard to permit a user of a first user type to select or create the computer programming project and initiate the distributing of the parts of the computer programming project via the first dashboard; and executable logic for initiating the distributing of the parts of the computer programming project according to a corresponding interaction with the first dashboard by the user of the first user type, wherein the first dashboard is configured to permit the user of the first user type to add or remove a user of a second user type for sharing of the computer programming project, wherein the first user type has a supervisor credential over the second user type, wherein the computer program code further comprises executable logic for adding or removing the user of the second user type for sharing of the computer programming project according to a corresponding interaction with the first dashboard by the user of the first user type, wherein the generated message feed GUI is a part of a second dashboard, wherein the computer program code further comprises:

executable logic for distributing over the network to at least one of the multiple computing devices, the second dashboard to invite and permit a first user of the second user type to share comments and updates for the computer programming project, made by the first user, with a second user of the second user type and a predetermined user of the first user type; and executable logic for relaying over the network the shared comments and the shared updates for the computer programming project, made by the first user, to at least one of the multiple computing devices used by the second user of the second user type and to at least one of the multiple computing devices used by the predetermined user of the first user type, wherein the shared comments comprise at least one of the text messages with the context-aware message attachments, and wherein the shared updates comprise at least one of the context-aware message attachments.

18. The non-transitory computer-readable storage medium of claim 16, wherein the source code parts comprise a graphical actor and a plurality of graphical source code pieces that are linked to the graphical actor to provide graphical control to the graphical actor in the multi-media presentation.

19. The non-transitory computer-readable storage medium of claim 18, wherein the plurality of graphical source code pieces comprises at least one coding block.

20. The non-transitory computer-readable storage medium of claim 16,
- wherein the second dashboard is configured to permit the second user of the second user type to reply to the first user of the second user type with second comments and second updates for the computer programming project,
- wherein the second comments comprise at least one of the text messages with the context-aware message attachments,
- wherein the second updates comprise at least one of the context-aware message attachments, and
- wherein the method comprises relaying over the network, by the computing system, the reply to the first user of the second user type with the second comments and updates to at least one of the multiple computing devices used by the first user of the second user type and to at least one of the multiple computing devices used by the predetermined user of the first user type.

* * * * *